(12) United States Patent
Tatsuno et al.

(10) Patent No.: US 12,526,517 B2
(45) Date of Patent: Jan. 13, 2026

(54) METHOD FOR CAPTURING IMAGE, METHOD FOR PROCESSING IMAGE, IMAGE CAPTURING SYSTEM, AND INFORMATION PROCESSING SYSTEM

(71) Applicants: Hibiki Tatsuno, Kanagawa (JP); Yasuhiro Akita, Tokyo (JP); Hideomi Sakuma, Kanagawa (JP); Kohei Ushio, Kanagawa (JP)

(72) Inventors: Hibiki Tatsuno, Kanagawa (JP); Yasuhiro Akita, Tokyo (JP); Hideomi Sakuma, Kanagawa (JP); Kohei Ushio, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 276 days.

(21) Appl. No.: 18/357,447

(22) Filed: Jul. 24, 2023

(65) Prior Publication Data

US 2024/0040247 A1 Feb. 1, 2024

(30) Foreign Application Priority Data

Jul. 28, 2022 (JP) ................. 2022-120596
Mar. 17, 2023 (JP) ................. 2023-043238

(51) Int. Cl.
*H04N 23/67* (2023.01)
*B60R 11/04* (2006.01)
*H04N 23/55* (2023.01)
*H04N 23/695* (2023.01)

(52) U.S. Cl.
CPC .......... *H04N 23/675* (2023.01); *B60R 11/04* (2013.01); *H04N 23/55* (2023.01); *H04N 23/695* (2023.01)

(58) Field of Classification Search
CPC ........ B60R 11/04; H04N 23/45; H04N 23/55; H04N 23/67; H04N 23/675; H04N 23/695
See application file for complete search history.

(56) References Cited

U.S. PATENT DOCUMENTS

| | | | | |
|---|---|---|---|---|
| 10,896,512 | B1* | 1/2021 | Rutland | G06T 7/73 |
| 11,214,196 | B1* | 1/2022 | Hadir | H04N 23/54 |
| 11,250,288 | B2* | 2/2022 | Sano | G05D 1/0253 |
| 11,716,450 | B2* | 8/2023 | Kim | H04N 23/61 |
| | | | | 348/159 |

(Continued)

FOREIGN PATENT DOCUMENTS

| | | |
|---|---|---|
| JP | 2012-242317 | 12/2012 |
| JP | 2015-042956 | 3/2015 |

(Continued)

*Primary Examiner* — Peter D Le
(74) *Attorney, Agent, or Firm* — IPUSA, PLLC

(57) ABSTRACT

A method for capturing a subject, using an image capturing device mounted on a mobile apparatus. The image capturing device divides a target area of the subject into a plurality of image capturing areas in a moving direction of the mobile apparatus, and captures the plurality of image capturing areas, while moving with the mobile apparatus. The method includes: setting, as a focusing condition for the image capturing device, a focus distance that is commonly used to capture the plurality of image capturing areas in the target area, such that the plurality of image capturing areas are within depth of field; and capturing, with the image capturing device, the plurality of image capturing areas at the focus distance that is set as the focusing condition.

14 Claims, 33 Drawing Sheets

(56) References Cited

U.S. PATENT DOCUMENTS

| | | | |
|---|---|---|---|
| 2003/0026456 A1* | 2/2003 | Akutagawa | G06T 7/70 382/104 |
| 2006/0139619 A1* | 6/2006 | Fujii | G06T 7/73 356/28 |
| 2007/0103461 A1* | 5/2007 | Suzuno | G06T 15/20 345/419 |
| 2009/0143967 A1* | 6/2009 | Lee | B60R 1/28 701/119 |
| 2009/0251530 A1* | 10/2009 | Cilia | G07C 5/0866 348/E7.001 |
| 2009/0303327 A1* | 12/2009 | Horiuchi | G08B 13/19608 348/152 |
| 2011/0267452 A1* | 11/2011 | Notsu | H04N 19/115 382/104 |
| 2011/0298988 A1* | 12/2011 | Kawai | G06T 7/73 348/E5.066 |
| 2014/0092272 A1* | 4/2014 | Choi | G03B 13/36 348/222.1 |
| 2015/0103190 A1* | 4/2015 | Corcoran | H04N 23/687 348/208.2 |
| 2016/0167583 A1* | 6/2016 | Schrepfer | B60R 11/04 348/148 |
| 2016/0266348 A1* | 9/2016 | Narayanan | H04N 23/743 |
| 2018/0330171 A1* | 11/2018 | Corcoran | G06V 20/58 |
| 2019/0056496 A1 | 2/2019 | Sakai et al. | |
| 2021/0067704 A1* | 3/2021 | Chino | H04N 23/58 |
| 2021/0097659 A1* | 4/2021 | Hung | G06T 5/73 |
| 2022/0402492 A1* | 12/2022 | Sakakura | G06V 20/584 |
| 2023/0073664 A1* | 3/2023 | Mao | B60K 35/00 |
| 2023/0099282 A1 | 3/2023 | Tatsuno et al. | |
| 2023/0319401 A1* | 10/2023 | Feng | G06T 7/50 348/241 |

FOREIGN PATENT DOCUMENTS

| | | |
|---|---|---|
| JP | 2016-183934 | 10/2016 |
| JP | 2019-033478 | 2/2019 |
| JP | 2019-074375 | 5/2019 |
| JP | 2021-148606 | 9/2021 |
| JP | 2023-030711 | 3/2023 |

\* cited by examiner

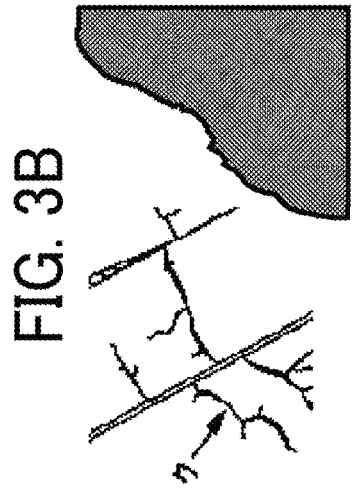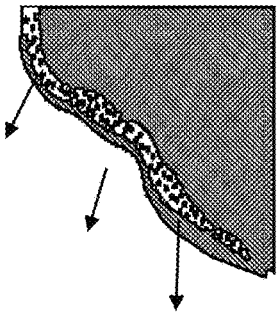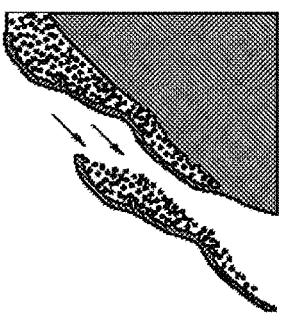

FIG. 7

| TYPE NO. | TYPE NAME | TRAINING IMAGE | REMARKS |
|---|---|---|---|
| 1 | RETAINING WALL | | — |
| 2 | SLOPE RETAINING FRAME | | THE PRESENCE OR ABSENCE OF ANCHORS IS NOT DISTINGUISHED |
| 3 | SPRAY MORTAR | | — |
| 4 | WIRE MESH, FENCE (RETAINING WALL) | | ASSIGN TO STRUCTURE INCLUDING RETAINING WALL AND WIRE MESH OR FENCE |
| 5 | WIRE MESH, FENCE (SLOPE RETAINING FRAME) | — | ASSIGN TO STRUCTURE INCLUDING SLOPE RETAINING FRAME AND WIRE MESH OR FENCE |
| 6 | WIRE MESH, FENCE (SPRAY MORTAR) | — | ASSIGN TO STRUCTURE INCLUDING SPRAY MORTAR AND WIRE MESH OR FENCE |
| 7 | WIRE MESH, FENCE (OTHERS) | — | ASSIGN TO ONLY WIRE MESH OR FENCE OR OBJECT WHOSE STATE TYPE BEHIND WIRE MESH OR FENCE IS UNKNOWN |
| 8 | BLOCK, JOINT | | — |

FIG. 8

| TYPE NO. | TYPE NAME | TRAINING IMAGE | REMARKS |
|---|---|---|---|
| 9 | DRAINAGE HOLE, PIPE | | CLOGGING CAUSES INFLOW WATER |
| 10 | DRAINAGE CHANNEL OF SMALL STEP | | CLOGGING CAUSES INFLOW WATER |
| 11 | INFLOW WATER | | INDICATE POSSIBILITY THAT ACCUMULATED WATER ARE APPLYING PRESSURE FROM BACK SIDE OF SLOPE |
| 12 | MOSS, PLANTS | | MAY BE CAUSED DUE TO INFLOW WATER |
| 13 | ROCKFALL | | INDICATE POSSIBILITY THAT ABNORMALITY IS PRESENT ON BACK SIDE AND UPPER SIDE OF SLOPE |
| 14 | EARTH AND SAND | | INDICATE POSSIBILITY THAT ABNORMALITY IS PRESENT ON BACK SIDE AND UPPER SIDE OF SLOPE |
| 15 | SUNSHINE | | POSSIBILITY OF INFLOW WATER IS DETERMINED BASED ON SUNSHINE AND TYPE OF MOSS |
| ... | ... | ... | ... |
| 97 | POLE, UTILITY POLE | | ASSIGN TO OBJECT TO WHICH NO SIGN OR SIGNBOARD IS ATTACHED ASSIGN THIS TAG, IF SIGN OR SIGNBOARD IS REGARDED AS A SUBSTANTIALLY STRAIGHT LINE WHEN HORIZONTALLY ORIENTED |
| 98 | SIGN, SIGNBOARD | | ASSIGN TO OBJECT TO WHICH NO FRAME IS ASSIGNED INCLUDING SUPPORT OR FIXING JIG TO WHICH SIGN OR SIGNBOARD IS ATTACHED |

FIG. 9A

ACQUIRED DATA MANAGEMENT TABLE

FOLDER NAME: SY4950

| CAPTURED-IMAGE DATA | SENSOR DATA | ACQUISITION TIME |
|---|---|---|
| R0509tm | S9579kj | 2020/3/6 14:05:50.904863 |
| R0510tm | S9580kj | 2020/3/6 14:05:51.208568 |
| R0511tm | S9581kj | 2020/3/6 14:05:51.807980 |
| ... | ... | ... |

FIG. 9B

PROCESSED DATA MANAGEMENT TABLE

FOLDER NAME: TM0615

| EVALUATION TARGET DATA | EVALUATION DATA | POSITIONING DATA | COMMENT |
|---|---|---|---|
| C3467im | P1276th | NORTH LATITUDE XX, EAST LONGITUDE YY | ROUTE NAME: RIKOU LINE _ INBOUND _ ROUTE 1 |
| C3468im | P1277th | NORTH LATITUDE XZ, EAST LONGITUDE YZ | ... |
| C3469im | P1278th | NORTH LATITUDE XY, EAST LONGITUDE YX | ... |
| ... | ... | ... | ... |

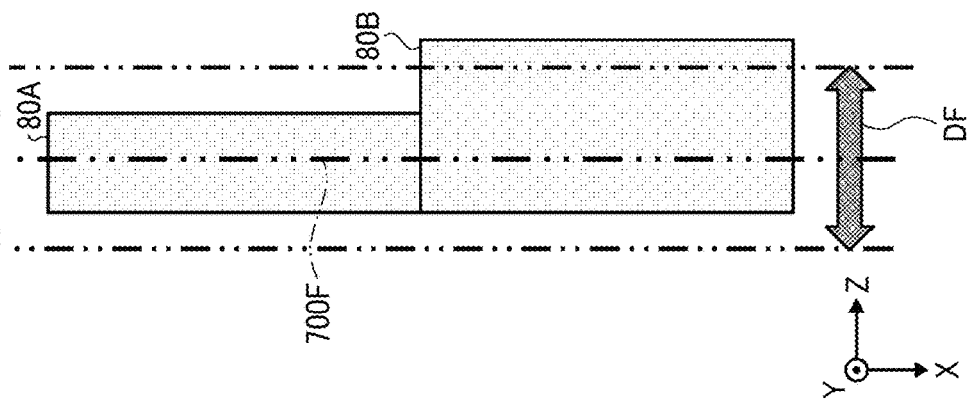
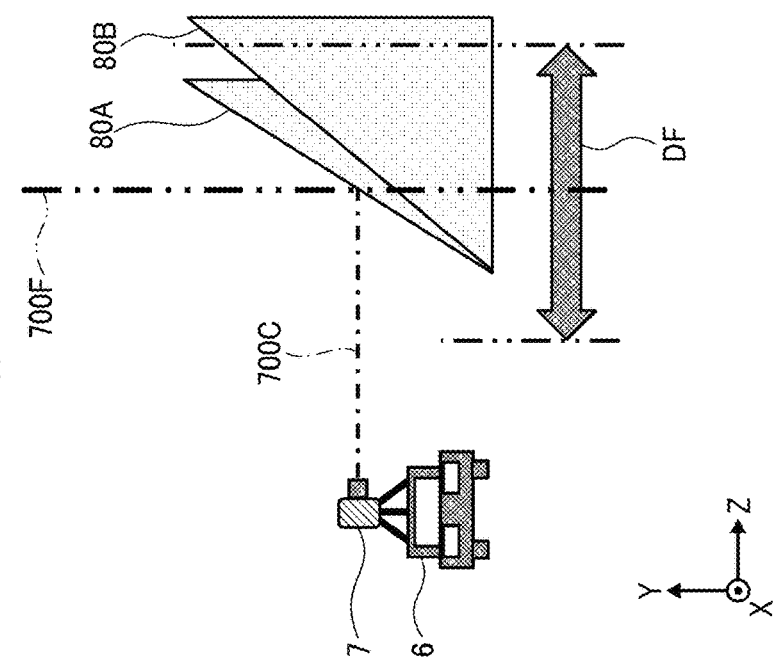
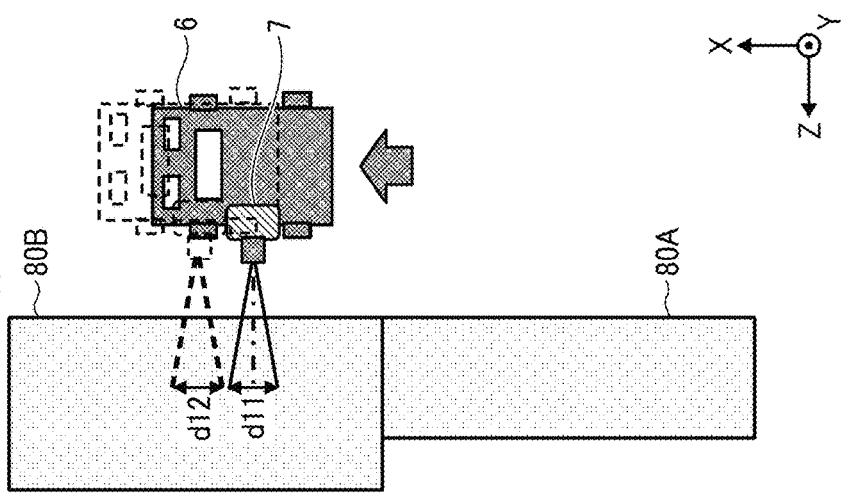

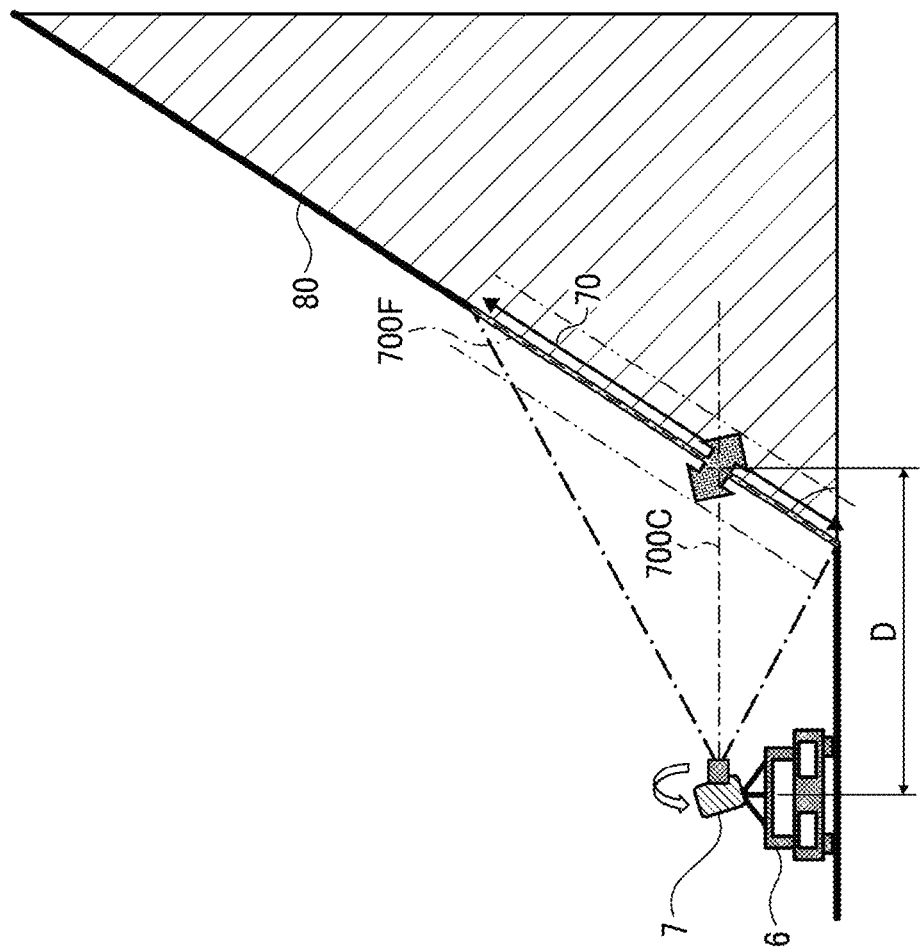
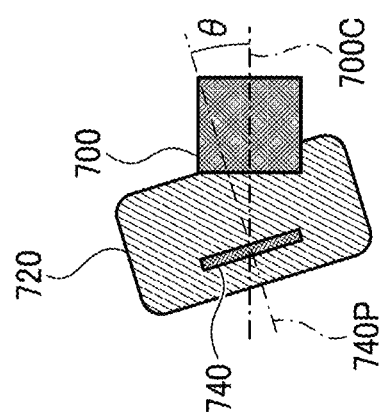
FIG. 26A
FIG. 26B

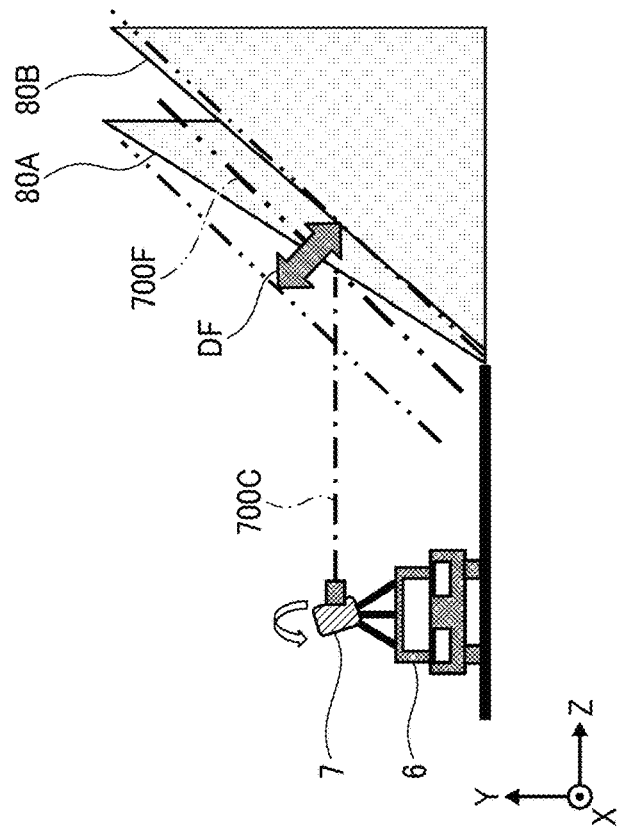
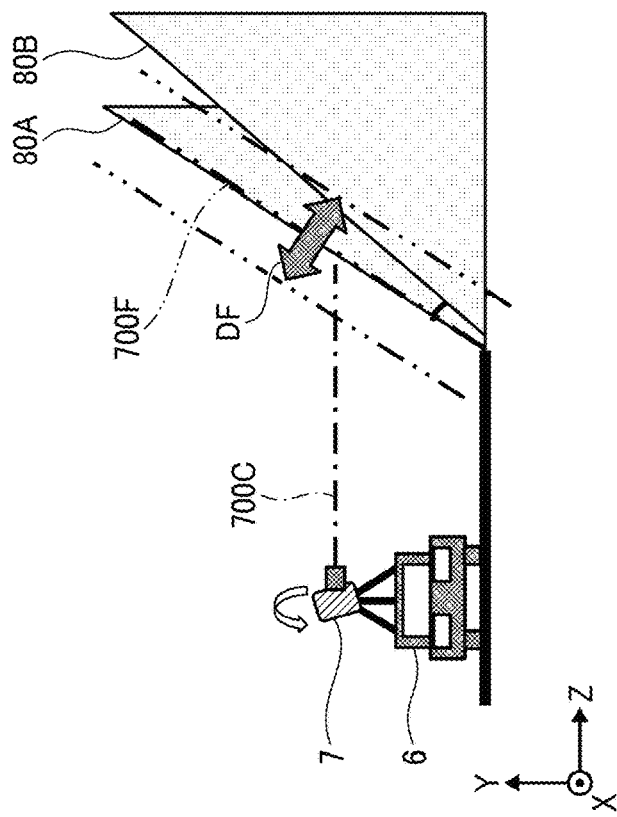

METHOD FOR CAPTURING IMAGE, METHOD FOR PROCESSING IMAGE, IMAGE CAPTURING SYSTEM, AND INFORMATION PROCESSING SYSTEM

CROSS-REFERENCE TO RELATED APPLICATIONS

This patent application is based on and claims priority pursuant to 35 U.S.C. § 119(a) to Japanese Patent Application Nos. 2022-120596, filed on Jul. 28, 2022, and 2023-043238, filed on Mar. 17, 2023, in the Japan Patent Office, the entire disclosure of which is hereby incorporated by reference herein.

BACKGROUND

Technical Field

Embodiments of the present disclosure relate to a method for capturing image, a method for processing image, an image capturing system, and an information processing system.

Related Art

The calibration device is provided, which can easily measure, with high accuracy, a position and a posture of a camera, which is mounted on a vehicle of a mobile mapping system (MMS).

SUMMARY

Example embodiments include a method for capturing a subject, using an image capturing device mounted on a mobile apparatus. The image capturing device is to divide a target area of the subject into a plurality of image capturing areas in a moving direction of the mobile apparatus, and to capture the plurality of image capturing areas while moving with the mobile apparatus. The method includes: setting, as a focusing condition for the image capturing device, a focus distance that is commonly used to capture the plurality of image capturing areas in the target area, such that the plurality of image capturing areas are within depth of field; and capturing, with the image capturing device, the plurality of image capturing areas at the focus distance that is set as the focusing condition.

Example embodiments include a method for processing image captured by an image capturing device mounted on a mobile apparatus. The image capturing device is to divide a target area of the subject into a plurality of image capturing areas in a moving direction of the mobile apparatus, and to capture the plurality of image capturing areas while moving with the mobile apparatus. The method includes: setting, as a focusing condition for the image capturing device, a focus distance that is commonly used to capture the plurality of image capturing areas, such that the plurality of image capturing areas in the target area are within depth of field; capturing, with the image capturing device, the plurality of image capturing areas with the focus distance that is set as the focusing condition; and generating a captured image of the target area by stitching the captured images of the plurality of image capturing areas in the target area, each image capturing area having been captured at the focus distance that is set as the focusing condition.

Example embodiments include an image capturing device, mounted on a mobile apparatus, to divide a target area of the subject into a plurality of image capturing areas in a moving direction of the mobile apparatus, and to capture the plurality of image capturing areas while moving with the mobile apparatus; and circuitry configured to control image capturing by the image capturing device. The circuitry sets, as a focusing condition for the image capturing device, a focus distance that is commonly used to capture the plurality of image capturing areas in the target area, such that the plurality of image capturing areas are within depth of field. The image capturing device captures the plurality of image capturing areas at the focus distance that is set as the focusing condition.

Example embodiments include an information processing system including the image capturing system, and circuitry configured to generate a captured image of the target area by stitching the captured images of the plurality of image capturing areas in the target area.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 3A to 3F are diagrams for explaining an example state of a slope;

FIG. 7 is an illustration of an example of a state type management table, according to an embodiment of the present disclosure;

FIG. 8 is an illustration of an example of a state type management table, according to an embodiment of the present disclosure;

FIG. 9A is an illustration of an example of an acquired data management table, according to an embodiment of the present disclosure; FIG. 9B is an illustration of an example of a processed data management table, according to an embodiment of the present disclosure;

FIGS. 22A to 22C are diagrams for explaining advantageous feature of the mobile apparatus system according to an embodiment of the present disclosure;

FIGS. 26A and 26B are diagrams for explaining the image capturing device, having its tilt angle set, according to an embodiment of the present disclosure;

FIGS. 27A and 27B are diagrams illustrating a mobile apparatus system in which a tilt angle is set, according to an embodiment of the present disclosure;

Figure 1:
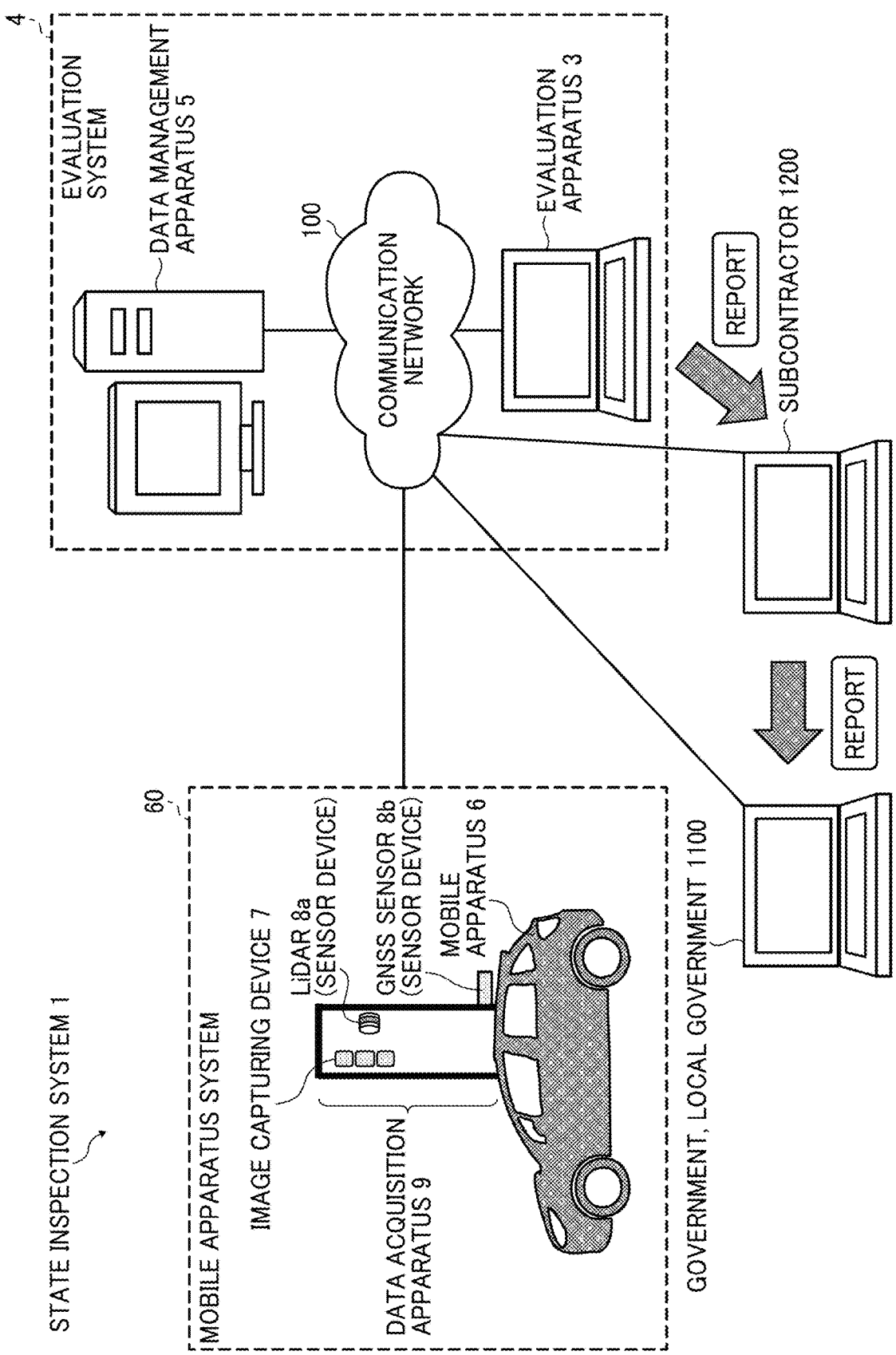
FIG. 1 is a schematic view of an overall configuration of a state inspection system, according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present invention are described with reference to the drawings. In the description of the drawings, the same elements are denoted by the same reference numerals, and redundant descriptions thereof are omitted.

First Embodiment

System Overview

Figure 2:
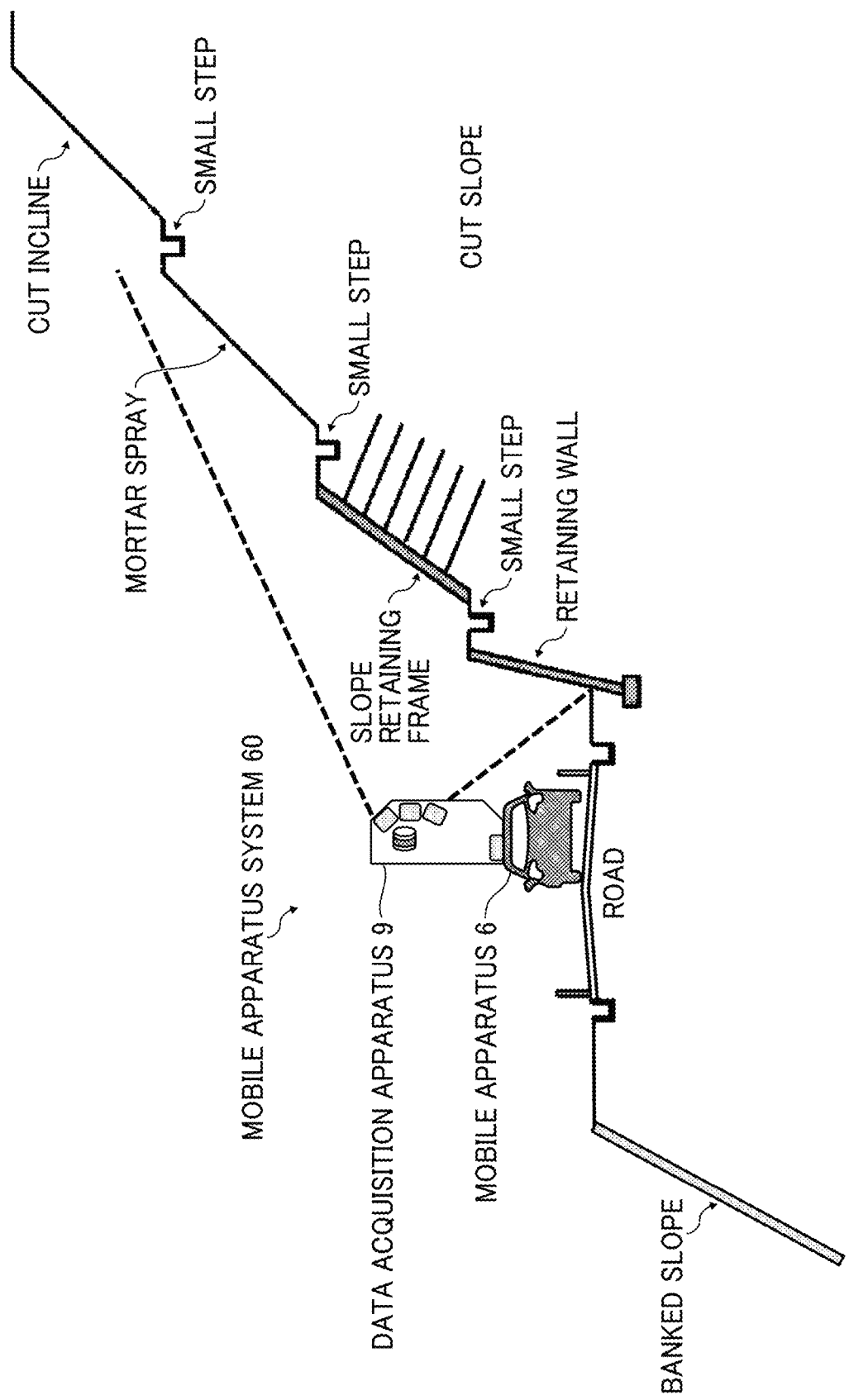
FIG. 2 is an illustration of an example of a situation in which a state of a slope is inspected using a mobile apparatus system, according to an embodiment of the present disclosure.

Referring to FIG. 1 and FIG. 2, an overview of a state inspection system is described according to one or more embodiments. FIG. 1 is a schematic diagram illustrating an overall configuration of the state inspection system 1 according to one or more embodiments. The state inspection system 1 illustrated in FIG. 1 is an example of an information processing system, which inspects a state of a road earth structure using various data acquired by a mobile apparatus system 60. The road earthwork structure is a term that collectively refers to structures made of ground materials as a main material such as earth and sand or rocks for constructing road, and structures associated with such structures made of ground materials as a main material. Examples of the road earthwork structure include facilities for stabilizing cut slopes and slopes, embankments, culverts, and other similar items. In the following description, the road earthwork structure is referred to as a man-made slope, or simply "slope."

The state inspection system 1 includes the mobile apparatus system 60, an evaluation system 4, a terminal apparatus 1100 of a national government or a local government, and a terminal apparatus 1200 of a subcontractor. The mobile apparatus system 60, which is an example of an image capturing system, includes a data acquisition apparatus 9, and a mobile apparatus 6 such as a vehicle on which the data acquisition apparatus 9 is mounted. The vehicle may be a vehicle that travels on a road, or may be a vehicle that travels on a track. The data acquisition apparatus 9 includes an image capturing device 7, a distance sensor 8a, and a global navigation satellite system (GNSS) sensor 8b. The image capturing device 7 is an example of a measuring device that measures a structure. GNSS is a term that collectively refers to satellite positioning systems such as a global positioning system (GPS) or quasi-zenith satellite (QZSS).

The image capturing device 7 is a line camera including a line sensor in which photoelectric conversion elements are arranged in one or more rows. The image capturing device 7 photographs (captures an image) a certain position in a predetermined photographing (image capturing) range on a photographing (image capturing) surface in a direction of travel of the mobile apparatus 6. The line camera is merely one example of the image capturing device. In another example, a camera including an area sensor in which photoelectric conversion elements are arranged in a plane may be used as the image capturing device 7. In another example, the image capturing device 7 may be implemented by multiple cameras.

The distance sensor 8a is a time-of-flight (ToF) sensor. The distance sensor 8a measures a distance from a subject photographed by the image capturing device 7. The GNSS sensor 8b is a position measuring device that measures a position on the earth by receiving signals transmitted from multiple GNSS satellites at multiple times and calculating distances to the satellites based on differences from the times at which the signals are received. The position measuring device may be a device dedicated to position measuring or an application dedicated to position measuring installed in, for example, a personal computer (PC) or a smartphone. The distance sensor 8a and the GNSS sensor 8b are examples of a sensor device. The distance sensor 8a is an example of a three-dimensional sensor.

The ToF sensor used as the distance sensor 8a emits laser light to a subject from a light source and measures light scattered or reflected on the subject, to measure a distance from the light source to the subject.

In the present embodiment, the distance sensor 8a is a light detection and ranging (LiDAR) sensor. The LiDAR is a technology that measures a light flight time using pulses. Alternatively, as another method of the ToF sensor, the distance may be measured using a phase difference detection method. In the phase difference detection method, laser light on which amplitude-modulation at a fundamental frequency has been performed is emitted to an area to be measured and light reflected on the area to be measured is received. A phase difference between the emitted light and the reflected light is measured to obtain time. The time is multiplied by the speed of light, thereby a distance is obtained. Alternatively, the distance sensor 8a may be implemented by, for example, a stereo camera.

By using the three-dimensional sensor, the mobile apparatus system 60 can obtain three-dimensional information that is difficult to obtain from a two-dimensional image, such as a height of a slope, an inclination angle, or swelling.

An angle sensor 8c may be further mounted on the mobile apparatus system 60. The angle sensor 8c is, for example, a gyroscopic sensor for detecting an angle (posture) or angular velocity (or each acceleration) of the photographing (image capturing) direction of the image capturing device 7.

The evaluation system 4 includes an evaluation apparatus 3 and a data management apparatus 5. The evaluation apparatus 3 and the data management apparatus 5 of the evaluation system 4 are communicably connected to the mobile apparatus system 60, the terminal apparatus 1100, and the terminal apparatus 1200 through a communication network 100. The communication network 100 includes the Internet, a mobile communication network, and a local area network (LAN), for example. The communication network 100 includes a network by not only wired communications but also a network by wireless communications such as 3rd generation (3G), 4th generation (4G), 5th generation (5G), Wireless Fidelity (Wi-Fi®), Worldwide Interoperability for Microwave Access (WiMAX), or Long Term Evolution (LTE).

Further, the evaluation apparatus 3 and the data management apparatus 5 may each have a communication function using a short-range communication technology such as near field communication (NFC®).

The data management apparatus 5 is an example of an information processing apparatus. For example, the data management apparatus 5 is a computer such as a PC that manages various data acquired by the data acquisition apparatus 9. The data management apparatus 5 receives various acquired data acquired from the data acquisition apparatus 9 and transfers the received various acquired data to the evaluation apparatus 3 that performs data analysis. The transfer of the various acquired data from the data management apparatus 5 to the evaluation apparatus 3 may be performed manually, for example, using a universal serial bus (USB) memory.

The evaluation apparatus 3 is a computer such as a PC that evaluates a state of a slope based on the various acquired data transferred from the data management apparatus 5. The evaluation apparatus 3 is installed with a dedicated application program for evaluating a state of a slope. The evaluation apparatus 3 detects a type or structure of the slope according to captured image data and sensor data to extract shape data, and performs detailed analysis such as detecting the presence or absence of a deformation and the degree of the deformation. Further, the evaluation apparatus 3 generates a report using the captured image data, the sensor data, evaluation target data, and the detailed analysis result. The report is to be submitted to an entity that manages roads such as a national government, a local government, or a subcontractor.

Data of the report generated by the evaluation apparatus 3 is submitted to the national government or the local governments via the subcontractor in the form of electronic data or printed documents. The report generated by the evaluation apparatus 3 is referred to as a "survey record sheet," a "check list," a "survey profile," or "records", for example. The PC is merely one example of the evaluation apparatus 3. Alternatively, a smartphone, a tablet terminal, or the like may be used for the evaluation apparatus 3. In another example, the evaluation apparatus 3 and the data management apparatus 5 of the evaluation system 4 may be implemented as a single apparatus or terminal.

The terminal apparatus 1200 is provided to be operated by a user at the subcontractor. The terminal apparatus 1100 is provided to be operated by a user at the national government or the local government. The evaluation apparatus 3, the terminal apparatus 1100, and the terminal apparatus 1200 are examples of communication terminals communicably connected to the data management apparatus 5. Various data managed by the data management apparatus 5 can be viewed at the evaluation apparatus 3, the terminal apparatus 1100, and the terminal apparatus 1200.

FIG. 2 is an illustration of an example of a situation in which a state of a slope is inspected using the mobile apparatus system 60, according to the embodiment. As illustrated in FIG. 2, the mobile apparatus system 60 photographs (captures images of) a predetermined area of the slope with the image capturing device 7 while causing the mobile apparatus 6 equipped with the data acquisition apparatus 9 to travel on a road.

As illustrated in FIG. 2, of slopes, a slope constructed by cutting a natural slope is referred to as a "cut slope," and a slope filled with soil is referred to as a "banked slope." A slope on the side of a road running along the side of a mountain is referred to as a "natural slope." Cut slopes and banked slopes can be made more durable by planting plants on the surface of the slopes, and can be left unchanged for several decades. However, in other cases, as deterioration of cut slopes, banked slopes, and natural slopes progresses due to wind and rain, a surface layer collapse occurs in which rocks and soil on the surface fall or a collapse occurs in which mountains collapse to cause road blockage. In order to avoid such a situation, a method is adopted in which mortar is sprayed on the surface of the slope (mortar spraying), or a concrete structure is installed and hardened to slow down the speed at which slopes deteriorates due to wind and rain. A structure constructed by the above method is called an earthwork structure. The earthwork structure includes, for example, a retaining wall installed between a natural slope and a road, a rockfall protection fence for preventing falling rocks from falling onto a road. Such the earthwork structure is for preventing road blockade or human damage caused by the outflow of earth and sand, or fallen rocks to a road.

Currently, the deterioration of earthwork structures constructed several decades ago is remarkable, and the maintenance of social infrastructure is a major issue. For this reason, deterioration of earthwork structures has to be detected at an early stage. Further, inspection and aging maintenance have to be performed to extend the life of earthwork structures. As known in the related art, an inspection of natural slopes and earthwork structures includes investigating fallen rocks, collapses, landslides or debris flow on slopes to prepare a repair plan. In the related art, the inspection is performed by visual inspections by experts.

However, visual inspections by experts have drawbacks in terms of efficiency, such as the inability to inspect many earthwork structures in the country in a certain period of time, and the impossibility of inspecting embankments at high places or along rivers. Further, by visual inspection, the degree of progress of deformation such as cracks or separations that occur on surface layers of earthwork structures cannot be quantitatively recognized.

To address an issue as described above, the state inspection system 1 according to the embodiments acquires captured image data of an earthwork structure slope using the image capturing device 7, and acquires sensor data including three-dimensional information by a three-dimensional sensor such as the distance sensor 8*a*. The evaluation system 4 evaluates the state of the slope by combining the acquired captured image data and sensor data, to detect shape data indicating a three-dimensional shape of the slope and detect deformations such as cracks or separations. With this configuration, the state inspection system 1 can efficiently perform an evaluation that is difficult by human visual inspection.

FIGS. 3A to 3F are diagrams for explaining example states of a slope. FIG. 3A is an image of a surface of a slope that is captured five years before the collapse of the slope. FIG. 3B is a view for explaining the image of FIG. 3A. A state indicated by FIG. 3A and FIG. 3B is a stage in which cracks on the surface layer of the slope are conspicuous. For this state, image analysis indicated in, for example, a developed view is effective for detecting deformation or signs of deformation of the surface layer such as cracks, separations, or inflow water.

FIG. 3C is an image of a surface of the slope captured two years before the collapse thereof. FIG. 3D is a view for explaining the image of FIG. 3C. A state indicated by FIG. 3C and FIG. 3D is a stage in which the inside of the slope changes to earth and sand, the earth and sand pushes the surface layer of the slope, and thereby the slope swells. For this state, a three-dimensional analysis using a combination of an image such as a development view and a cross-sectional view is effective for detecting three-dimensional deformation such as bumps with cracks and swellings.

FIG. 3E is an image of a surface of a slope that is captured one year before the collapse of the slope. FIG. 3F is a view for explaining the image of FIG. 3E. As indicted by FIG. 3E and FIG. 3F, the surface layer of the slope collapses as the surface layer is too weakened to contain mud and sand.

Hardware Configuration

Figure 4:
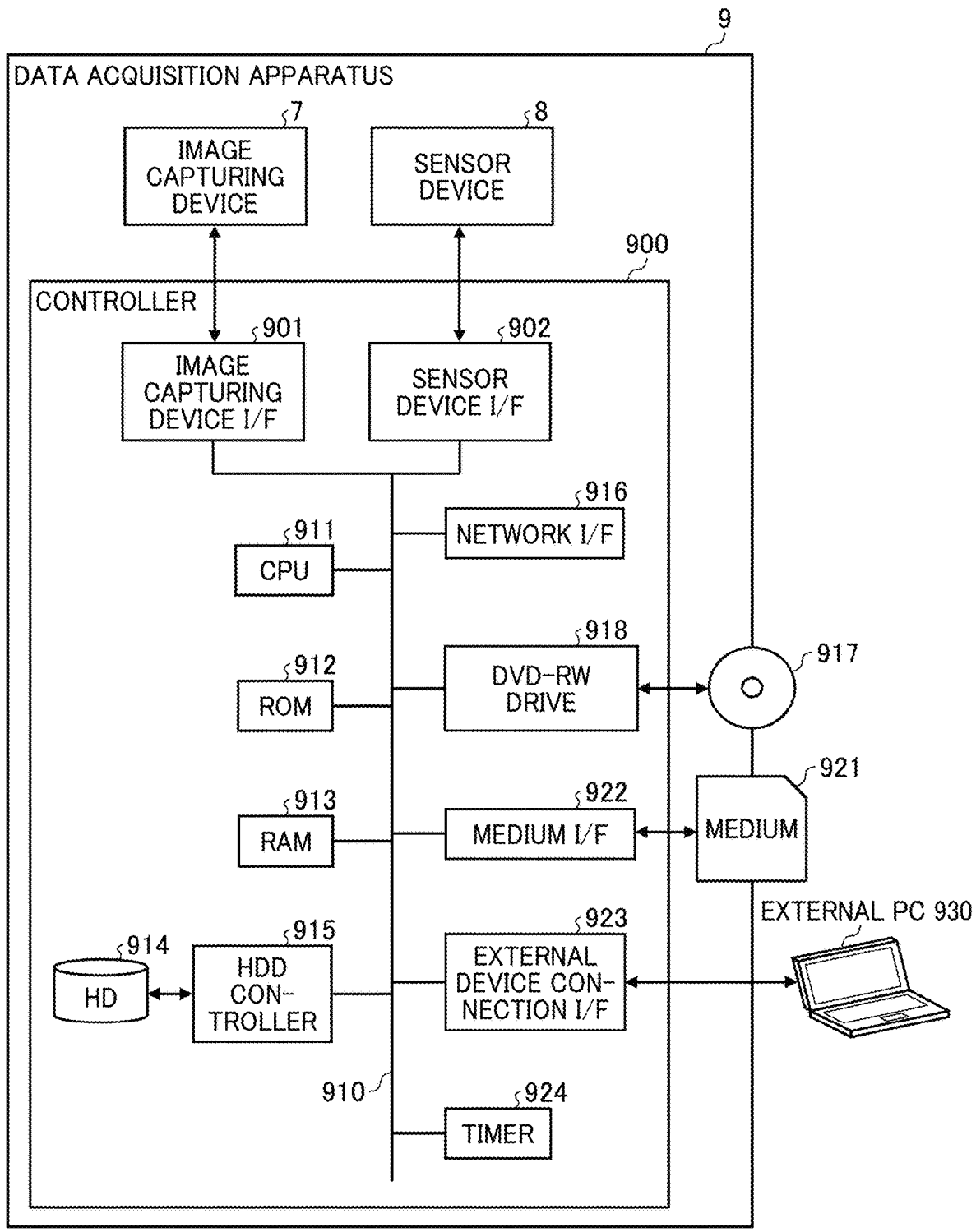
FIG. 4 is a block diagram illustrating an example of a hardware configuration of a data acquisition apparatus, according to an embodiment of the present disclosure.
Figure 5:
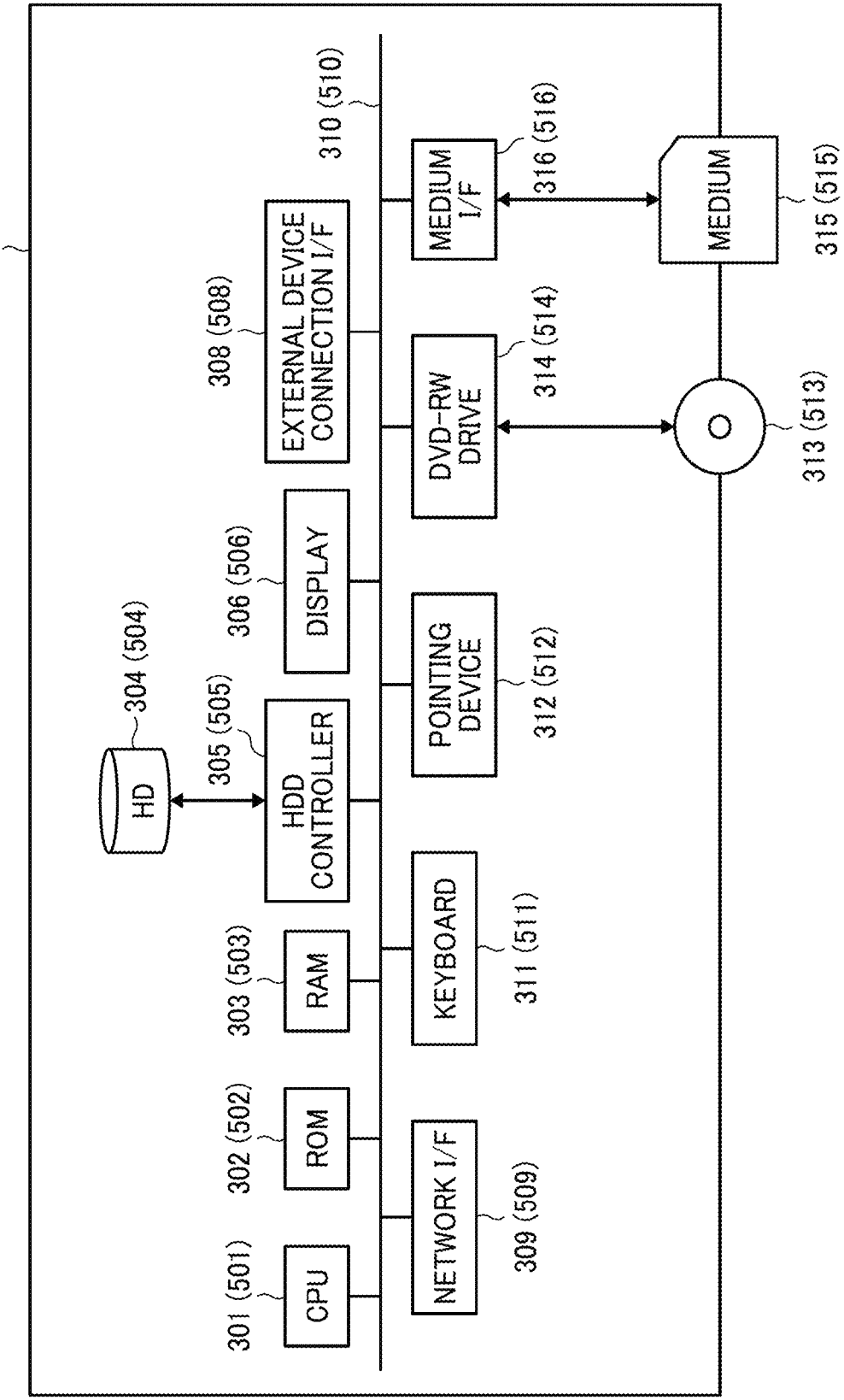
FIG. 5 is a block diagram illustrating an example of a hardware configuration of each of an evaluation apparatus and a data management apparatus, according to an embodiment of the present disclosure.

Referring to FIG. 4 and FIG. 5, a hardware configuration of each of the apparatuses of the state inspection system 1 is described, according to the embodiments. In the hardware configurations illustrated in FIG. 4 and FIG. 5, components or elements may be added or deleted as needed.

Hardware Configuration of Data Acquisition Apparatus

FIG. 4 is a block diagram illustrating an example of a hardware configuration of the data acquisition apparatus 9. The data acquisition apparatus 9 includes the image capturing device 7 and the sensor device 8 as illustrated in FIG. 1, and a controller 900 that controls processing or operation of the data acquisition apparatus 9.

The controller 900 is implemented by the general-purpose computer, and includes an image capturing device interface (I/F) 901, a sensor device I/F 902, a bus line 910, a central processing unit (CPU) 911, a read only memory (ROM) 912, a random access memory (RAM) 913, a hard disk (HD) 914, a hard disk drive (HDD) controller 915, a network I/F 916, a digital versatile disk rewritable (DVD-RW) drive 918, a medium I/F 922, an external device connection I/F 923, and a timer 924.

The image capturing device I/F 901 is an interface through which the controller 900 transmits and receives various data or information to and from the image capturing device 7.

The sensor device I/F 902 is an interface through which the controller 900 transmits and receives various data or information to and from the sensor device 8. Examples of the bus line 910 include, but are not limited to, an address bus and a data bus that electrically connects the components illustrated in FIG. 4 such as the CPU 911.

The CPU 911 controls entire operation of the data acquisition apparatus 9. The ROM 912 stores a program such as an initial program loader (IPL) to boot the CPU 911. The RAM 913 is used as a work area for the CPU 911. The HD 914 stores various data such as programs. The HDD controller 915 controls reading or writing of various data to or from the HD 914 under control of the CPU 911. The network I/F 916 is an interface that controls communication of data with an external device through the communication network 100.

The DVD-RW drive 918 controls reading or writing of various data to or from a DVD-RW 917, which is an example of a removable storage medium. In another example, the removable storage medium includes at least one of digital versatile disk-recordable (DVD-R) or a Blu-ray® disc, in addition to or in alternative to the DVD-RW.

The medium I/F 922 controls reading or writing (storing) of data from or to a storage medium 921 such as a flash memory. The external device connection I/F 923 is an interface that connects the data acquisition apparatus 9 to extraneous resource such as an external PC 930 including a display, an operation receiving device, and a display controller. The timer 924 is a measurement device that has a time measurement function. The timer 924 may be a computer-based software timer. It is preferable that the time of the timer 924 is synchronized with the time of the GNSS sensor 8*b*. This makes it easy to synchronize the times and associate positions for each sensor data and captured image data.

Hardware Configuration of Evaluation Apparatus

FIG. 5 is a block diagram illustrating an example of a hardware configuration of the evaluation apparatus 3. Each hardware component of the evaluation apparatus 3 is denoted by a reference numeral in 300 series. As illustrated in FIG. 5, the evaluation apparatus 3 is implemented by a computer. Specifically, the evaluation apparatus includes a CPU 301, a ROM 302, a RAM 303, an HD 304, an HDD controller 305, a display 306, an external device connection I/F 308, a network I/F 309, a bus line 310, a keyboard 311, a pointing device 312, a DVD-RW drive 314, and a medium I/F 316.

The CPU 301 controls entire operation of the evaluation apparatus 3. The ROM 302 stores a program such as an IPL to boot the CPU 301. The RAM 303 is used as a work area for the CPU 301. The HD 304 stores various data such as a control program. The HDD controller 305 controls reading or writing of various data to or from the HD 304 under control of the CPU 301. The display 306 displays various information such as a cursor, menu, window, characters, or image. The display 306 is an example of a display (display device). The external device connection I/F 308 is an interface that connects the evaluation apparatus 3 to various external devices. Examples of the external devices include, but are not limited to, a USB memory and a printer. The network I/F 309 is an interface that controls communication of data through the communication network 100. The bus line 310 is an address bus or a data bus, which electrically connects the components illustrated in FIG. 5 such as the CPU 301.

The keyboard 311 is an example of an input device including a plurality of keys for inputting characters, numerical values, various instructions, and the like. The pointing device 312 is an example of an input device that allows a user to select or execute a specific instruction, select a target for processing, or move a cursor being displayed. The DVD-RW drive 314 controls reading or writing of various data to or from a DVD-RW 313, which is an example of a removable storage medium. In another example, the removable storage medium includes at least one of digital versatile disk-recordable (DVD-R) or a Blu-ray® disc, in addition to or in alternative to the DVD-RW. The medium I/F 316 controls reading or writing (storing) of data from or to a storage medium 315 such as a flash memory.

Hardware Configuration of Data Management Apparatus

FIG. 5 is a block diagram illustrating an example of a hardware configuration of the data management apparatus 5. Each hardware component of the data management apparatus 5 is denoted by a reference numeral in 500 series. As illustrated in FIG. 5, the data management apparatus is implemented by a computer. As illustrated in FIG. 5, since the data management apparatus 5 has the same configuration as the evaluation apparatus 3, the description of hardware configuration thereof is omitted below. Further, since each of the terminal apparatus 1100 and the terminal apparatus 1200 is also implemented by a computer and has the same or substantially the same configuration as that of the evaluation apparatus 3, the description of the hardware configuration thereof is omitted below.

For example, any one of the above-described programs is recorded in a file in a format installable or executable on a computer-readable storage medium for distribution. Examples of the storage medium include a compact disc recordable (CD-R), a DVD, a Blu-ray® disc, a secure digital (SD) card, and a USB memory. Further, such storage medium may be provided in the domestic markets or foreign markets as program products. For example, the evaluation system 4 executes the program to implement an evaluation method according to the present disclosure.

Functional Configuration

Figure 6:
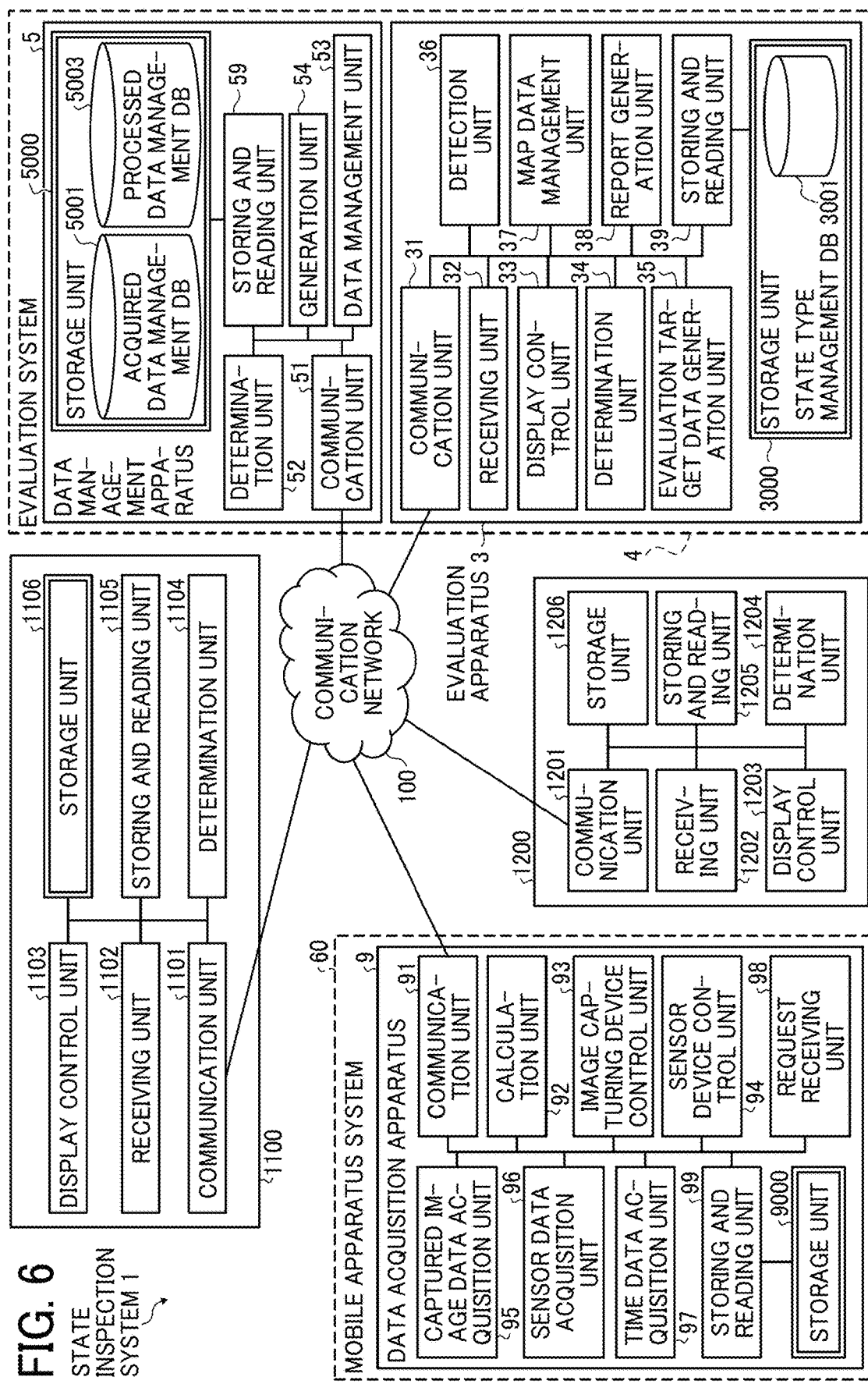
FIG. 6 is a block diagram illustrating an example of a functional configuration of the state inspection system, according to an embodiment of the present disclosure.

Next, referring to FIG. 6, a functional configuration of the state inspection system 1 according to an embodiment is described.

FIG. 6 is a block diagram illustrating an example of a functional configuration of the state inspection system 1, according to the first embodiment. FIG. 6 illustrates a part of the devices or apparatuses of FIG. 1, which are related to processes or operations described below.

Functional Configuration of Data Acquisition Apparatus

Referring to FIG. 6, a functional configuration of the data acquisition apparatus 9 is described, according to the embodiment. The data acquisition apparatus 9 includes a communication unit 91, a calculation unit 92, an image capturing device control unit 93, a sensor device control unit 94, a captured image data acquisition unit 95, a sensor data acquisition unit 96, a time data acquisition unit 97, a request receiving unit 98, and a storing and reading unit 99. These units are functions or means implemented by or caused to function by operating one or more hardware components illustrated in FIG. 4 in cooperation with instructions of the CPU 911 according to the program for the data acquisition apparatus loaded from the HD 914 to the RAM 913. The data acquisition apparatus 9 further includes a storage unit 9000 implemented by the ROM 912 and the HD 914 illustrated in FIG. 4. The external PC 930 connected to the data acquisition apparatus 9 illustrated in FIG. 4 includes a receiving unit and a display control unit, which are implemented by a CPU.

The communication unit 91 is implemented by the network I/F 916 that operates according to instructions of the CPU 911. The communication unit 91 communicates various data or information with other apparatuses or terminals through the communication network 100. For example, the communication unit 91 transmits acquired data acquired by the captured image data acquisition unit 95 and the sensor data acquisition unit 96 to the data management apparatus 5. The calculation unit 92, which is implemented by instructions of the CPU 911, performs various calculations.

The image capturing device control unit 93 is implemented by the image capturing device I/F 901 that operates according to instructions of the CPU 911. The image capturing device control unit 93 controls image capturing processing by the image capturing device 7. The sensor device control unit 94 is implemented by the sensor device I/F 902 that operates according to instructions of the CPU 911. The sensor device control unit 94 controls data acquisition processing for the sensor device 8. The image capturing device control unit 93 is an example of a control unit, which is implemented by instructions of the CPU 911. In this disclosure, the image capturing system may be implemented by a system including the image capturing device 7 and the image capturing device control unit 93.

The captured image data acquisition unit 95 is implemented by the image capturing device I/F 901 that operates according to instructions of the CPU 911. The captured image data acquisition unit 95 acquires captured image data corresponding to a captured image captured by the image capturing device 7. The sensor data acquisition unit 96 is implemented by the sensor device I/F 902 that operates according to instructions of the CPU 911. The sensor data acquisition unit 96 acquires sensor data, which is a result of detection by the sensor device 8. The sensor data acquisition unit 96 is an example of a distance information acquisition unit and a position information acquisition unit. The time data acquisition unit 97 is implemented by the timer 924 that operates according to instructions of the CPU 911. The time data acquisition unit 97 acquires time data that indicates a time at which the captured image data acquisition unit 95 or the sensor data acquisition unit 96 acquires data.

The request receiving unit 98 is implemented by the external device connection I/F 923 that operates according to instructions of the CPU 911. The request receiving unit 98 receives a request from, for example, the external PC 930.

The storing and reading unit 99, which is implemented by instructions of the CPU 911, stores various data (or information) in the storage unit 9000 or reads various types of data (or information) from the storage unit 9000.

Functional Configuration of Evaluation Apparatus

Referring to FIG. 6, a functional configuration of the evaluation apparatus 3 is described according to an embodiment. The evaluation apparatus 3 includes a communication unit 31, a receiving unit 32, a display control unit 33, a determination unit 34, an evaluation target data generation unit 35, a detection unit 36, a map data management unit 37, a report generation unit 38, and a storing and reading unit 39. These units are functions or means implemented by or caused to function by operating one or more hardware components illustrated in FIG. 5 in cooperation with instructions of the CPU 301 according to the program for the evaluation apparatus loaded from the HD 304 to the RAM 303. The evaluation apparatus 3 further includes a storage unit 3000 implemented by the ROM 302 and the HD 304 illustrated in FIG. 5.

The communication unit 31 is implemented by the network I/F 309 that operates according to instructions of the CPU 301. The communication unit 31 communicates various data or information with other apparatuses or terminals through the communication network 100. For example, the communication unit 31 transmits and receives various data relating to an evaluation of a slope state to and from the data management apparatus 5.

The receiving unit 32 is implemented by the keyboard 311 or the pointing device 312 that operates according to instructions of the CPU 301. The receiving unit 32 receives various selections or inputs from the user.

The receiving unit 32 receives various selections or inputs on an evaluation screen 400 described below. The display control unit 33, which is implemented by the instructions of the CPU 301, controls the display 306 to display various images. The display control unit 33 controls the display 306 to display the evaluation screen 400 described below. The determination unit 34, which is implemented by instructions of the CPU 301, performs various determinations. The receiving unit 32 is an example of an operation receiving unit.

The evaluation target data generation unit 35, which is implemented by instructions of the CPU 301, generates data to be evaluated. In the following description, the data to be evaluated may be referred to "evaluation target data." The detection unit 36, which is implemented by instructions of the CPU 301, performs processing of detecting a state of the slope using the evaluation target data generated by the evaluation target data generation unit 35. The map data management unit 37, which is implemented by instructions of the CPU 301, manages map information acquired from, for example, an external server. The map information includes location information indicating a certain position on a map.

The report generation unit 38, which is implemented by instructions of the CPU 301, generates an evaluation report to be submitted to the entity in charge of roads based on the evaluation result.

The storing and reading unit 39, which is implemented by instructions of the CPU 301, stores various data (or information) in the storage unit 3000 or reads various types of data (or information) from the storage unit 3000.

Functional Configuration of Data Management Apparatus

Referring to FIG. 6, a functional configuration of the data management apparatus 5 is described, according to the embodiment. The data management apparatus 5 includes a communication unit 51, a determination unit 52, a data management unit 53, a generation unit 54, and a storing and reading unit 59. These units are functions or means implemented by or caused to function by operating one or more hardware components illustrated in FIG. 5 in cooperation with instructions of the CPU 501 according to the program for the data management apparatus loaded from the HD 504 to the RAM 503. The data management apparatus 5 further includes a storage unit 5000 implemented by the ROM 502 and the HD 504 illustrated in FIG. 5.

The communication unit 51 is implemented by the network I/F 509 that operates according to instructions of the CPU 501. The communication unit 51 communicates various data or information with other apparatuses or terminals through the communication network 100. For example, the communication unit 51 receives captured image data and sensor data transmitted from the data acquisition apparatus 9. Further, the communication unit 51 transmits and receives various data relating to, for example, the evaluation of the slope state to and from the evaluation apparatus 3. The communication unit 51 is an example of an instruction receiving unit. The determination unit 52, which is implemented by instructions of the CPU 501, performs various determinations. The determination unit 52 is an example of is a position generation unit.

The data management unit 53, which is implemented by instructions of the CPU 501, manages various data relating to the evaluation of a slope state. For example, the data management unit 53 registers the captured image data and the sensor data transmitted from the data acquisition apparatus 9 in an acquired data management database (DB) 5001.

Further, the data management unit 53 registers, for example, data processed or generated by the evaluation apparatus 3 in a processed data management DB 5003. The generation unit 54, which is implemented by instructions of the CPU 501, generates image data relating to a slope.

The storing and reading unit 59, which is implemented by the instructions of the CPU 501, stores various data or information in the storage unit 5000 or reads out various data or information from the storage unit 5000.

Functional Configuration of Terminal Apparatus

Referring to FIG. 6, a functional configuration of the terminal apparatus 1100 is described, according to the embodiment. The terminal apparatus 1100 includes a communication unit 1101, a receiving unit 1102, a display control unit 1103, a determination unit 1104, and a storing and reading unit 1105. These units are functions or means implemented by or caused to function by operating one or more hardware components illustrated in FIG. 5 in cooperation with instructions of the CPU according to the program for the terminal apparatus loaded from the HD to the RAM. The data management apparatus 5 further includes a storage unit 1106 implemented by the ROM and the HD illustrated in FIG. 5.

The communication unit 1101 is implemented by the network I/F that operates according to instructions of the CPU. The communication unit 1101 communicates various data or information with other apparatuses or terminals through the communication network 100.

The receiving unit 1102 is implemented by the keyboard or the pointing device that operates according to instructions of the CPU. The receiving unit 1102 receives various selections or inputs from the user. The display control unit 1103, which is implemented by the instructions of the CPU, controls the display of the terminal apparatus 1100 to display various images. The determination unit 1104, which is implemented by instructions of the CPU 301, performs various determinations. The receiving unit 1102 is an example of an operation receiving unit.

The storing and reading unit 1105, which is implemented by instructions of the CPU, stores various data (or information) in the storage unit 1106 or reads various types of data (or information) from the storage unit 1106.

Referring to FIG. 6, a functional configuration of the terminal apparatus 1200 is described, according to the embodiment. The terminal apparatus 1200 includes a communication unit 1201, a receiving unit 1202, a display control unit 1203, a determination unit 1204, and a storing and reading unit 1205. These units are functions or means implemented by or caused to function by operating one or more hardware components illustrated in FIG. 5 in cooperation with instructions of the CPU according to the program for the terminal apparatus loaded from the HD to the RAM. The data management apparatus 5 further includes a storage unit 1206 implemented by the ROM and the HD illustrated in FIG. 5.

The communication unit 1201 is implemented by the network I/F that operates according to instructions of the CPU. The communication unit 1201 communicates various data or information with other apparatuses or terminals through the communication network 100.

The receiving unit 1202 is implemented by the keyboard or the pointing device that operates according to instructions of the CPU. The receiving unit 1202 receives various selections or inputs from the user. The display control unit 1203, which is implemented by the instructions of the CPU, controls the display of the terminal apparatus 1200 to display various images. The determination unit 1204, which is implemented by instructions of the CPU 301, performs various determinations.

The storing and reading unit 1205, which is implemented by instructions of the CPU, stores various data (or information) in the storage unit 1206 or reads various types of data (or information) from the storage unit 1206.

State Type Management Table

FIG. 7 and FIG. 8 are illustrations of an example of a state type management table. The state type management table is a table for managing training data for detecting a state type of a slope. In the storage unit 3000, a state type management DB 3001 is stored, for example, in the form of the state type management table as illustrated in FIG. 7 and FIG. 8. The state type management table stores, for each of type numbers, a type name indicating a state type, a training image, and remarks in association with one another.

The type name is a name indicating a state type that identifies the state of a slope, a physical quantity around the slope, and site information. In the embodiment, the state type includes a type of the slope itself including a structure such as a retaining wall, a slope retaining frame, spray mortar, a wire mesh, a fence, a drainage hole, a pipe, and a drainage channel of a small step. The state type further includes a type indicating a physical quantity around the slope such as inflow water, moss, plants, rockfall, earth and sand, and sunlight. The state type further includes, as the site information that supports data acquisition by the mobile apparatus system 60, a type such as a pole, a utility pole, a sign, and a signboard. The state type may further include, as supplementary information on the structure, landmark information such as a mark made with chalk indicating the presence of deformation, an artificial object such as a measurement device or a trace of countermeasure, which was provided at a past inspection or construction. The training image is an example of the training data. The training image is used for machine learning for determining the state type of the slope, the physical quantity around the slope, and the site information based on captured image data. In the embodiment, the training data is not limited to a brightness image or an RGB image, which is generally referred to as an image. The training data may be depth information, text, or voice, provided that it contains information based on which the state type is identified. In the remarks, information as a detection criterion for detecting the state type is described.

Acquired Data Management Table

FIG. 9A is an illustration of an example of an acquired data management table. The acquired data management table is a table for managing various acquired data acquired by the data acquisition apparatus 9. In the storage unit 5000, the acquired data management DB 5001 is stored, for example, in the form of the acquired data management table as illustrated in FIG. 9A. The acquired data management table stores, for each of folders, captured image data, sensor data, and acquisition time in association with one another.

The captured image data and the sensor data are data files of the acquired data transmitted from the data acquisition apparatus 9. The acquisition time indicates a time at which the captured image data and the sensor data are acquired by the data acquisition apparatus 9. Data acquired in one inspection process is stored in the same folder. The captured image data and the three-dimensional sensor data included in the sensor data are stored in association with coordinates, as described below. The captured image data, and the three-dimensional sensor data included in the sensor data are stored in association with positioning data included in the sensor data. With this configuration, in response to selection of a desired position in the map information managed by the map data management unit 37 of the evaluation apparatus 3, the captured image data and the three-dimensional sensor data at the selected position are read from the acquired data management DB 5001.

Processed Data Management Table

FIG. 9B is an illustration of an example of a processed data management table. The processed data management table is a table for managing various processed data processed by the evaluation apparatus 3. In the storage unit 5000, the processed data management DB 5003 is stored, for example, in the form of the processed data management table as illustrated in FIG. 9B. The processed data management table stores, for each of folders, the evaluation target data, evaluation data, positioning data, and comment in association with one another.

The evaluation target data is a data file used for detection and evaluation of a slope state by the evaluation apparatus 3. The evaluation data is a data file indicating an evaluation result obtained by the evaluation apparatus 3. The positioning data is data indicating location information measured by the GNSS sensor 8b. The comment is reference information input by an evaluator for the evaluation target data or the evaluation data. With this configuration, in response to selection of a desired position in the map information managed by the map data management unit 37 of the evaluation apparatus 3, the evaluation data at the selected position is read from the processed data management DB 5003.

Figure 10:
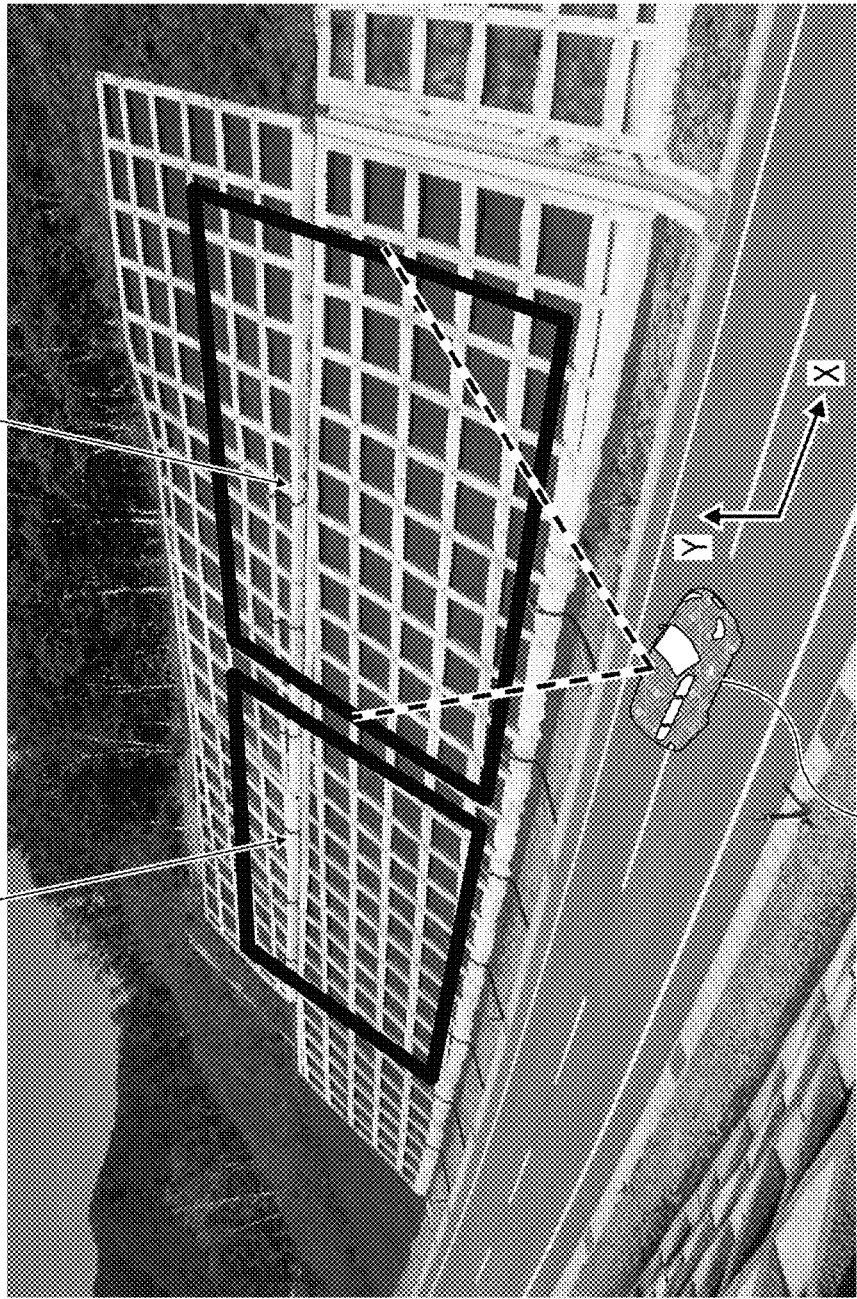
FIG. 10 is an illustration for describing a captured image acquired by the mobile apparatus system, according to an embodiment of the present disclosure.

FIG. 10 is an illustration for describing a captured image acquired by the mobile apparatus system 60.

The mobile apparatus system 60 photographs a slope on a road using the image capturing device 7 of the data acquisition apparatus 9 while the mobile apparatus 6 travels. An X-axis direction illustrated in FIG. 10 indicates a moving direction of the mobile apparatus 6, and a Y-axis direction indicates a vertical direction of the mobile apparatus 6. A depth direction toward the slope from the mobile apparatus 6 is a Z-axis direction, the Z-axis direction being orthogonal to the X-axis direction and the Y-axis direction.

As illustrated in FIG. 10, the data acquisition apparatus 9 acquires a captured image 1, a distance measurement image 1, a captured image 2, and a distance measurement image 2 in a chronological order as the mobile apparatus 6 travels. The distance measurement image 1 and the distance measurement image 2 are images acquired by the distance sensor 8a. With time synchronization being performed on the image capturing device 7 and the sensor device 8, the captured image 1 and the distance measurement image 1 are images for the same area of the slope, and the captured image 2 and the distance measurement image 2 are images of another same area of the slope. Further, tilt correction (image correction) is performed on the captured image based on the posture of the vehicle at the time when the captured image is photographed, and the image data and the positioning data (north latitude and east longitude) are associated with each other based on the time when the captured image is photographed.

Thus, the mobile apparatus system 60 acquires the captured image data obtained by photographing the slope and the sensor data acquired in accordance with photographing by the image capturing device 7 while the vehicle as the mobile apparatus 6 travels. The mobile apparatus system 60 uploads the acquired captured image data and sensor data to the data management apparatus 5. In this example, the data acquisition apparatus 9 may acquire the distance measurement image and the captured image at different times of traveling. In consideration of a change in the shape of the slope due to collapse or the like, it is preferable to acquire the distance measurement image and the captured image at the same time of traveling with respect to the same shape of the slope.

Figure 11A:
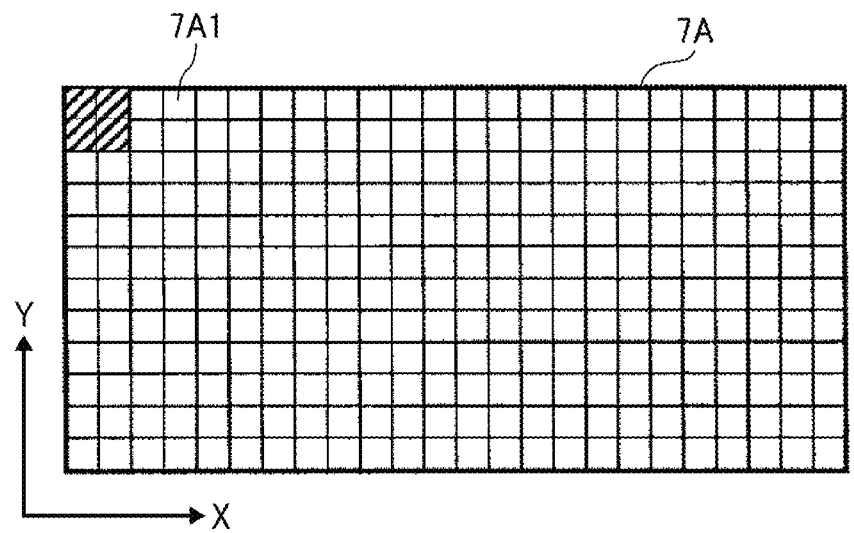
FIG. 11A and FIG. 11B are illustrations for describing a captured image and a distance measurement image, according to an embodiment of the present disclosure.
Figure 11B:
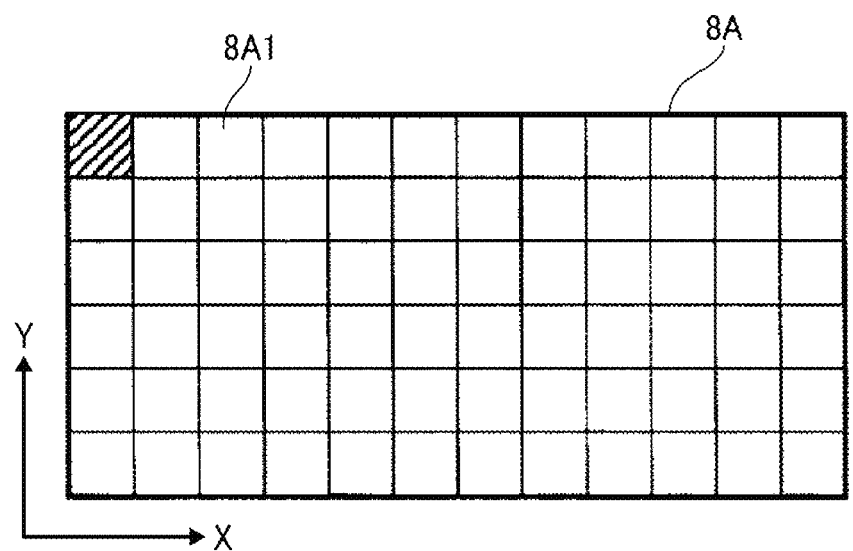

FIG. 11A and FIG. 11B are illustrations for describing the captured image and the distance measurement image.

FIG. 11A illustrates captured image data 7A, such as the captured image 1 or the captured image 2 illustrated in FIG. 10. Pixels 7A1 of the captured image data 7A acquired by the image capturing device 7 are arranged at coordinates indicating a position in the X-axis direction and the Y-axis direction illustrated in FIG. 10. Each pixel 7A1 has brightness information corresponding to an amount of stored electricity.

In other words, the captured image data 7A is an example of a brightness image.

The brightness information of the pixels 7A1 of the captured image data 7A is stored in the storage unit 5000 as the captured image data illustrated in FIG. 9A and FIG. 9B in association with coordinates indicating a position in the X-axis direction and the Y-axis direction illustrated in FIG. 10.

FIG. 11B illustrates distance measurement image data 8A, such as the distance measurement image 1 or the distance measurement image 2 illustrated in FIG. 10. Pixels 8A1 of the distance measurement image data 8A acquired by the distance sensor 8a are arranged at coordinates indicating a position in the X-axis direction and the Y-axis direction illustrated in FIG. 10. Each pixel 8A1 has distance information in the Z-axis direction illustrated in FIG. 10 corresponding to an amount of stored electricity. The distance measurement image data 8A is three-dimensional point cloud data. The three-dimensional point cloud data is referred to as the "distance measurement image data," since in typical cases, the three-dimensional point cloud data is displayed in a visually recognizable manner by adding the brightness information so that the three-dimensional point cloud data is visually perceptible to a user. In the following, the captured image data 7A and the distance measurement image data 8A are collectively referred to as "image data".

Distance information of each pixel 8A1 of the distance measurement image data 8A is stored in the storage unit 5000 as three-dimensional data included in the sensor data illustrated in FIG. 9A or 9B in association with coordinates indicating a position in the X-axis direction and the Y-axis direction illustrated in FIG. 10.

Since the captured image data 7A illustrated in FIG. 11A and the distance measurement image data 8A illustrated in FIG. 11B are images of the same area of the slope, the brightness information and the distance information are stored in the storage unit 5000 in association with the coordinates indicating the position in the X-axis direction and the Y-axis direction illustrated in FIG. 10.

Figure 12A:
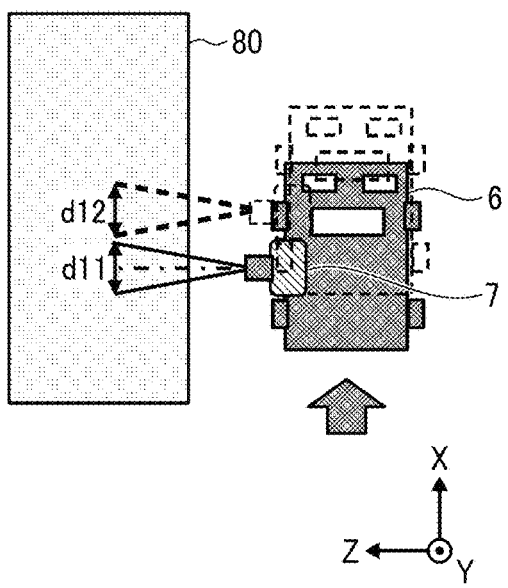
FIGS. 12A to 12C are diagrams for explaining a plurality of image capturing areas, according to an embodiment of the present disclosure.
Figure 12B:
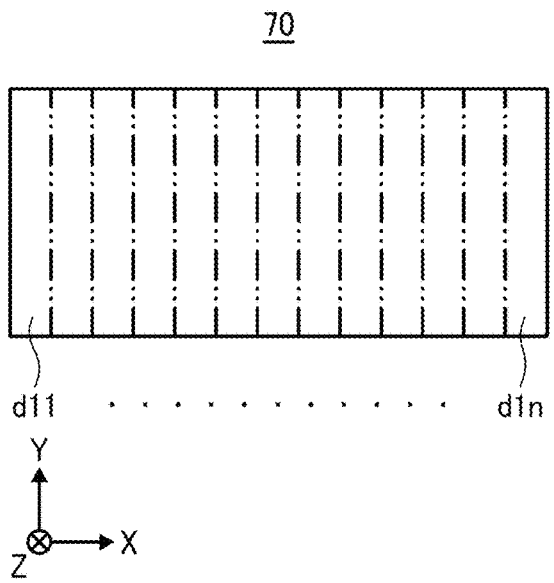
Figure 12C:
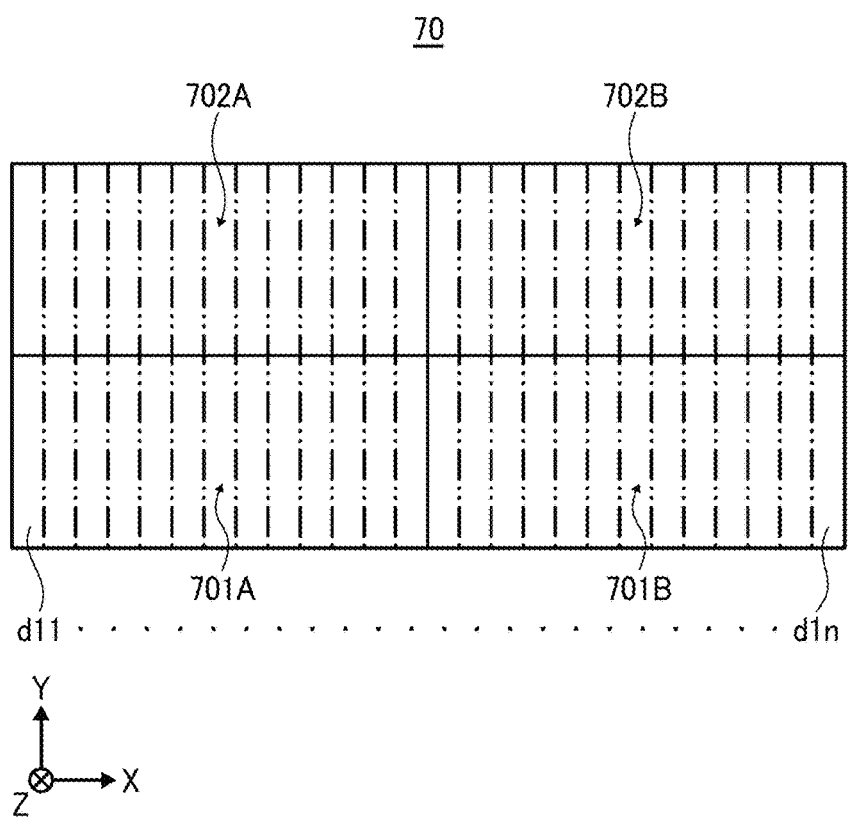

FIGS. 12A to 12C are diagrams for explaining a plurality of image capturing areas. As illustrated in FIG. 12A, while traveling together with the mobile apparatus 6, the image capturing device 7 captures images of the target area 70, which is an image capturing range of the slope 80. Specifically, the image capturing device 7 divides the target area 70 into a plurality of image capturing areas d11, d12, . . . etc. at constant intervals t in the X-axis direction, which is the traveling direction of the mobile apparatus 6.

As illustrated in FIG. 12B, the captured images obtained by capturing the plurality of image capturing areas d11, d12, . . . are each a slit-like captured image elongated in the Y-axis direction. These captured images obtained by capturing the plurality of image capturing areas d11, d12, . . . are combined so as to be continuous in the X-axis direction to obtain a captured image of the target area 70.

FIG. 12C is a diagram illustrating a case where the entire target area 70 is divided into a plurality of target areas to capture the image of the entire target area 70. In FIG. 12C, the entire target area 70 is divided into four target areas 701A, 702A, 701B, and 702B, which are each captured.

Similarly to the case illustrated in FIG. 12B, each of the plurality of target areas 701A, 702A, 701B, and 702B is divided into a plurality of image capturing areas d11, d12, . . . , which are each captured. These captured images obtained by capturing the plurality of image capturing areas d11, d12, . . . are combined to obtain a plurality of target areas 701A, 702A, 701B, and 702B. The captured images of the plurality of target areas 701A, 702A, 701B, and 702B are then combined to obtain a captured image of the target area 70.

In this case, the image capturing device 7 includes a plurality of image capturing devices, such that the target areas 702A and 702B are captured by an image capturing device different from the image capturing device that captures the target areas 701A and 701B.

The target area 701B is captured by the same image capturing device that captures the target area 701A, but under different image capturing conditions. The target area 702B is captured by the same image capturing device that captures the target area 702A, but under different image capturing conditions.

As illustrated in FIG. 12A, it is desirable that the distance sensor 8a acquires distance information indicating a distance to each of the plurality of image capturing areas d11, d12, . . . , from the distance sensor 8a, at a timing at which the imaging capturing device 7 captures the plurality of image areas d11, d12, . . . , which is divided from the target area of the slope 80.

As described with reference to FIG. 10, FIGS. 11A and 11B, the brightness information of each pixel 7A1 of the captured image data 7A, acquired by the image capturing device 7, can be easily associated with the distance information of each pixel 8A1 of the distance measurement image 8A, acquired by the distance sensor 8a. Using this association information associating the brightness information of each captured image obtained by capturing the target area of the slope 80, with the distance information of each pixel of the distance measurement image, which is obtained by measuring the distance to the target area of the slope 80, the target area of the slope 80 can be inspected with high accuracy.

Processes and Operations
Operation of Acquiring Data

Figure 13:
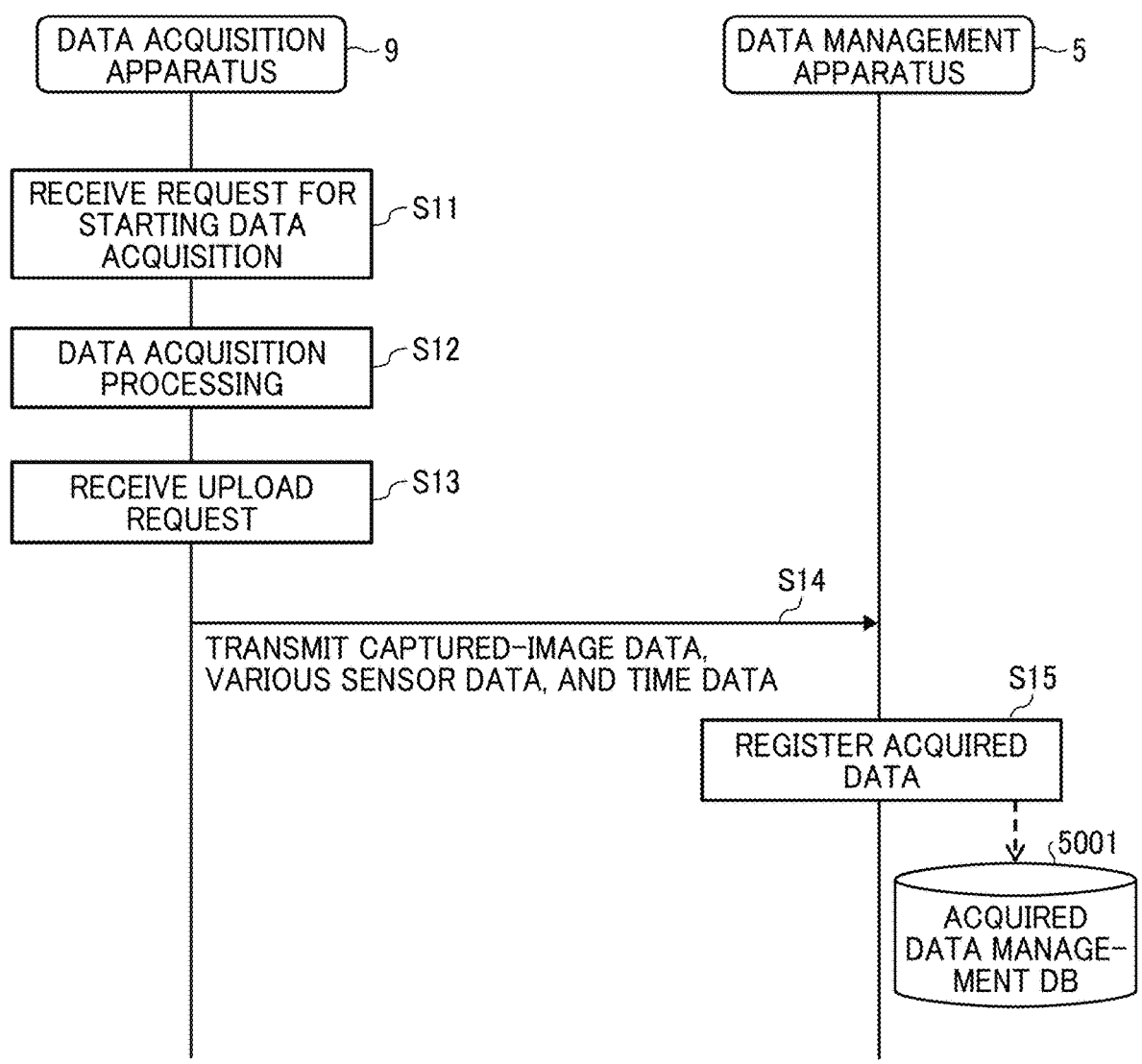
FIG. 13 is a sequence diagram illustrating an example of an operation of acquiring data using the mobile apparatus system, according to an embodiment of the present disclosure.

Referring to FIG. 13, operation of acquiring data using the mobile apparatus system 60 is described, according to the embodiment. In response to an instruction from an inspection technician in charge of inspection of a slope state, who roads on the mobile apparatus 6, the image capturing device 7 captures images of slope, and uploads acquired data to the data management apparatus 5. The details are described below.

FIG. 13 is a sequence diagram illustrating an example operation of acquiring data using the mobile apparatus system 60.

First, in response to a predetermined input operation by an inspection technician to the external PC 930, the request receiving unit 98 of the data acquisition apparatus 9 receives a data acquisition start request (step S11). The data acquisition apparatus 9 performs data acquisition processing using the image capturing device 7 and the sensor device 8 (step S12). Specifically, the image capturing device control unit 93 sends a photographing (image capturing) request to the image capturing device 7, to start photographing processing for a particular area. Further, the sensor device control unit 94 starts detection processing by the distance sensor 8a and the GNSS sensor 8b in synchronization with the photographing processing by the image capturing device 7. The captured image data acquisition unit 95 acquires captured image data obtained by the image capturing device 7. The sensor data acquisition unit 96 acquires sensor data obtained by the distance sensor 8a and the GNSS sensor 8b. The time data acquisition unit 97 acquires time data indicating times at which various data including the captured image data and the sensor data are acquired by the captured image data acquisition unit 95 and the sensor data acquisition unit 96.

In response to a predetermined input operation by the inspection technician to the external PC 330, the request receiving unit 98 receives an upload request for requesting an upload of the acquired various data (step S13). The communication unit 91 uploads (transmits) the captured image data, the sensor data, and the time data, which are acquired data acquired at step S12, to the data management apparatus 5 (step S14). Thus, the communication unit 51 of the data management apparatus 5 receives the acquired data transmitted from the data acquisition apparatus 9. The data management unit 53 of the data management apparatus 5 registers the acquired data received at step S14 in the acquired data management DB 5001 (see FIG. 9A) (step S15). The data management unit 53 stores the captured image data and the sensor data in one folder in association with the time data indicating the acquisition time of each data included in the acquired data.

Operation of Evaluating Slope State
Generation of Evaluation Target Data

Figure 14:
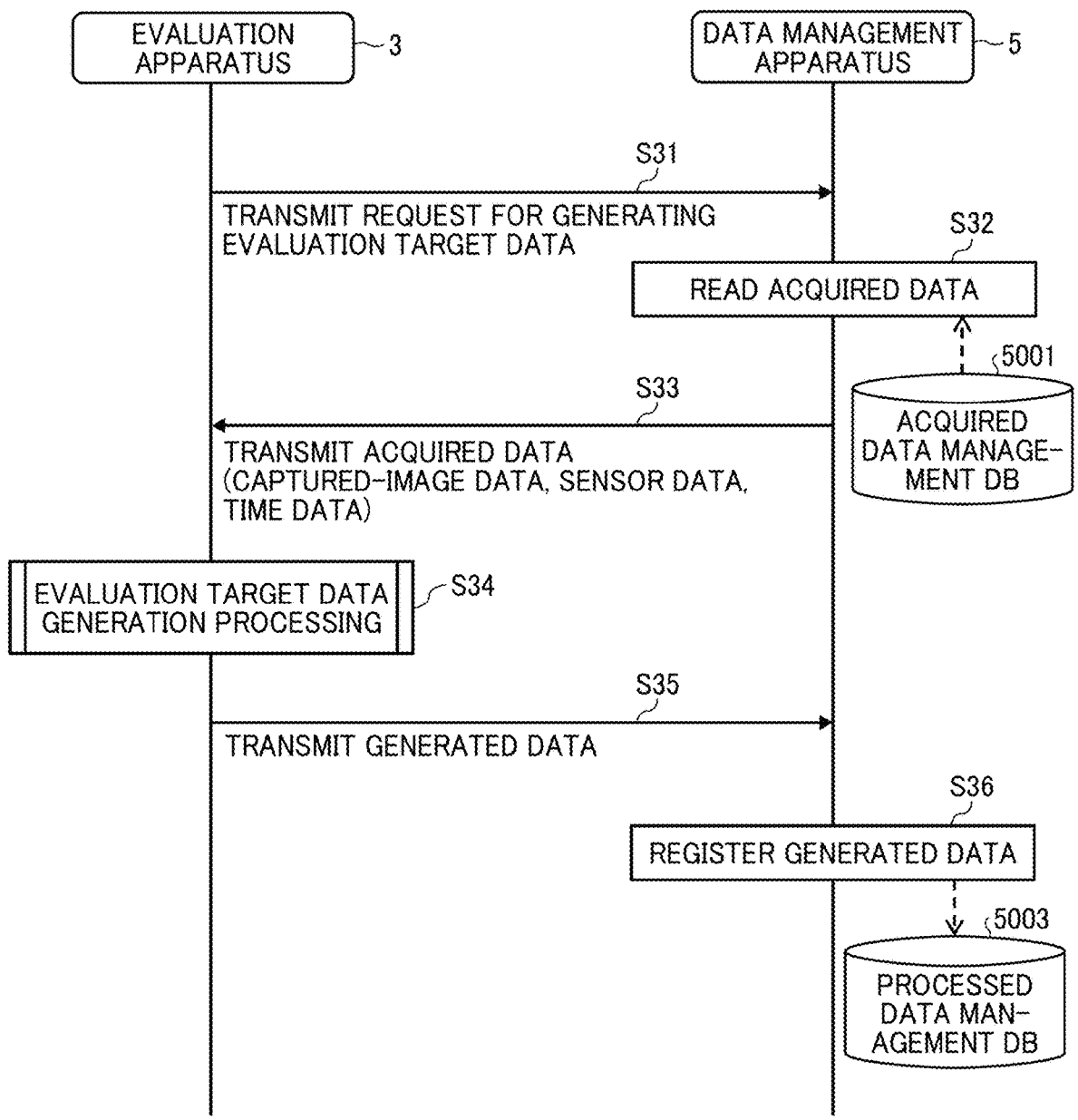
FIG. 14 is a sequence diagram illustrating an example of an operation of generating evaluation target data, according to an embodiment of the present disclosure.

FIG. 14 is a sequence diagram illustrating an example operation of generating the evaluation target data.

The communication unit 31 of the evaluation apparatus 3 transmits a generation request that requests generation of evaluation target data to the data management apparatus 5 (step S31). The generation request includes a name of a folder in which data as a generation target is stored. Thus, the communication unit 51 of the data management apparatus 5 receives the generation request transmitted from the evaluation apparatus 3.

The data storing and reading unit 59 of the data management apparatus 5 searches the acquired data management DB 5001 using the folder name included in the generation request received at step S31 as a search key, to read acquired data associated with the folder name included in the generation request (step S32). The communication unit 51 transmits the acquired data read at step S32 to the evaluation apparatus 3 (step S33). This acquired data includes captured image data, sensor data, and time data. Thus, the communication unit 31 of the evaluation apparatus 3 receives the acquired data transmitted from the data management apparatus 5.

The evaluation target data generation unit 35 of the evaluation apparatus 3 generates evaluation target data using the acquired data received at step S33 (step S34). Specifically, the evaluation target data generation unit 35 corrects a tilt of the captured image data according to the posture of the image capturing device 7 or the mobile apparatus 6 at the time when the captured image is photographed based on the received sensor data obtained by the distance sensor 8a. Further, the evaluation target data generation unit 35 associates positioning data, which is the received sensor data obtained by the GNSS sensor 8b, with the captured image data, based on the received time data. Furthermore, the evaluation target data generation unit performs processing synthesizing a plurality of pieces of captured image data into one piece of image data.

Specifically, as described with reference to FIGS. 12A to 12C, the evaluation target data generation unit 35 combines the respective captured images of the plurality of image capturing areas, to obtain the captured images of the target area 70, that is, the plurality of target areas 701A, 702A, 701B, and 702B (an example of generating step). In this example, the captured images of the plurality of image capturing areas are captured images captured at a common focus distance or a common tilt angle, as will be described later. The evaluation target data generation unit 35 stiches these captured images to combine into one captured image.

The evaluation target data generation unit 35 stiches the captured images of the plurality of target areas 701A, 702A, 701B, and 702B to combine into a captured image of the entire target area 70.

As described above, the evaluation target data generation unit 35 has a tilt correction function for image data, an associating function for associating image data with location information, and a synthesis function for image data. The evaluation target data generation unit 35 performs image correction on the received captured image data by using the acquired data received from the data management apparatus 5, to facilitate processing by the detection unit 36 and the report generation unit 38 described below.

Next, the communication unit 31 of the evaluation apparatus 3 transmits the generated data generated at step S34 to the data management apparatus 5 (step S35). The generated data includes the evaluation target data generated by the evaluation target data generation unit 35, the positioning data, and the comment. Thus, the communication unit 51 of the data management apparatus 5 receives the generated data transmitted from the evaluation apparatus 3. The data management unit 53 of the data management apparatus 5 stores the generated data received at step S35 in the processed data management DB 5003 (see FIG. 9B) (step S36). Specifically, the data management unit 53 stores the evaluation target data, the positioning data, and the comment included in the generated data in one folder in association with each other.

Thus, the evaluation system 4 performs image processing based on the various data including the captured image data, the sensor data, and the time data acquired from the data acquisition apparatus 9 to generate evaluation target data to be used for evaluation of a slope state.

Generation of Evaluation Report

Figure 15:
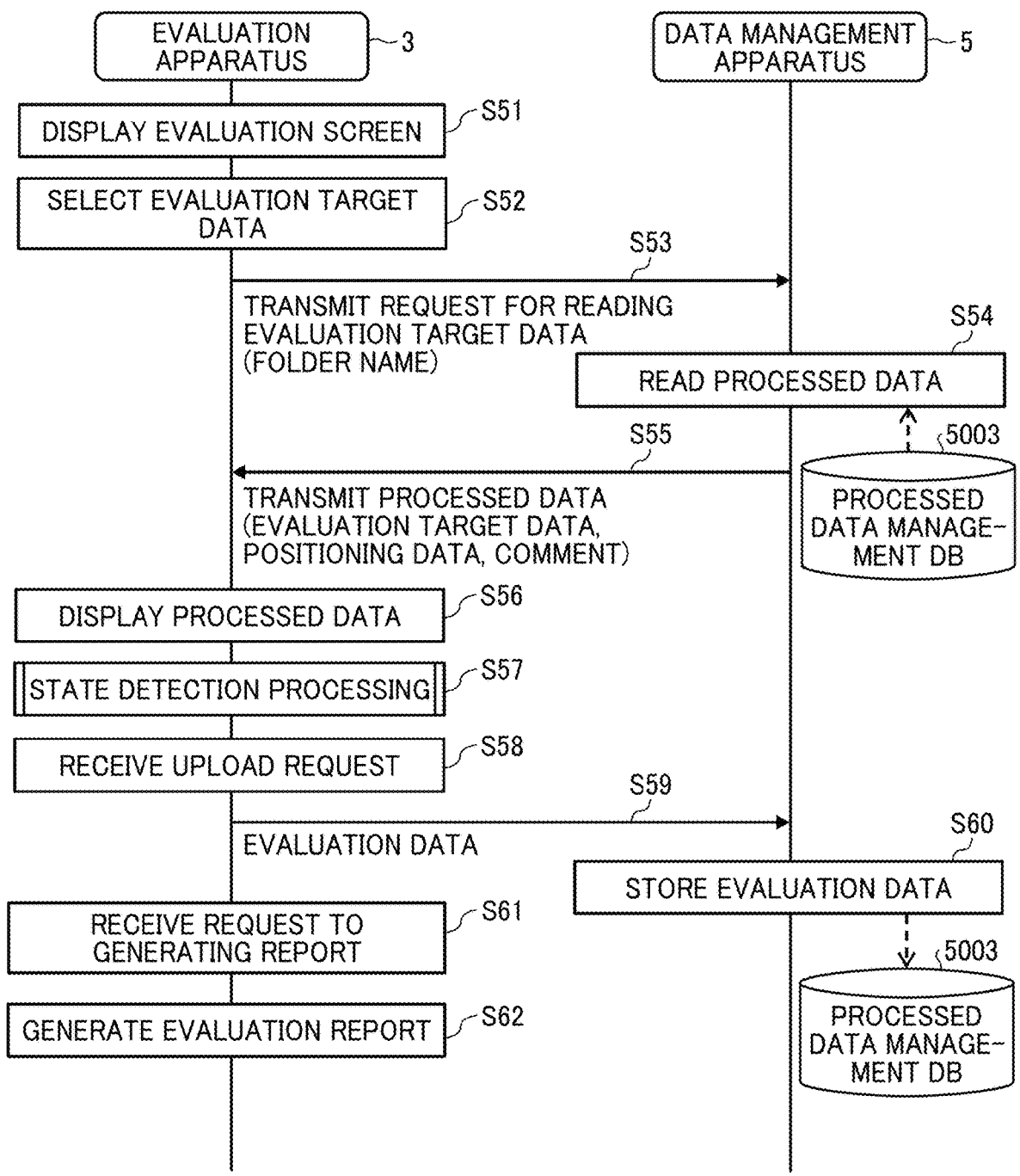
FIG. 15 is a sequence diagram illustrating an example of an operation of generating a report, which is an evaluation result of a slope state, according to an embodiment of the present disclosure.

FIG. 15 is a sequence diagram illustrating an example operation of generating a report, which is an evaluation result of a slope state.

The display control unit 33 of the evaluation apparatus 3 controls the display 306 to display the evaluation screen 400 for performing evaluation processing of the slope state (step S51).

The receiving unit 32 of the evaluation apparatus 3 receives a selection of the evaluation target data (step S52).

The communication unit 31 transmits a read request for requesting reading of the evaluation target data selected at step S52 to the data management apparatus 5 (step S53). This read request includes the folder name selected at step S52. Thus, the communication unit 51 of the data management apparatus 5 receives the read request transmitted from the evaluation apparatus 3.

The data storing and reading unit 59 of the data management apparatus 5 searches the processed data management DB 5003 (see FIG. 9B) using the folder name included in the read request received at step S53 as a search key, to read processed data associated with the folder name included in the read request (step S54). The communication unit 51 transmits the processed data read at step S54 to the evaluation apparatus 3 (step S55). The processed data includes the evaluation target data, the positioning data, and the comment. Thus, the communication unit 31 of the evaluation apparatus 3 receives the processed data transmitted from the data management apparatus 5.

The display control unit 33 of the evaluation apparatus 3 displays a screen based on the processed data received at step S54 on the display 306 (step S56).

The evaluation apparatus 3 performs detection processing of a slope state using the evaluation target data (step S57). The details of detection processing of a slope state is described below.

The receiving unit 32 receives an upload request for updating the evaluation result (step S58). The communication unit 31 uploads (transmits) the evaluation result to the data management apparatus 5 (step S59). Thus, the communication unit 51 of the data management apparatus 5 receives the evaluation data transmitted from the evaluation apparatus 3. The data management unit 53 of the data management apparatus 5 registers the evaluation data received at step S59 in the processed data management DB 5003 (see FIG. 9B) (step S60). In this case, the data management unit 53 stores the evaluation data in one folder in association with the evaluation target data on which the evaluation has been performed.

The receiving unit 32 receives a request for generating an evaluation report (step S61). The report generation unit 38 generates an evaluation report based on the detection result of the slope state by the detection unit 36 (step S62). The report generation unit 38 generates an evaluation report by arranging the evaluation data indicating the above-described evaluation result according to an inspection guideline issued by, for example, the government, in a format requested by the entity in charge of roads.

Figure 16:
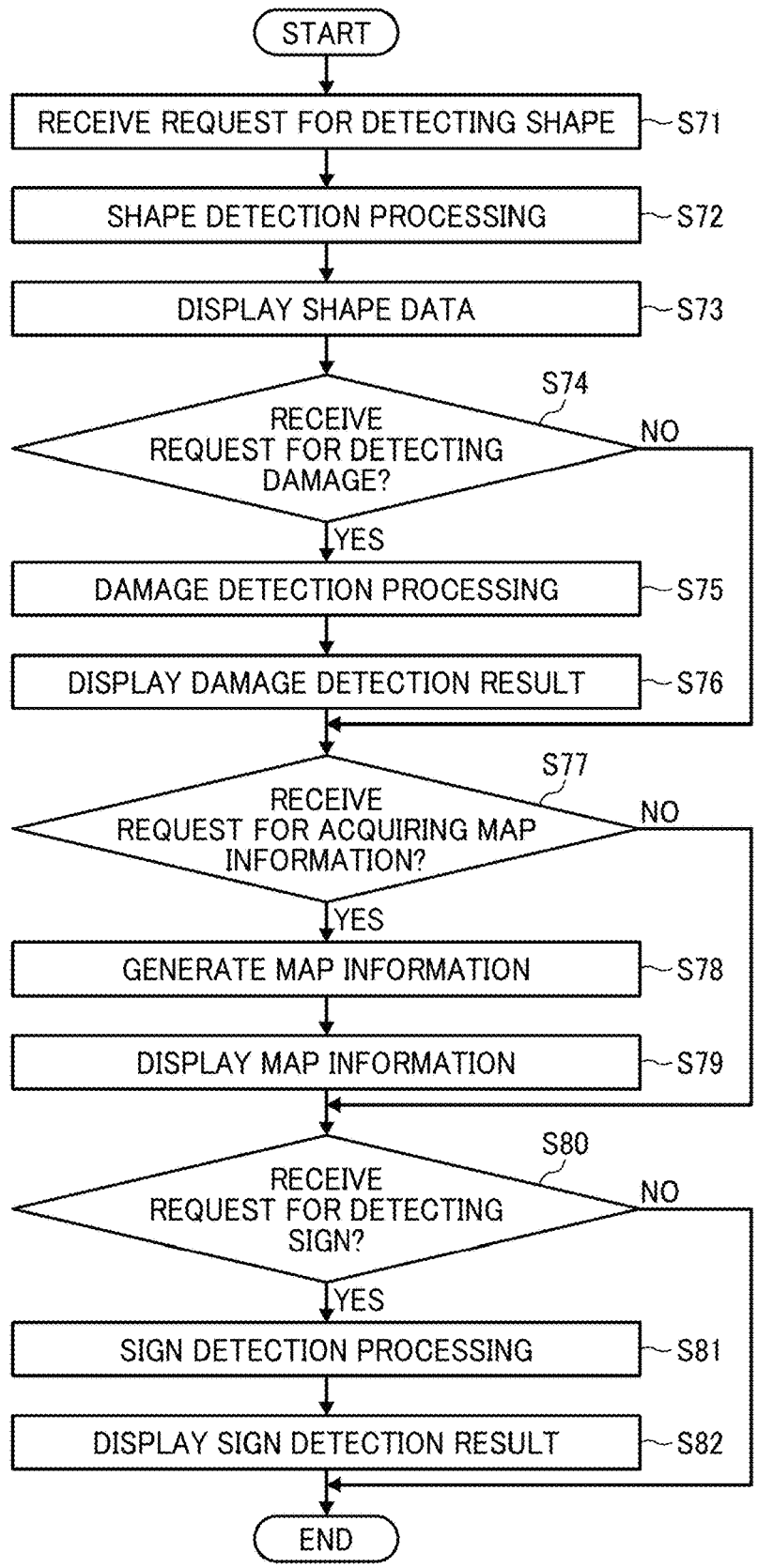
FIG. 16 is a flowchart of an example of detection processing of a slope state, according to an embodiment of the present disclosure.

Referring to FIG. 16, details of the detection processing of the slope state are described, according to the embodiment. FIG. 16 is a flowchart illustrating an example of the detection processing of the slope state.

The receiving unit 32 receives a shape detection request (step S71). The detection unit 36 performs shape detection processing using the evaluation target data (step S72). In this example, shape data indicating a shape of the slope is represented by, for example, three-dimensional information such as an extension, a height, and an inclination angle of the slope, and location information. The extension of the slope is represented by, for example, a length of the slope in a plan view, such as a length in a depth direction of a cross section based on which the inclination of the slope is recognizable. The shape data further includes information indicating the type of slope, i.e., whether the slope is a natural slope or an earthwork structure.

When the slope is an earthwork structure, the shape data includes information on the type of the earthwork structure. Examples of the type of an earthwork structure include, but are not limited to, a retaining wall, a slope retaining frame, mortar spraying, a presence or absence of an anchor, and an embarkment.

Specifically, the detection unit 36 detects the extension, the height, and the inclination angle of the slope based on the image data and the three-dimensional data included in the evaluation target data. Further, the detection unit 36 detects the type of the slope in an image, which is the evaluation target data, using the state type management DB 3001 (see FIG. 7). In this case, the detection unit 36 detects the type of the slope by image matching processing using the training images indicated in the state type management table.

The display control unit 33 displays the shape data, which is the detection result at step S72, on the display 306 (step S73). In steps S71 to S73 described above, "structure information detection" processing may be performed instead of the "shape detection" processing.

In this case, the receiving unit 32 receives a structure information detection request (step S71). The detection unit 36 performs structure information detection processing using the evaluation target data (step S72). Then, the display control unit 33 causes the display 306 to display the structure information detection information, which is the detection result at step S72 (step S73).

In this example, the structure information includes supplementary information of a structure in addition to the shape data described above. Specifically, the detection unit 36 determines the type of the slope in an image, which is the evaluation target data, and the type of the supplementary information of the slope, using the state type management DB 3001 (see FIG. 7 and FIG. 8), based on the image data and the three-dimensional data included in the evaluation target data. In this case, the detection unit 36 determines the type of the slope and the supplementary information of the slope by image matching processing using the training images indicated in the state type management table.

Next, in response to the receiving unit 32 receiving a damage detection request that requests detection of a damage of the slope state (YES at step S74), the operation proceeds to step S75. When the receiving unit 32 receives no damage detection request (NO at step S74), the operation proceeds to step S77. The detection unit 36 performs damage detection processing of a slope state on the evaluation target data (step S75).

In this example damage detection processing of the state of the slope, a presence or absence of deformation in the slope or a degree of the deformation is detected as damage data indicating a degree of damage of the slope. The degree of the deformation indicates a degree of deterioration of the deformation, such as a width of a crack, a size of a separation, or a size of a floating. The detection unit 36 detects the presence or absence of deformation in the slope or the degree of the deformation based on the image data and the sensor data included in the evaluation target data. Example of Evaluation Step Further, the detection unit 36 determines whether the degree of deformation exceeds a predetermined value using, for example, a detection equation that is set in advance for obtaining a degree of deterioration of deformation. In this case, the detection unit 36 determines, for example, whether the width of the crack is equal to or greater than a certain value, whether the size of the separation is equal to or greater than a certain value, or whether the floating is large (i.e., larger than a certain value).

Then, at step S36 of FIG. 14, the data management unit 53 of the data management apparatus 5 stores, in the processed data management DB 5003, coordinates of the damage position and the type of the damage in association with coordinates indicating the position in the X-axis direction and the Y-axis direction in the captured image data 7A illustrated in FIG. 11A.

The display control unit 33 controls the display 306 to display a display screen indicating the damage detection result at step S75 (step S76).

Figure 20:
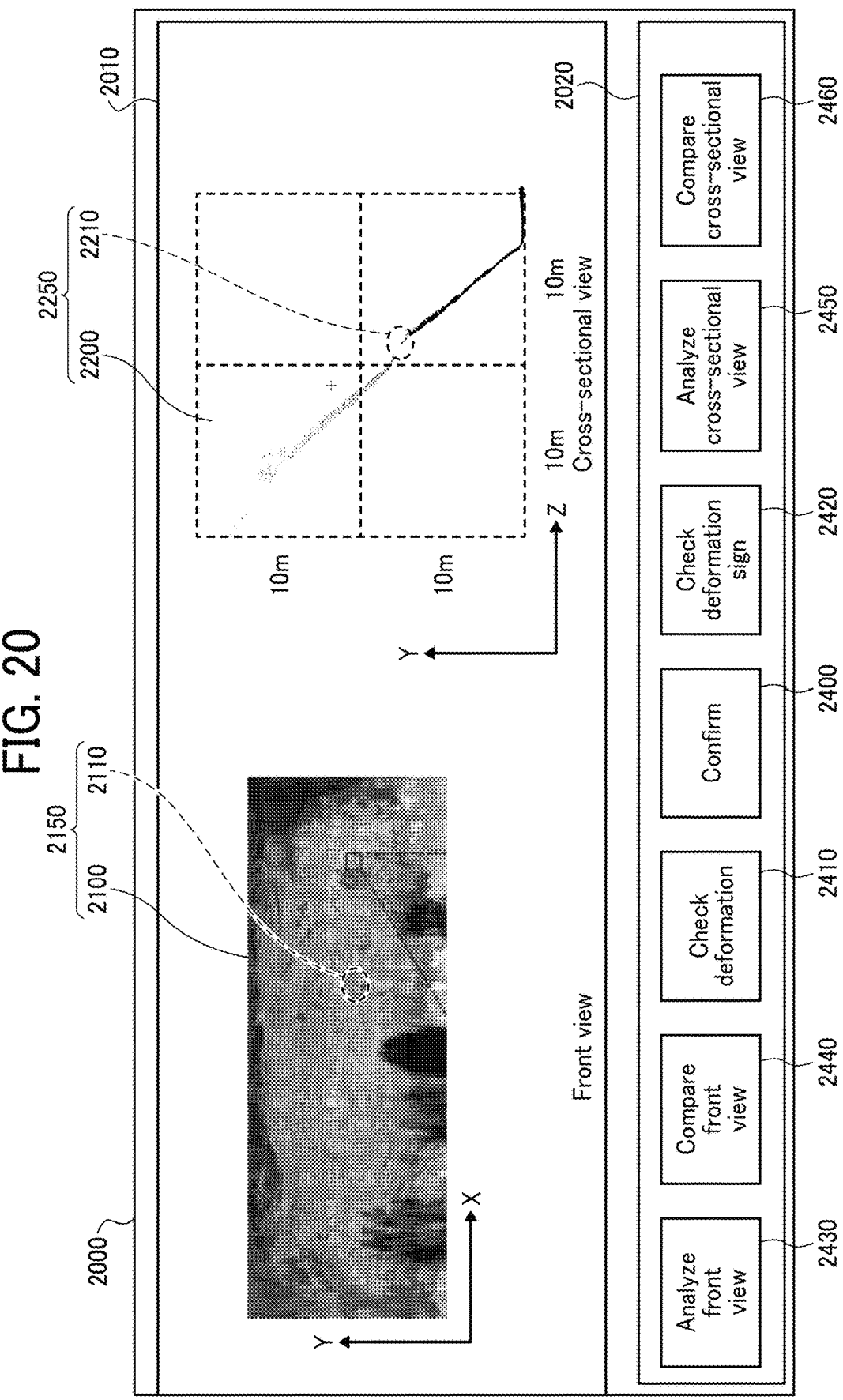
FIG. 20 is an illustration of an example of a display screen after processes described referring to FIG. 17, according to an embodiment of the present disclosure.

The display control unit 33 controls the display 306 to display a cross-section image. The cross-section image represents a cross-sectional view of the slope, as the evaluation target, drawn based on the shape data detected by the detection unit 36. The shape data is detected using the sensor data obtained by the distance sensor 8a (three-dimensional sensor), as illustrated in FIG. 20 as one example. Accordingly, three-dimensional information such as the inclination or height of the slope, which cannot be calculated only from the two-dimensional image, can be calculated from the cross-section image.

When a request for acquiring map information (map information acquisition request) is received at the receiving unit 32 (YES at step S77), the operation proceeds to step S78. By contrast, when the receiving unit 32 receives no map information acquisition request (NO at step S77), the operation proceeds to S80. The detection unit 36 generates map information indicating a location of the slope state as the evaluation target (step S78). Specifically, the detection unit 36 generates map information in which an image indicating the location of the slope is added to the location (north latitude, east longitude) indicated by the positioning data acquired at step S55, which corresponds to map data available using a predetermined service or application provided by, for example, an external web server. The map data provided from the external web server is managed by the map data management unit 37.

The display control unit 33 controls the display 306 to display the map information 490 generated at step S78 (step S79).

In response to the receiving unit 32 receiving a sign detection request that requests detection of a sign of a damage to the slope state (YES at step S80), the operation proceeds to step S81. By contrast, when the receiving unit 32 receives no sign detection request (NO at step S80), the operation ends.

The detection unit 36 performs sign detection processing of detecting a sign of a damage to the slope state on the evaluation target data (step S81).

As known in the art, when a deformation on a slope is observed, the state inspection system 1 identifies a state and a position of the deformation. However, information indicating a position where a deformation is likely to occur has not been measured before the deformation occurs on the slope. In the embodiment, in sign detection processing of detecting a sign of damage to a slope state, a sign of deformation of the slope is detected based on measurement data of the slope, which includes surrounding data indicating a physical quantity around the slope, as sign data indicating a sign of damage on the slope.

The measurement data includes captured image data obtained by photographing the slope by the image capturing device 7, or the sensor data obtained by measuring the slope by a three-dimensional sensor such as the distance sensor 8a. In other words, the measurement data includes measurement data regarding the subject for inspection (in this example, the slope).

The surrounding data includes measurement data of a subject other than the slope. The subject other than the slope includes, for example, at least one of inflow water, mud and sand, rocks, and plants.

When the measurement data includes the measurement data on the slope, and further includes surrounding data indicating occurrence of inflow water on the surface of the slope, there is a possibility that accumulated water are applying pressure from the back side of the slope. Thus, the presence of the sign of deformation of the slope is detected. Specifically, the presence of the sign of deformation of the slope is detected according to an amount, a type, and a position of inflow water in addition to the presence of the inflow water.

In a case where the measurement data of the slope includes surrounding data indicating plants and moss are growing on the surface of the slope, there is a possibility that accumulated water is occurring, generating pressure from the back side of the slope. Thus, the presence of the sign of deformation of the slope is detected at the detection unit 36. Specifically, the presence of the sign of deformation of the slope is detected according to amounts, types, and positions of plants and moss that are present.

In a case where the measurement data includes, in addition to the measurement data on the slope, surrounding data indicating fallen rocks, or earth and sand, around the slope, there is a possibility that abnormal phenomenon is occurring on the back side and the upper side of the slope. Thus, the presence of the sign of deformation of the slope is detected at the detection unit 36. Specifically, the presence of the sign of deformation of the slope is detected according to an amount, a type, and a position of fallen rocks or earth and sand that are present.

In a case where the measurement data includes, in addition to the measurement data on the slope, surrounding data indicating clogging of a drainage hole, a pipe, and a drainage channel in a small step, there is a possibility that drainage from the back side to the front side of the slope is blocked, and accumulated water are applying pressure from the back side of the slope. Thus, the presence of the sign of deformation of the slope is detected at the detection unit 36. Specifically, the presence of the sign of deformation of the slope is detected according to an amount, a type, and a position of foreign material that leads to the clogging that is present.

When a drainage hole, a pipe, or a drainage channel of small step itself is damaged, such damage is detected as a deformation of the slope. On the other hand, clogging of a drainage hole, a pipe, or a drainage channel of a small step is detected as a sign of deformation of the slope, rather than deformation of the slope.

With regard to the measurement data of a subject other than the slope described above, a sign of deformation of the slope may be detected according to a combination of multiple measurement data. Specifically, when there is surrounding data indicating that inflow water is occurring only in a small part of the slope and when moss spreads over the entire surface of the slope, inflow water is likely to spread over the entire surface of the slope. Thus, the presence of a sign of the deformation of the slope is detected.

The surrounding data includes measurement data of physical quantities other than those related to the subject. The measurement data of physical quantities other than the subject includes measurement data of light.

When the measurement data includes, in addition to the measurement data on the slope, surrounding data indicating the degree of sunshine, such surrounding data is used for detection of the presence of a sign of deformation of the slope in combination with the measurement data of the subject other than the slope. Specifically, in a case where moss grows in a sunny spot where the slope easily dries, there is a possibility that inflow water is occurring, and accumulated water is applying pressure from the back side of the slope. Thus, the presence of the sign of deformation of the slope is detected.

Through the sign detection processing of detecting a sign of damage of a slope state, a comment on a sign of deformation of the slope is generated, as the sign data indicating a sign of damage of the slope, based on the measurement data including the measurement data on the slope and the surrounding data indicating the physical quantity around the slope. At step S36 of FIG. 14, the data management unit 53 of the data management apparatus 5 stores, in the processed data management DB 5003, coordinates of the position of the sign of deformation and the comment in association with coordinates corresponding to the X-axis direction and the Y-axis direction in the captured image data 7A illustrated in FIG. 11A.

Specifically, based on the captured image data, which is an example of the acquired surrounding data, the sign detection processing refers to the training images in the state type management table illustrated in FIG. 8, to generate a comment indicating the type, the amount, and the position of the physical quantity around the slope such as inflow water. For example, a comment "moss rate 30%, growing mostly in the vicinity of a height of 3 to 20 m of the starting point" is generated.

Next, the display control unit 33 controls the display 306 to display a display screen indicating a result of the sign detection processing at step S81 (step S82).

The display control unit 33 controls the display 306 to display a cross-section image. Thus, the evaluation system 4 detects, as evaluation of the slope state, the shape of the slope including the three-dimensional information, the degree of damage to the slope, the sign of deformation of the slope, and the position of the slope as the evaluation target.

Figure 17:
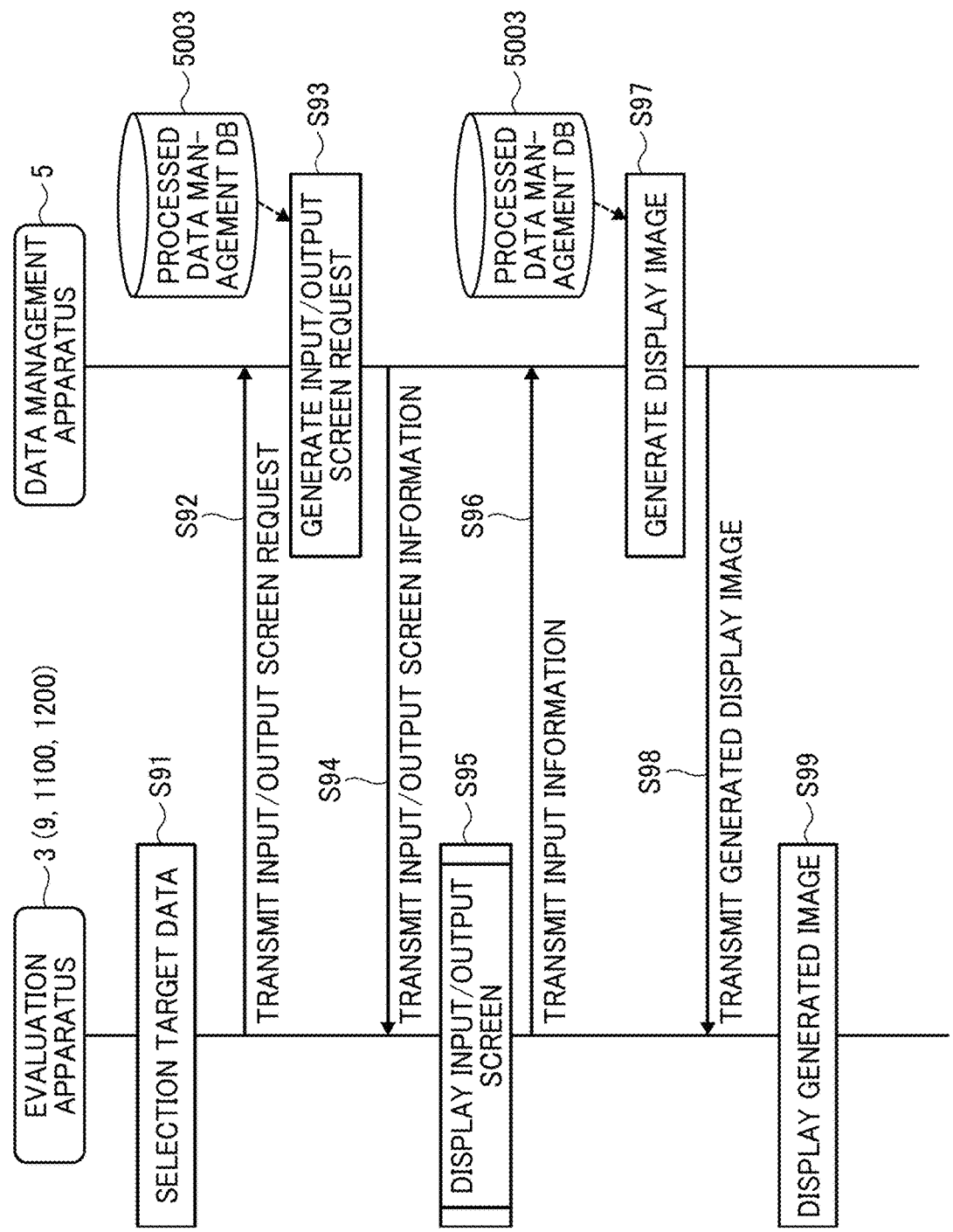
FIG. 17 is a sequence diagram illustrating an example of display operation performed by the state inspection system, according to an embodiment of the present disclosure.

FIG. 17 is a sequence diagram illustrating an example operation of displaying, performed by the state inspection system 1.

In the following, a sequence between the evaluation apparatus 3 and the data management apparatus 5 is described. The same or substantially the same sequence is performed between the data acquisition apparatus 9, the terminal apparatus 1100, and the terminal apparatus 1200 and the data management apparatus 5.

In response to designating of a desired folder by a user of the evaluation apparatus 3, the receiving unit 32 of the evaluation apparatus 3 receives selection of a target data (step S91). Alternatively, the user of the evaluation apparatus 3 selects a desired position in the map information managed by the map data management unit 37 of the evaluation apparatus 3. The receiving unit 32 of the evaluation apparatus 3 may then receive selection of location information in the map information.

The communication unit 31 transmits a request for an input/output screen relating to the target data selected at S91 to the data management apparatus 5. The communication unit 51 of the data management apparatus 5 receives the request for screen transmitted from the evaluation apparatus 3 (step S92). The request for screen includes a folder name of the folder selected at step S91. Alternatively, the request for screen may include the location information in the map information.

The storing and reading unit 59 of the data management apparatus 5 searches the processed data management DB 5003 (see FIG. 9B) using the folder name included in the request received at step S92 as a search key, to read image data associated with the folder name included in the request. Alternatively, the storing and reading unit 59 searches the acquired data management DB 5001 using the location information included in the request received at step S92 as a search key, to read image data associated with the location information included in the request.

The generation unit 54 of the data management apparatus 5 generates an input/output screen including the image data based on the image data read by the storing and reading unit 59 (step S93). The input/output screen is a screen for receiving an operation that instructs generation of an image, which indicates a specific position in a brightness image indicating a slope.

The communication unit 51 transmits input/output screen information of the input/output screen generated at step S93 to the evaluation apparatus 3. The communication unit 31 of the evaluation apparatus 3 receives the input/output screen information transmitted from the data management apparatus 5 (step S94). Step S94 is an example of a step of transmitting a generation reception screen.

The display control unit 33 of the evaluation apparatus 3 controls the display 306 to display the input/output screen based on the input/output screen information received at step S94 (step S95). The receiving unit 32 of the evaluation apparatus 3 receives an input operation by the user with respect to the displayed input/output screen. The input operation includes an instruction operation for instructing generation of an image indicating the specific position in the brightness image indicating the slope. Step S95 is an example of a receiving step.

The communication unit 31 transmits input information reflecting the input operation received by the receiving unit 32 to the data management apparatus 5. The communication unit 51 of the data management apparatus 5 receives the input information transmitted from the evaluation apparatus 3 (Step S96). The input information includes instruction information for instructing generation of an image indicating a specific position in the brightness image indicating the slope.

According to the received input information, the generation unit 54 of the data management apparatus 5 generates a display image using the image data read by the storing and reading unit 59 at step S93 (step S97).

The display image includes a surface display image and a cross-section display image. The surface display image includes a surface image indicating a surface of a slope and a surface position image indicating the specific position in the surface image. The cross-section display image includes a cross-section image indicating a cross-section of the slope and a cross-section position image indicating the specific position in the cross section image. Step S97 is an example of an image generation step.

The communication unit 51 of the data management apparatus 5 transmits the display image generated at step S97 to the evaluation apparatus 3. The communication unit 31 of the evaluation apparatus 3 receives the display image transmitted from the data management apparatus 5 (step S98). Step S98 is an example of a step of transmitting display image.

The display control unit 33 of the evaluation apparatus 3 controls the display 306 to display the display image received at step S98 (step S99). Step S99 is an example of a step of displaying.

Although the description provided above referring to FIG. 17 is of an example in which the display processing is performed between the evaluation apparatus 3 and the data management apparatus 5, in another example, the evaluation apparatus 3 may independently perform the above-described display processing.

In such case, steps S92, S94, S96, and S98 relating to data transmission and reception are omitted, and the evaluation apparatus 3 independently performs the processes of steps S91, S93, S95, S97, and S99, to perform the same display processing as described referring to FIG. 17. In the same or substantially the same manner to the evaluation apparatus 3, each of the data acquisition apparatus 9, the terminal apparatus 1100, and the terminal apparatus 1200 can also independently perform the display processing.

Figure 18:
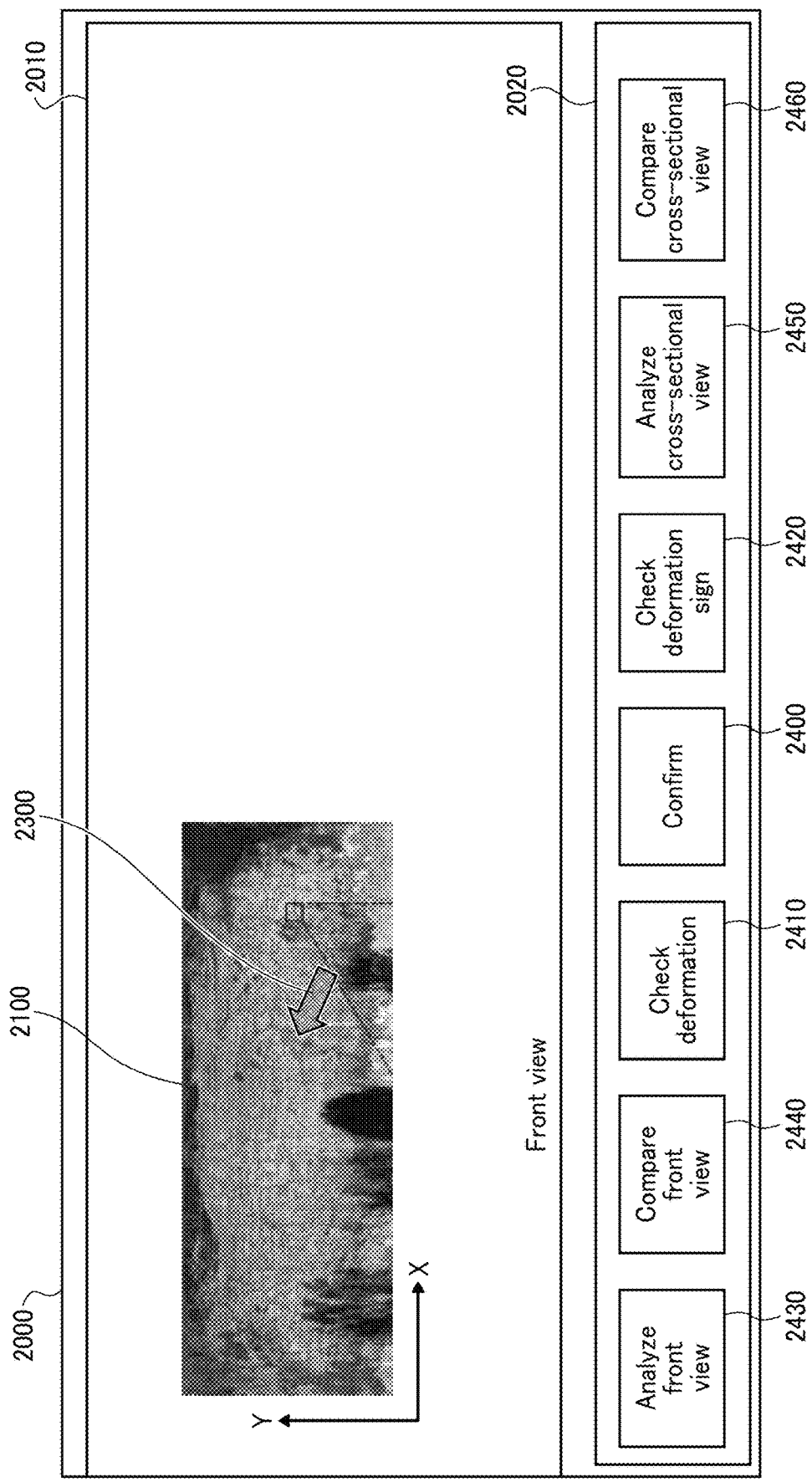
FIG. 18 is an illustration for describing an operation on a display screen of the state inspection system, according to an embodiment of the present disclosure.

Generation of Surface Display Image According to Operation Designating Particular Position:

FIG. 18 is an illustration for describing example operation on a display screen of the state inspection system 1. FIG. 18 illustrates an input/output screen 2000 displayed on the display 306 of the evaluation apparatus at step S95 of the sequence diagram of FIG. 17. The input/output screen 2000, displayed on a display of each of the data acquisition apparatus 9, the terminal apparatus 1100, and the terminal apparatus 1200, is substantially similar to the input/output screen 2000 displayed at the evaluation apparatus 3.

The display control unit 33 of the evaluation apparatus 3 controls the display 306 to display the input/output screen 2000 including a designation reception screen (window) 2010 and a generation instruction reception screen (window) 2020. The designation reception screen 2010 receives a designation operation for designating a particular position (location) on a brightness image representing a slope. The generation instruction reception screen 2020 receives an instruction operation for instructing generation of an image indicating the particular position on the slope.

The display control unit 33 controls the display 306 to display a surface image 2100 indicating a surface of the slope in the designation reception screen 2010, and to display on the surface image 2100 a pointer 2300 operated by the pointing device 312.

The surface image 2100 is a brightness image read, from the captured image data illustrated in FIG. 9A, at step S92 of FIG. 17. The display control unit 33 controls the display 306 to display the surface image 2100, in association with the captured image 1 and the captured image 2 illustrated in FIG. 10 and the coordinates in the X-axis direction and the Y-axis direction illustrated in the captured image data 7A illustrated in FIG. 11A.

The display control unit 33 controls the display 306 to display the generation instruction reception screen 2020 including a designated position confirmation button 2400, a deformation check button 2410, a deformation sign check button 2420, a front view analysis button 2430, a front view comparison button 2440, a cross-sectional view analysis button 2450, and a cross-sectional view comparison button 2460. The deformation check button 2410, the deformation sign check button 2420, the front view analysis button 2430, the front view comparison button 2440, the cross-sectional view analysis button 2450, and the cross-sectional view comparison button 2460 are buttons for instructing generation of an image indicating a particular position on the slope, the particular position being a position of an area satisfying a predetermined condition in the surface image 2100 or the cross-section image 2200.

The designated position confirmation button 2400 is a button for confirming the particular position on the slope designated on the designation reception screen 2010 and instruct to generate the image indicating the particular position on the slope. The designated position confirmation button 2400 may determine not only a position designated on the designation reception screen 2010, but also a position that is designated, for example, by the determination unit 52 and displayed on the designation reception screen 2010.

The deformation check button 2410 is a button for instructing generation of an image indicating a particular position on the slope, the particular position being a position indicating a deformation of the slope.

The front view comparison button 2440 is a button for instructing generation of an image indicating a particular position on the slope, the particular position being an area obtained by comparing the surface image 2100 with another image.

The cross-sectional view comparison button 2460 is a button for instructing generation of an image indicating a particular position on the slope, the particular position being an area obtained by comparing the cross-section image with another image.

Figure 19B:
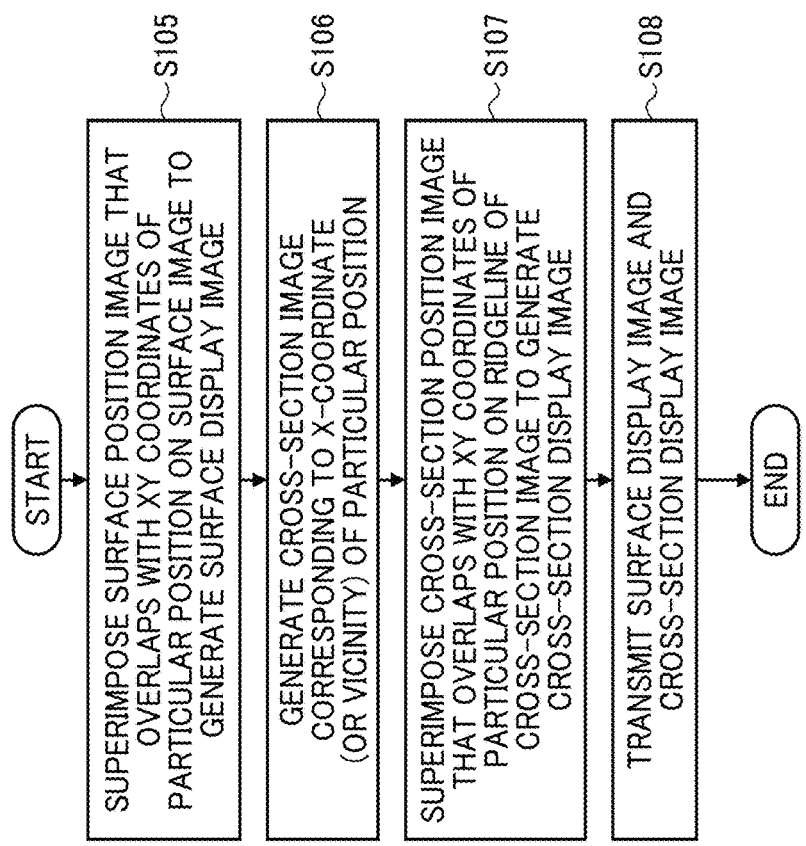
FIG. 19A and FIG. 19B are flowcharts illustrating processed based on an operation described referring to FIG. 18, according to an embodiment of the present disclosure.
Figure 19A:
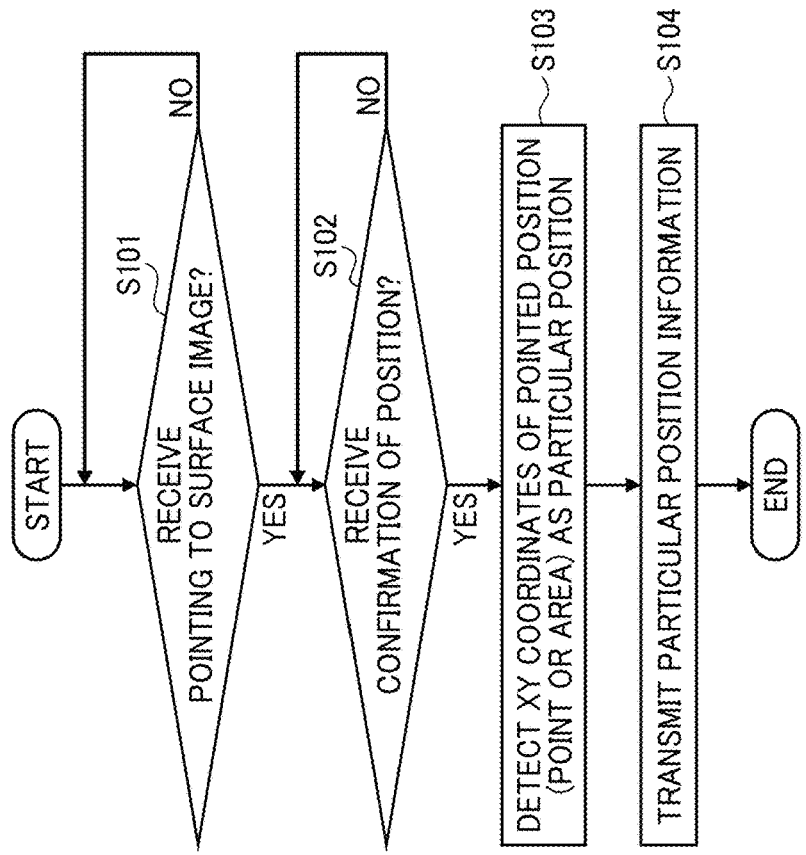

FIG. 19A and FIG. 19B are flowcharts illustrating processes based on the operation described referring to FIG. 18. FIG. 19A illustrates processes performed by the evaluation apparatus 3. FIG. 19B illustrates processes performed by the data management apparatus 5.

In response to pointing to a certain position on the surface image 2100 by the pointer 2300, the receiving unit 32 of the evaluation apparatus 3 receives the pointing operation (Yes at step S101). In response to an operation to the designated position confirmation button 2400, the receiving unit 32 receives the operation for confirming the position (Yes at step S102).

The determination unit 34 of the evaluation apparatus 3 detects XY coordinates of the pointed position on the surface image 2100 as a particular position (step S103). This particular position may indicate a point on the XY coordinates or may indicate an area on the XY coordinates.

The communication unit 31 of the evaluation apparatus 3 transmits input information relating to the input operation received by the receiving unit 32 to the data management apparatus 5 (step S104). The input information includes designation information and instruction information. The designation information designates the particular position in XY coordinates based on the pointing operation by the pointer 2300. The instruction information instructs generation of an image indicating the particular position on the slope according to an operation to the designated position confirmation button 2400. The instruction information is an example of a creation instruction.

The communication unit 51 of the data management apparatus 5 receives the input information transmitted from the evaluation apparatus 3. According to the instruction information and the designation information included in the received input information, the generation unit 54 generates a surface position image that overlaps the XY coordinates of the particular position and superimposes the surface position image on the surface image using the image data illustrated in FIG. 11A to generate a surface display image (step S105). The surface position image does not have to exactly match the XY coordinates of the specific position. It suffices that the surface position image overlaps the XY coordinates of the specific position.

The generation unit 54 generates the cross-section image corresponding to the X coordinate of the particular position using the image data illustrated in FIG. 11A and the distance measurement data illustrated in FIG. 11B (step S106). When the distance measurement data illustrated in FIG. 11B does not include the X coordinate of the specific position, the generation unit 54 generates the cross-section image based on data in the vicinity of the X coordinate of the specific position included in the distance measurement data illustrated in FIG. 11B.

The description provided above is of an example in which the generation unit 54 generates the cross-section image of a cross section including the Z-axis direction and the vertical direction illustrated in FIG. 10 at step S106. Alternatively, the generation unit 54 may generate the cross-section image of a cross section including directions inclined from the Z-axis direction and the vertical direction or the cross section image of a cross section including a direction inclined from the Z-axis direction.

The generation unit 54 generates a cross-section position image that overlaps the Y coordinates of the particular position and superimposes the cross-section position image on a ridgeline of the cross-section image, to generate the cross-section display image (step S107).

The communication unit 51 transmits the surface display image generated at step S107 and the cross-section display image generated at step S108 to the evaluation apparatus 3 (step S108).

Then, as described referring to steps S98 and S99 of FIG. 17, the communication unit 31 of the evaluation apparatus 3 receives the surface display image and the cross-section display image transmitted from the data management apparatus 5. The display control unit 33 of the evaluation apparatus 3 controls the display 306 to display the surface display image and cross-section display image, which are received.

FIG. 20 illustrates an example of a display screen displayed after the processes described referring to FIG. 19A and FIG. 19B. Specifically, FIG. 20 illustrates the input/output screen 2000 displayed on the display 306 of the evaluation apparatus 3 at step S99 of the sequence diagram of FIG. 17.

Content displayed in the generation instruction reception screen 2020 is the same as the content illustrated in FIG. 18. However, content displayed in the designation reception screen 2010 is different from that illustrated in FIG. 18.

The display control unit 33 of the evaluation apparatus 3 controls the display 306 to display a surface display image 2150 and a cross-section display image 2250 in the designation reception screen 2010. The surface display image 2150 includes a surface image 2100 indicating a surface of a slope and a surface position image 2110 indicating the particular position on the surface image 2100. The cross-section display image 2250 includes a cross-section image 2200 indicating a cross-section of the slope and a cross-section position image 2210 indicating the particular position on the cross-section image 2200.

The display control unit 33 displays the cross-section image 2200 in association with coordinates in the Y-axis direction and the Z-axis direction illustrated in FIG. 10.

The user can appropriately check and evaluate the state of the particular position by comparing the surface position image 2110 with the cross-section position image 2210.

Figure 21A:
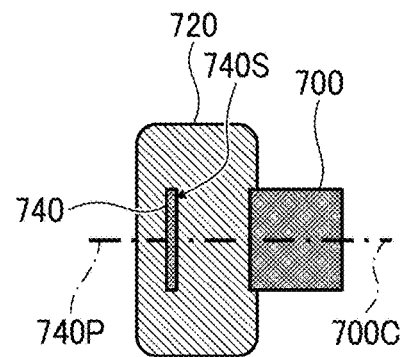
FIG. 21A to 21C are diagrams for explaining the depth of field, according to an embodiment of the present disclosure.
Figure 21B:
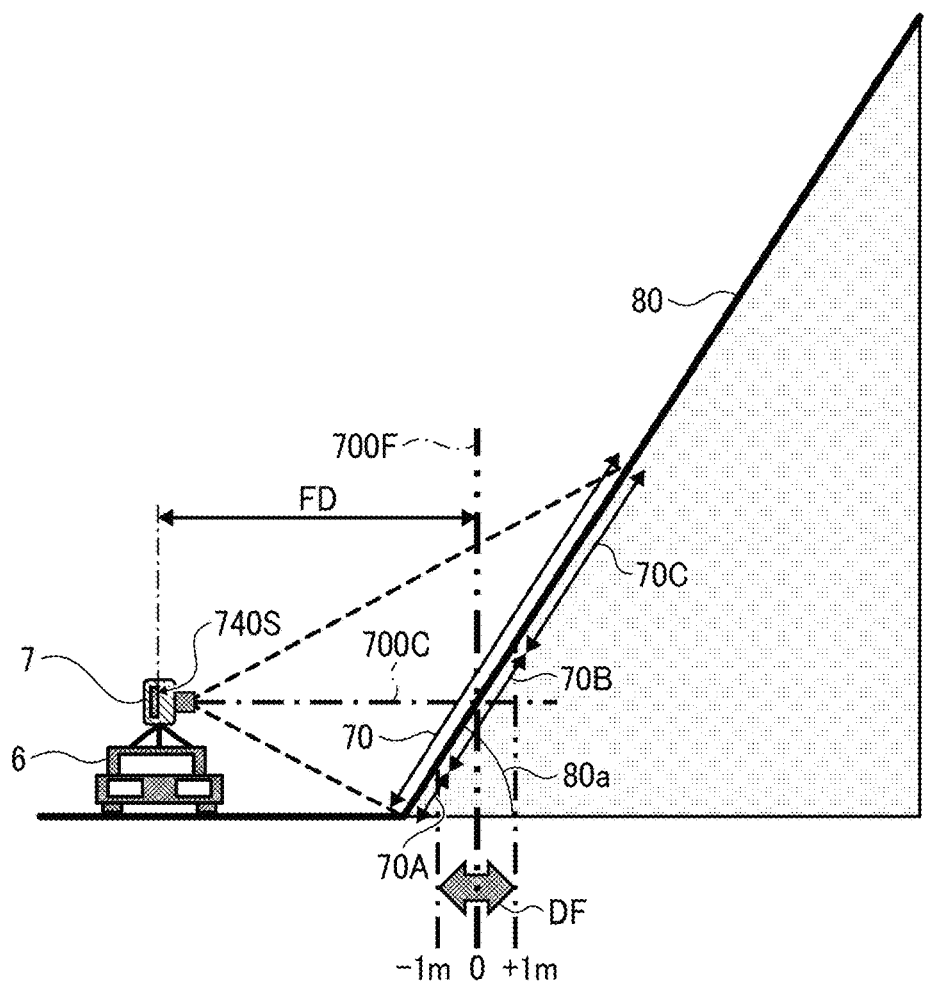

FIGS. 21A and 21B are diagrams for explaining the depth of field.

FIG. 21A illustrates a configuration of the image capturing device 7, according to the embodiment. The image capturing device 7 includes an imaging lens 700, an imaging sensor 740, and a body 720 holding the imaging sensor 740 and to which the imaging lens 700 is attached. A perpendicular line 740P to an imaging surface 740S of the imaging sensor 740 and a central axis 700C of the imaging lens 700 coincide with each other.

Figure 21C:
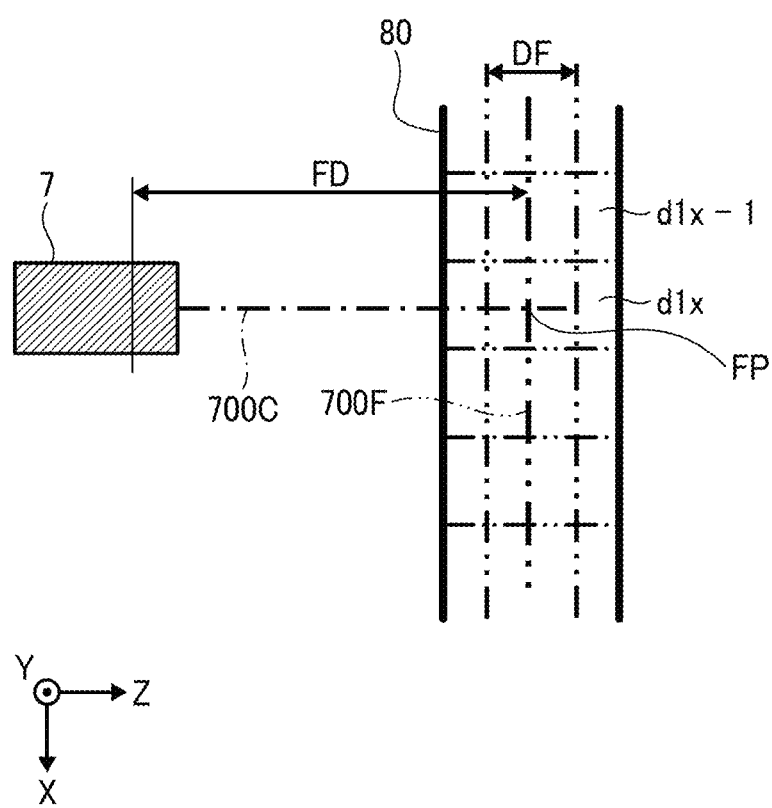

FIG. 21B illustrates a configuration in which the image capturing device 7 illustrated in FIG. 21A is mounted on the mobile apparatus 6, such that the central axis 700C of the imaging lens 700 is made horizontal to the ground surface. The image capturing device 7 captures an image of a slope 80, which is inclined at an inclination angle 80a. FIG. 21C is a view where the configuration illustrated in FIG. 21B is viewed from above.

Although in some cases the central axis 700C may be inclined with respect to the ground surface, it is assumed that the central axis 700C is horizontal to the ground surface for the descriptive purpose.

When the center of the captured image, i.e., an intersection point at which the central axis 700C of the imaging lens 700 and the slope 80 intersect, is set as a focus position, the subject having the highest degree of focus in the captured image, i.e., the most focused subject, would be a plane 700F. In other words, when the entire plane 700F is captured, with the distance from the imaging surface 740S of the imaging sensor 740 to the plane 700F being set as focus distance FD, the resultant captured image, captured by the entire imaging sensor 740, is in focus.

In the captured image, not only the plane 700F located at the focus distance appears in focus, but also a range front or back of the plane 700F located at the focus distance appears in focus. More specifically, with respect to the central axis 700C of the imaging lens 700, such range includes a range in the direction toward the imaging surface 740S of the imaging sensor 740 away from the plane 700F, and a range on the opposite side to the imaging surface 740S of the imaging sensor 740 with respect to the plane 700F. This range of distance is referred to as a depth of field DF.

When the depth of field DF is set to ±1 m, for example, in the captured image of a target area 70 (image capturing range) of the slope 80, a portion corresponding to a target area 70B in the range of ±1 m from the plane 700F appears to be in focus, but the other portions corresponding to target areas 70A and 70C appear to be out of focus, causing a blurred image. Although the depth of field is indicated as ±1 m in the drawing, ±1 m is an example value used for the descriptive purpose.

FIG. 21C illustrates only a part of the target area 70 (image capturing range) of the slope 80. The plurality of image capturing areas d11, d12, ... described referring to FIG. 12 are denoted as a plurality of image capturing areas d1x−1, d1x, ..., for simplicity. As illustrated in FIG. 21C, in each of the plurality of image capturing areas d1x−1, d1x, ..., a portion outside the depth of field DF of the captured image of the target area of the slope 80 can only produce a blurred image, as being out-of-focus.

The depth of field DF is a range, which may be determined based on: a configuration of the image capturing device 7, such as an area and a resolution of the imaging surface 740S of the imaging sensor 740, a resolving power of the imaging lens 700, and a focal length of the imaging lens 700; and settings at the time of image capturing, such as the focus distance FD indicated by the distance from the imaging surface 740S of the imaging sensor 740 to the plane 700F, and an aperture value of the imaging lens 700 at the time of image capturing. Of these values, the focus distance FD and the aperture value of the imaging lens 700 can be changed at the time of image capturing.

Accordingly, the depth of field DF becomes deeper (wider) as the focus distance FD becomes longer. In addition, the depth of field DF becomes deeper (wider) as the aperture of the imaging lens 700 is narrowed (the aperture value is increased).

When the target area 70 is captured, the focus distance FD and the aperture value are set so that the depth of field DF is as deep as possible under certain image capturing environment.

FIGS. 22A to 22C are diagrams for explaining one advantageous feature of the mobile apparatus system according to the embodiment.

As described referring to FIG. 10, the X-axis direction indicates a moving direction of the mobile apparatus 6, and the Y-axis direction indicates a vertical direction of the mobile apparatus 6. The Z-axis direction, which is orthogonal to the X-axis direction and the Y-axis direction, is a depth direction toward the slope from the mobile apparatus 6.

As illustrated in FIG. 22A, while traveling together with the mobile apparatus 6, the image capturing device 7 captures images of the target area 70, by dividing the target area 70 into a plurality of image capturing areas d11, d12, ... etc. at constant intervals t in the X-axis direction, which is the traveling direction of the mobile apparatus 6. The captured images obtained by capturing the plurality of image capturing areas d11, d12, ... are each a slit-like captured image elongated in the Y-axis direction. These captured images obtained by capturing the plurality of image capturing areas d11, d12, ... are combined so as to be continuous in the X-axis direction to obtain a captured image of the target area 70.

In this example, the surface of the slope 80 does not necessarily have the same shape in the X-axis direction. For example, for the slope 80, in halfway in the X-direction, the inclination angle 80a may change, unevenness may occur, a small step may be formed, or a plant may be observed.

In the example illustrated in FIGS. 22A to 22C, the slope 80 includes a first slope section 80A and a second slope section 80B having different inclination angles 80a from each other, at different positions (locations) in the X-axis direction.

FIG. 22B illustrates an example case in which the first slope section 80A is within the depth of field DF of the image capturing device 7, but the second slope section 80B is not within the depth of field DF of the image capturing device 7. FIG. 22C is a view when scenery of FIG. 22B is viewed from above.

In such state, a captured image of a portion of the second slope section 80B, which is not within the depth of field DF of the image capturing device 7, will be out of focus.

In order to prevent generation of such image, it is desired that the position of the imaging lens 700 is changed while capturing images, so that the second slope section 80A is within the depth of field DF, at a timing when the subject changes from the first slope section 80A to the second slope section 80B, as the mobile apparatus 6 travels.

However, if the imaging lens 700 is moved while capturing images as the mobile apparatus 6 travels, there is a possibility that one or more of the images captured in the plurality of image capturing areas may be out of focus.

Alternatively, the mobile apparatus 6 may stop driving to be parked near a boundary between the first slope section 80A and the second slope section 80B, to change the position of the imaging lens 700. Stopping the mobile apparatus 6 is not practical as stopping blocks the flow of traffic.

In view of the above, in this embodiment, the mobile apparatus system 60 and the image capturing method are provided, which captures the target area (image capturing range) on the slope 80, by dividing the target area into a plurality of image capturing areas d1 in the X-axis direction to which the mobile apparatus 6 travels, such that the plurality of captured images of the plurality of image capturing areas d1 are in focus even when a shape of the target area of the slope 80 changes in the X-axis direction.

Figure 23C:
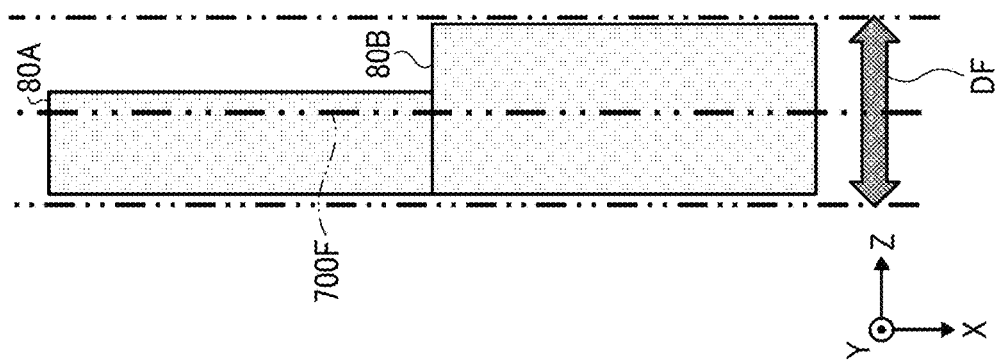
FIGS. 23A to 23C are diagrams illustrating a mobile apparatus system according to an embodiment of the present disclosure.
Figure 23B:
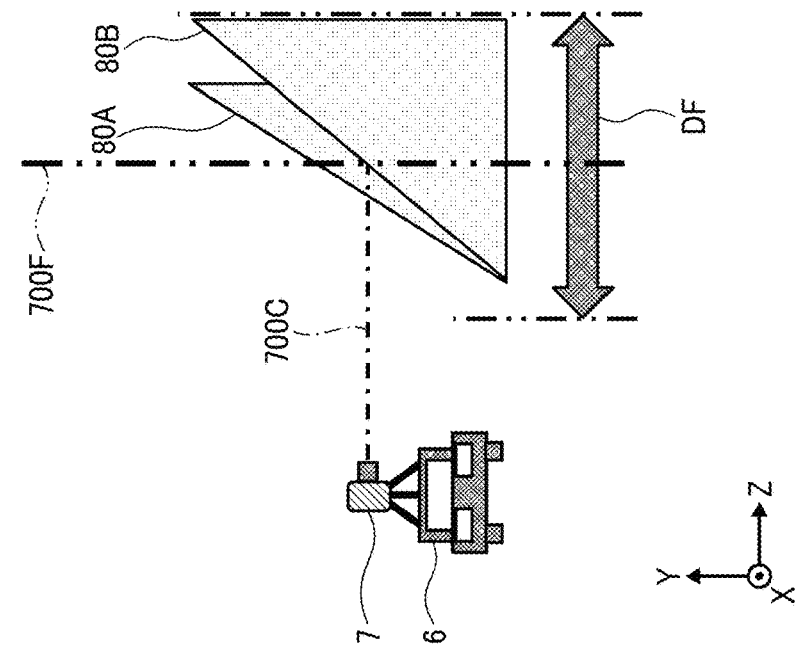
Figure 23A:
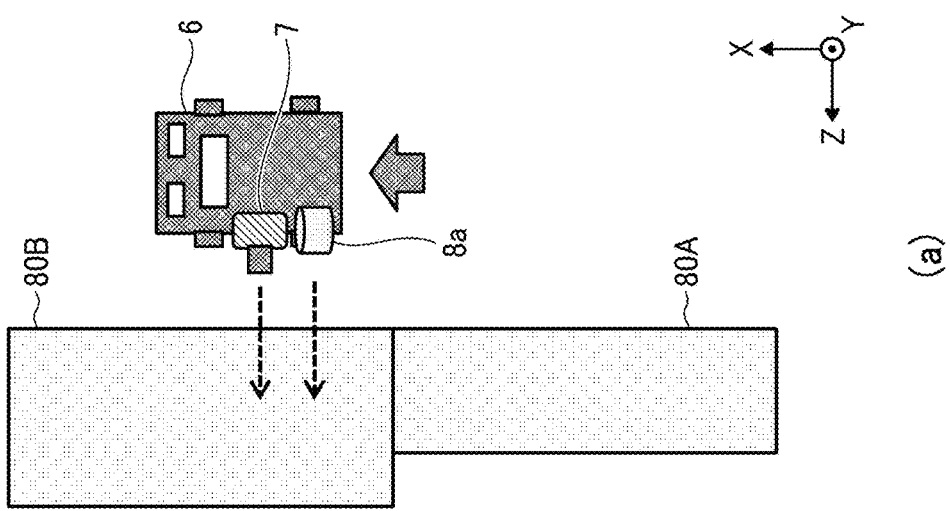

FIGS. 23A to 23C are diagrams illustrating a mobile apparatus system according to the embodiment.

In FIG. 23A, the distance sensor 8a acquires distance information indicating a distance from the distance sensor 8a, respectively, to the first slope section 80A and the second slope section 80B, at predetermined time intervals while moving together with the mobile apparatus 6.

FIG. 23B illustrates a state in which the focusing condition of the image capturing device 7 is determined based on the distance information acquired in FIG. 23A, so that the plurality of image capturing areas d1 on the first slope section 80A and the second slope section 80B are within the depth of field DF. FIG. 23C is a view when scenery of FIG. 23B is viewed from above.

In this embodiment, the focus distance FD, and elements (such as other parameters) that determine the depth of field DF at the time of image capturing, are collectively referred to as a focusing condition. Specifically, the focus distance FD is a distance from the imaging surface 740S of the imaging sensor 740, which is a reference position, to the target area 70 of the slope 80, which is an image capturing target (inspection or evaluation target). The elements that determine the depth of field DF is, for example, an aperture value of the imaging lens 700. The setting of the focus distance FD and the setting of the aperture value of the imaging lens 700 are collectively referred to as setting of a focusing condition, or simply as setting of a depth of field DF. The setting of the focus distance FD includes setting of a focus position FP in the target area 70 of the slope 80, which is an image capturing target (inspection or evaluation target).

Under the focusing condition set so that the plurality of image capturing areas d1 on the first slope section 80A and the second slope section 80B are included in the depth of field, the image capturing device 7, while moving with the mobile apparatus 6, captures the plurality of image capturing areas d1 so as to be included in the depth of field.

Accordingly, even when the slope 80 includes the first slope section 80A and the second slope section 80B having different inclination angles 80a at different positions in the X-axis direction, the plurality of image capturing areas d1, which are captured in the moving direction of the mobile apparatus 6, are included in the depth of field DF, without the image capturing device 7 changing the focusing condition during the movement.

Thus, the plurality of captured images obtained by capturing the plurality of image capturing areas d1 are each an in-focus image. The plurality of captured images are then combined into a captured image in which the entire first slope section 80A and the entire second slope section 80B are in focus.

Figure 24B:
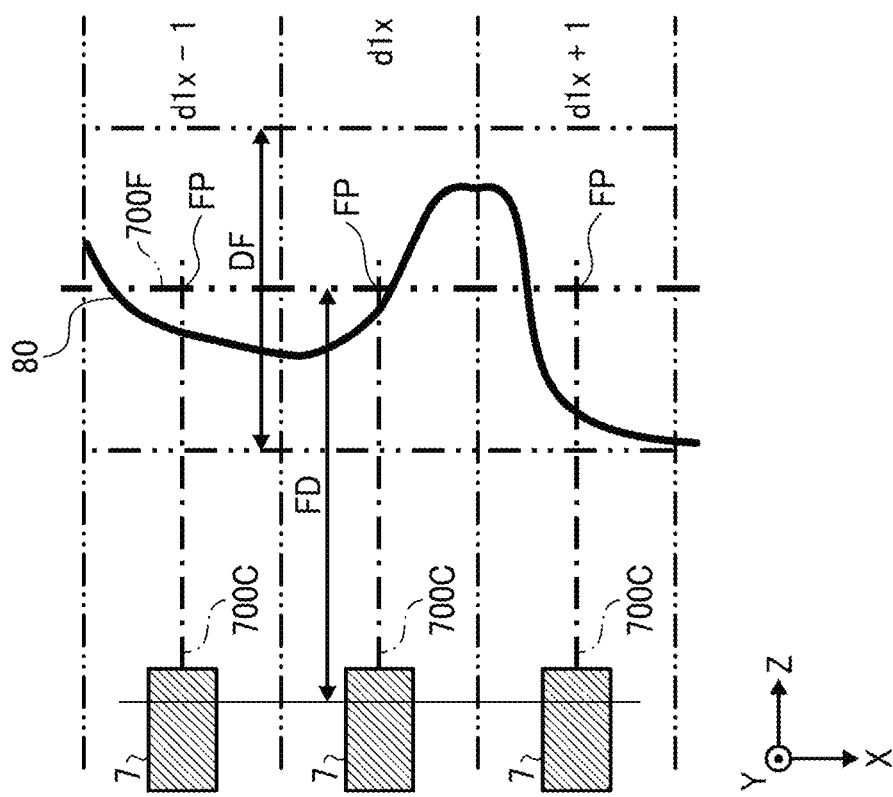
FIGS. 24A and 24B are diagrams for explaining advantageous feature of the mobile apparatus system according to an embodiment of the present disclosure.
Figure 24A:
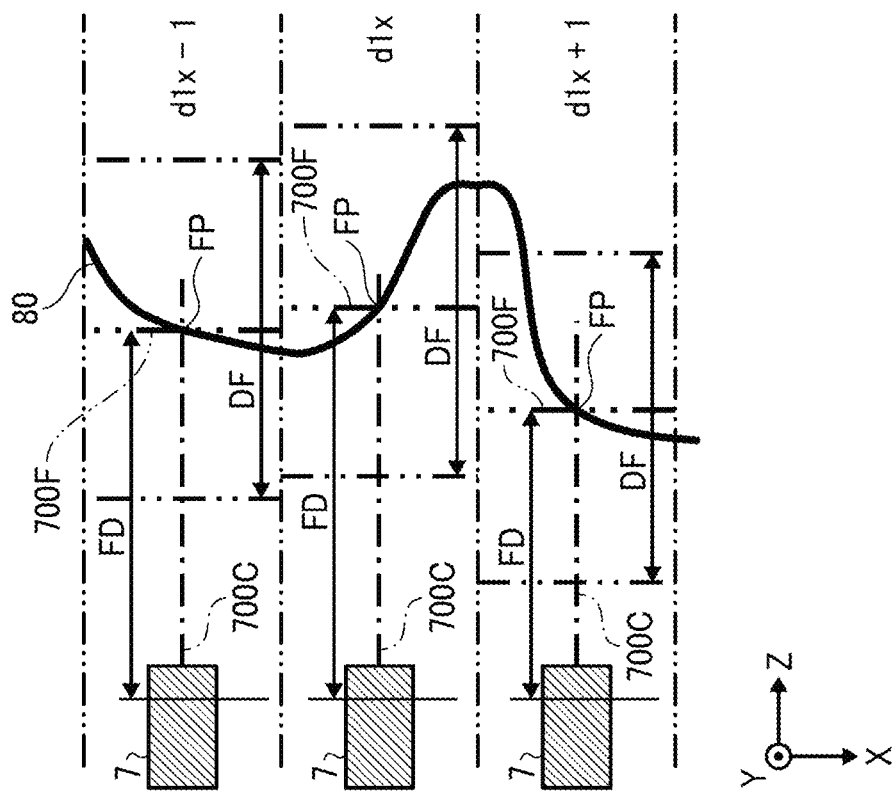

FIGS. 24A and 24B are diagrams for explaining another advantageous feature of the mobile apparatus system according to the embodiment. FIGS. 24A and 24B each illustrates only a part of the target area 70 of the slope 80. The plurality of image capturing areas d11, d12, . . . described referring to FIG. 12 are denoted as a plurality of image capturing areas d1x−1, d1x, d1x+1 . . . , for simplicity.

FIG. 24A illustrates a state in which each of the captured images of the plurality of image capturing areas d1x−1 to d1x+1 is in focus, such that the target area 70 of the slope 80 that is captured is within the depth of field DF.

In this case, a plurality of captured images corresponding to the plurality of image capturing areas d1, which are focused, can be obtained. However, the focus distance FD is different for each of the captured images of the plurality of image capturing areas.

For this reason, when the captured images of the plurality of image capturing areas are stitched together, the resultant image may have an unnatural look as a whole, since the in-focus states of adjacent captured images, that is, the focus distances FD, are different from each other. Thus, the detection unit 36 of the evaluation apparatus 3 or a user may not appropriately detect or evaluate the degree of deformation of the slope.

FIG. 24B illustrates a state in which the focus distance FD is set, such that the entire target area 70 is within a single depth of field DF, instead of changing the focus distance FD for each of the plurality of image capturing areas d1x−1 to d1x+1.

In this case, the focus distance FD of each of the captured images of the plurality of image capturing areas is made the same. That is, the focus distance when capturing the plurality of image capturing areas d1 is set to be a focus distance common to the plurality of image capturing areas d1 in the target area. Not only when each of the captured images of the plurality of image capturing areas is viewed alone, but also when the captured images of the plurality of image capturing areas are stitched and viewed as the entire target area 70, the resultant image has a natural look. Thus, the detection unit 36 of the evaluation apparatus 3 or the user can appropriately detect or evaluate the degree of deformation of the slope.

Figure 25B:
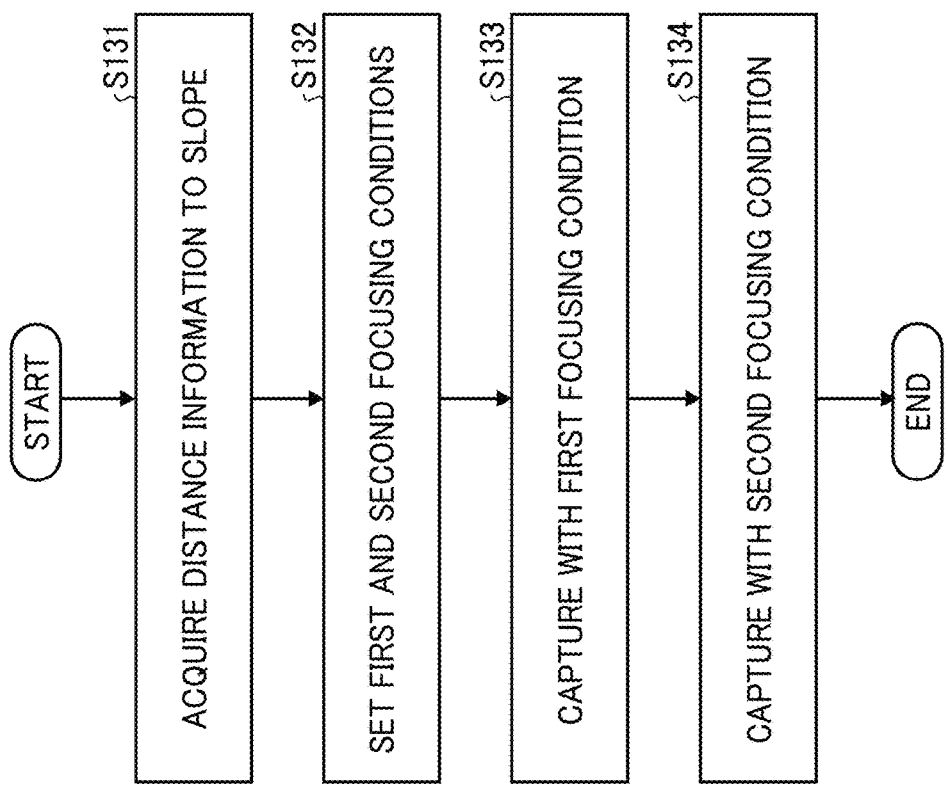
FIGS. 25A and 25B are flowcharts illustrating a method of capturing images under the focusing condition, according to an embodiment of the present disclosure.
Figure 25A:
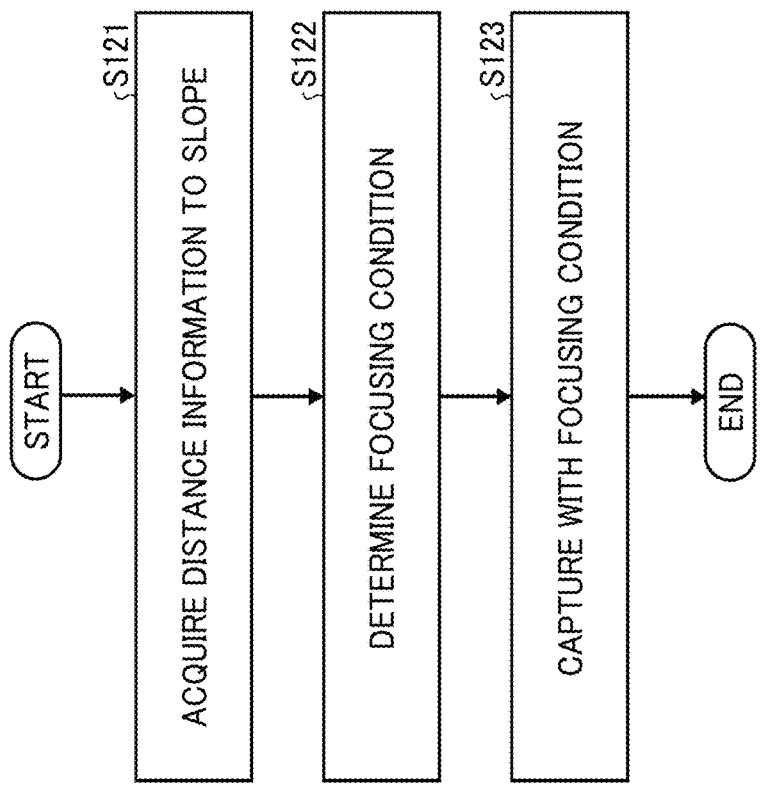

FIGS. 25A and 25B are flowcharts illustrating a method of setting (determining) the focusing condition, and capturing images under the above-described focusing condition, according to the embodiment. FIG. 25A is a flowchart illustrating operation of capturing images, performed by the data acquisition apparatus 9, as described above referring to FIGS. 23A to 23C, and 24A to 24B.

As described with reference to FIG. 23A, the distance sensor 8a acquires distance information indicating a distance from the distance sensor 8a to the slope 80, at predetermined time intervals while moving together with the mobile apparatus 6. That is, as illustrated in FIG. 11B, for each coordinate corresponding to the X-axis direction and the Y-axis direction, the distance sensor 8a acquires distance information indicating a distance in the Z-axis direction from the distance sensor 8a, which is an example reference position, to the slope 80 (step S121). The distance information indicates a distance from the reference position to the slope 80 in a direction orthogonal to the moving direction of the mobile apparatus 6, at a time when capturing the plurality of image capturing areas d1 with the image capturing device 7.

In this embodiment, the origin in the X-axis direction is, for example, an edge of the slope 80 in the direction opposite to the moving direction of the mobile apparatus 6. The origin in the Y-axis direction is, for example, a surface of a road on which the mobile apparatus 6 travels. The origin in the Z-axis direction is, for example, the position of the distance sensor 8a that moves together with the mobile apparatus 6.

The distance information may not only be acquired by the distance sensor 8a mounted on the mobile apparatus 6 illustrated in FIG. 23A, such that it may be acquired by a portable distance sensor or a sensor other than the ToF sensor. Alternatively, when the three-dimensional information of the slope 80 is known from a topographic map, for example, the distance information in the Z-axis direction from the lower end of the slope 80, which is another example of the reference position, to the slope 80 may be calculated and acquired for each coordinate corresponding to the X-axis direction and the Y-axis direction as illustrated in FIG. 11B with the lower end (for example, toe) of the slope 80 being an origin in the Z-axis direction. Another example of the origin in the Z-axis direction and the reference position, may be an edge of the roadway on which the mobile apparatus 6 travels, facing the slope 80.

Further, step S121 may be executed immediately before step S123 of capturing by the image capturing device 7 to be described later, or may be executed, for example, one day or more before step S123 is performed. The distance information and/or information on the scheduled travel path for the plurality of image capturing areas in a certain target area may be stored in any desired memory, so that the controller 900 (CPU 911) is able to refer to this information to calculate, for example, the focus distance FD commonly used for capturing the plurality of image capturing areas in the target area, as the focusing condition to be set. As described above, for example, any other parameters, such as an aperture value of the imaging lens 700, which can determine the focusing condition or the depth of field, may be obtained.

Based on the distance information acquired at step S121 and the scheduled travel path of the image capturing device 7 that moves together with the mobile apparatus 6 at the next step S123, a focusing condition in which the plurality of image capturing areas d1 of the slope 80 are within the depth of field DF, is set to the image capturing device 7 (step S122). S122 is performed by the controller 900 having the function of the image capturing device control unit 93.

Specifically, as described with reference to FIG. 24B, for example, the focusing condition is set to the image capturing device 7, such that the focus distance FD at the time of capturing the plurality of image capturing areas d1 is set to the focus distance that is common to the plurality of image capturing areas d1 and causes all of the plurality of image capturing areas d1 be within the depth of field DF.

In this embodiment, the scheduled travel path of the image capturing device 7 is specified by the position with respect to the origin in each of the Y-axis direction and the Z-axis direction. Since it is practically difficult to exactly follow the scheduled travel path at the time of capturing images, the actual travel path at the time of capturing images is assumed to vary from the scheduled travel path within a certain range. The depth of field DF is set, considering the fact that the travel path at the time of capturing images is within this certain range.

In this embodiment, the focusing condition (such as the focus distance, the aperture value, etc.), are stored in any desired memory at least temporarily, so that the image capturing device 7 is able to refer to the focusing condition when capturing the plurality of image capturing areas d1.

Subsequently, the image capturing device 7 captures the plurality of image capturing areas d1 so as to be included in the depth of field DF, under the focusing condition set at step S122 (step S123).

In the case where the mobile apparatus 6 is a vehicle (for example, railway) that moves on a track, it is easy to match the travel path at the time of capturing images with the scheduled travel path obtained at step S122. In the case where the mobile apparatus 6 is an automobile, it is desirable that the mobile apparatus 6 travels so that the travel path at the time of capturing images does not deviate from the scheduled travel path obtained at step S122 to stay within the certain range.

Accordingly, the plurality of image capturing areas d1, which are captured in the moving direction of the mobile apparatus 6, are included in the depth of field DF, without changing the focusing condition during the movement.

In the present embodiment, as described with reference to FIG. 10, at step S123, the acquisition of the captured image by the image capturing device 7 and the acquisition of the distance measurement image by the distance sensor 8a are performed concurrently, so that these operations are synchronized.

Based on the distance measurement image acquired by the distance sensor 8a at this step S123, the distance information to be used at step S121 for the next processing of capturing the target area of the same slope 80 may be acquired.

In this embodiment, the distance information is acquired at S121 to set the depth of field DF. The distance measurement image is acquired at step S123 to inspect the target area of the slope 80. Therefore, the distance measurement image acquired at step S123 requires higher accuracy and higher resolution than those of the distance information used for setting the depth of field.

Further, by comparing the distance information acquired at step S121 with the distance measurement image acquired at step S123, the change in shape of the slope 80 can be detected, for example, from the shape of the slope 80 when the distance information acquired at step S121 is measured, to the shape of the slope 80 when the image is captured at step S123. For example, it is possible to detect that a collapse occurs on the slope 80, causing the change in shape of the slope 80, after the distance information acquired at step S121 is measured.

By detecting the change in shape of the slope 80, it becomes possible to know that the plurality of image capturing areas d1 captured at step S123 are deviated from the depth of field, as the shape of the slope 80 greatly changes. In such case, through repeating steps S122 to S123, while using the distance measurement image as the distance information for determining the focusing condition, the plurality of image capturing areas d1 are caused to be within the depth of field. This processing is performed under control of the controller 900.

FIG. 25B is a flowchart illustrating operation of capturing images, differently from the operation described referring to FIGS. 23A to 23C and 24A to 24B. The following describes a case that the setting range of the depth of field DF has an upper limit. The upper limit of the setting range of the depth of field DF with respect to the focus distance FD will be described.

As the focus distance FD increases, the depth of field DF increases. In other words, the focus distance FD increases, when the distance from the imaging surface 740S of the imaging sensor 740, which is the reference position, to the target area 70 of the slope 80, which is the image capturing target (inspection or evaluation target), increases. More specifically, the depth of field DF increases, as the travel path of the mobile apparatus 6 is made away from the slope at the time of image capturing.

However, since the inspection target becomes smaller as the distance from the slope 80 increases, there is an upper limit in increasing the distance to the target area 70 of the slope 80, which is an image capturing target (inspection or evaluation target). In addition, when the mobile apparatus 6 is a vehicle traveling on a road, there is a restriction such as a width of a roadway. In the case where the mobile apparatus 6 is a railway that moves on a track, it is impossible to change the travel path.

In the following, the upper limit of the setting range of the depth of field DF related to the aperture value of the imaging lens 700 will be described.

The aperture value is set, such that the target area 70 of the slope 80, which is an image capturing target (inspection or evaluation target), is captured with appropriate brightness. That is, the aperture value is set to achieve a desirable exposure amount at the time of image capturing. There is an upper limit to the aperture value. The aperture value can be lowered by increasing exposure time, or increasing the sensitivity of the imaging sensor 740. However, there is also an upper limit to the aperture value.

As described above, in some cases, there is an upper limit in the setting range of the depth of field DF. Due to this limit, when the difference in the inclination angle 80a between the first slope section 80A and the second slope section 80B, illustrated in FIGS. 22A to 22C and 23A to 23C is large, all of the plurality of image capturing areas d1 on the slope 80 may not fit within the depth of field under a single focusing condition. When the target area 70 is captured at a common focus distance, at least one of the plurality of image capturing areas d1 in the target area 70 may not be within the depth of field.

In view of this, when there is a restriction to the setting range of the depth of field, the processing of FIG. 25B may be performed.

Referring to FIG. 25B, similarly to step S121, the distance sensor 8a acquires distance information indicating a distance in the Z-axis direction from the distance sensor 8a, which is an example of a reference position, to the slope 80 (step S131). As described above, the distance information may be acquired using a sensor other than the ToF sensor, or based on three-dimensional information of the slope 80 that is previously obtained.

For example, as described above referring to FIG. 24, when the difference between a distance to the first slope section 80A and a distance to the second slope section 80B is large (that is, greater than a preset value), all of the plurality of image capturing areas d1 on the slope 80 may not fit within the depth of field under a single focusing condition, that is, a single focus distance.

In view of this, a first focusing condition of the image capturing device 7 is set, such that a first group of image capturing areas corresponding to the first slope section 80A are within the depth of field DF, based on the distance information acquired at step S131 and the scheduled travel path of the image capturing device 7 that moves together with the mobile apparatus 6 in subsequent steps. Further, a second focusing condition, different from the first focusing condition, of the image capturing device 7 is set, such that a second group of image capturing areas d1 corresponding to the second slope section 80B are within the depth of field DF (step S132).

Specifically, under the first focusing condition, a first focus distance is set to a common focus distance commonly used for capturing the first group of image capturing areas, such that the first group of image capturing areas included in the first slope section 80A all be within the depth of field DF. Similarly, under the second focusing condition, a second focus distance is set to a common focus distance used for capturing the second group of image capturing areas (different from the first group), such that the second group of image capturing areas included in the second slope section 80B all be within the depth of field DF.

Subsequently, under the first focusing condition set at step S132, the image capturing device 7 captures images of the first group of the image capturing areas d1, corresponding to the first slope section 80A (step S133).

Then, after capturing by the image capturing device 7 at step S133 is completed, under the second focusing condition set at step S132, the image capturing device 7 captures images of the second group of the image capturing areas d1, corresponding to the second slope section 80B (step S134).

While changing the focusing condition is preferable in some cases, as described above, when the focusing condition is changed as the mobile apparatus 6 travels, there is a possibility that an unfocused image is captured. When the mobile apparatus 6 stops in vicinity of the boundary between the first slope section 80A and the second slope section 80B to change the focusing condition, traffic is disturbed. In view of this, steps S133 and S134 are executed by causing the mobile apparatus 6 to travel along the slope 80 twice.

When the target area 70 is captured at a common focus distance, at least one of the plurality of image capturing areas d1 in the target area 70 may not fall within the depth of field. In view of this, for each of the first group of image capturing areas and the second group image capturing areas in the target area 70, the image capturing areas d1, which are captured in the moving direction of the mobile apparatus 6, are included in the depth of field DF, without changing the focusing condition during the movement.

Accordingly, through capturing each of the first group of image capturing areas and the second group of image capturing areas in the target area 70 as described above, the plurality of captured images having the same in-focus state, which correspond to the plurality of image capturing areas d1, are obtained.

FIGS. 26A and 26B are diagrams for explaining the image capturing device 7, having its tilt angle set.

FIG. 26A illustrates a configuration of the image capturing device 7 according to the embodiment. In this embodiment, a tilt angle θ representing an angle between a perpendicular line 740P perpendicular to a sensor surface of the imaging sensor 740 and a central axis 700C of the imaging lens 700, is set to a value other than 0 degree. In the following, the expression "the tilt angle θ is set" is used to mean "the tilt angle θ is set to a value other than 0 degree".

The image capturing device 7 is an example of a special camera in which the entire planes diagonally facing each other are viewed in focus, and is called a "tilt camera", a "tilt-mount camera", or a "Scheimpflug camera".

FIG. 26B illustrates a configuration in which the image capturing device 7 of FIG. 26A is mounted on a roof of an automobile, which is the mobile apparatus 6. In this case, the tilt angle θ is obtained by the following equation 1.

$$\mathrm{TAN}(\theta) = \beta \times \mathrm{TAN}(\alpha) \qquad \text{Equation 1:}$$

β represents a magnification of the imaging lens 700. α represents an angle formed by the central axis 700C of the imaging lens 700 and the slope 80. β is determined by a focal distance of the imaging lens 700 and a distance D between the image capturing device 7 and the slope 80. In Equation 1, α=90−(inclination angle 80a of the slope 80).

As illustrated in Equation 1, the tilt angle θ is set according to the angle α between the central axis 700C of the imaging lens 700 and the slope 80. As illustrated in FIG. 26B, the entire target area 70 can be set to a plane 700F, where the imaging lens 700 can capture an image that is mostly focused. In other words, an image can be captured, which shows a wide area of the slope 80 in focus.

Further, since the depth of field extends in the front-rear direction perpendicular to the plane 700F, even if the mobile apparatus 6 slightly meanders during traveling and moves in the left-right direction in FIG. 26B, it is still possible to obtain an image in which the entire slope 80 is in focus.

FIGS. 27A and 27B are diagrams illustrating a mobile apparatus system in which a tilt angle is set according to the embodiment.

The image capturing device 7, which is set with the tilt angle θ as described referring to FIGS. 26A and 26B, has the advantageous feature as described above referring to FIGS. 22A to 22C and FIGS. 24A to 24B.

FIG. 27A illustrates an example case in which the first slope section 80A is within the depth of field of the image capturing device 7 having the tilt angle θ that is set, but the second slope section 80B is not within the depth of field of the image capturing device 7 having the tilt angle θ that is set.

FIG. 27B illustrates a state in which the tilt angle θ of the image capturing device 7 is set based on the distance information acquired in FIG. 27A, so that the plurality of image capturing areas d1 on the first slope section 80A and the second slope section 80B are within the depth of field.

By setting the common tilt angle θ for the plurality of image capturing areas d1, in the cross section including the Y-axis direction and the Z-axis direction, an image can be captured, with a wide area of the slope 80 being in-focus.

Even when the slope 80 includes the first slope section 80A and the second slope section 80B having different inclination angles 80a at different positions in the X-axis direction, the plurality of image capturing areas d1, which are captured in the moving direction of the mobile apparatus 6, are included in the depth of field DF, without changing the tile angle θ during the movement.

Specifically, at step S122 of FIG. 25A, in setting the focusing condition, the tilt angle of the image capturing device 7 is set, such that the plurality of image capturing areas d1 are within the depth of field DF. That is, in this embodiment, the focusing condition further defines the tilt angle, which can be set to be commonly used for capturing the plurality of image capturing areas, such that the image capturing areas can be within the depth of field. S122 is performed by the controller 900.

Subsequently, the image capturing device 7 captures the plurality of image capturing areas d1 included in the depth of field DF, under the focusing condition, which includes the setting of common tilt angle, set at step S122 (step S123).

When the target areas 70 is captured with a common tilt angle, at least one of the plurality of image capturing areas d1 in the target area 70 may not be within the depth of field. This is taken into consideration as described below referring to S132 of FIG. 25B.

At S132, a first focusing condition, including a first tilt angle of the image capturing device 7, is set, such that a first group of image capturing areas d1 corresponding to the first slope section 80A are within the depth of field DF. Further, a second focusing condition, including a second title angle of the image capturing device 7, is set, such that a second group of image capturing areas d1 corresponding to the second slope section 80B are within the depth of field DF.

Specifically, the first tilt angle θ is set such that a first group of image capturing areas included in the target area 70 are within the depth of field DF. Further, a second tilt angle, different from the first tilt angle, is set, such that a second group of image capturing areas, different from the first group of image capturing areas in the target area 70, are within the depth of field DF.

At S133, under the first focusing condition, which includes the first tilt angle, set at step S132, the image capturing device 7 captures images of the first group of the image capturing areas d1, corresponding to the first slope section 80A. In other words, the image capturing device 7 captures images of the first group of image capturing areas d1, with the first title angle, which is the common tilt angle having been set at S132 for capturing the first group of image capturing areas d1.

At S134, under the second focusing condition, which includes the second tilt angle, set at step S132, the image capturing device 7 captures images of the second group of the image capturing areas d1, corresponding to the second slope section 80B. In other words, the image capturing device 7 captures images of the second group of image capturing areas d1, with the second title angle, which is the common tilt angle having been set at S132 for capturing the second group of image capturing areas d1.

As described above referring to FIG. 25B, in a case where the target area 70 is captured with a common tilt angle, and at least one of the plurality of image capturing areas d1 in the target area 70 may not be within the depth of field, for each of the first group of image capturing areas d1 and the second group image capturing areas d1 in the target area 70, the plurality of image capturing areas d1, which are captured in the moving direction of the mobile apparatus 6, are included in the depth of field DF, and it is not necessary to change the tilt angle during the movement.

Figure 28:
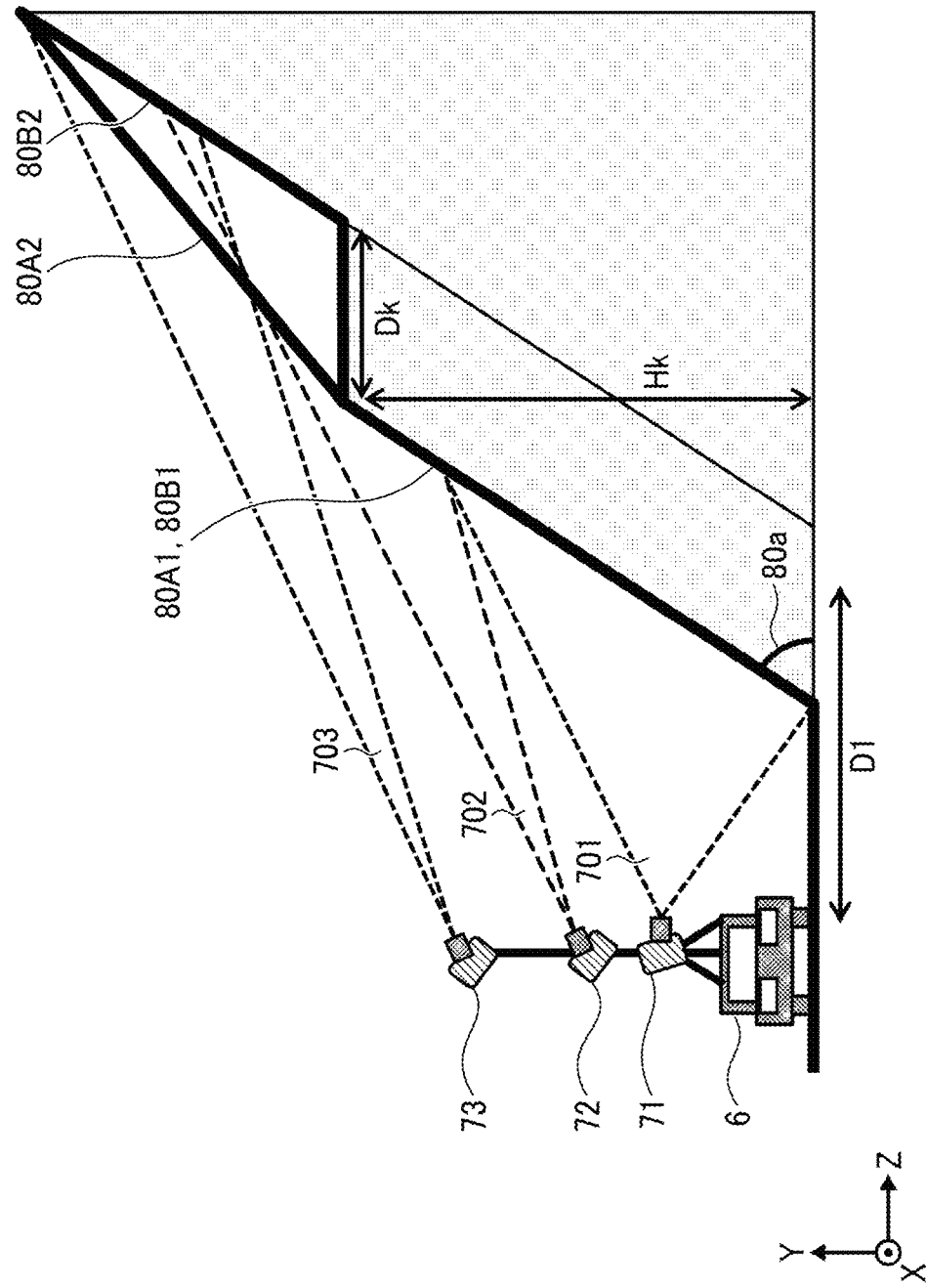
FIG. 28 is a diagram illustrating a case where a plurality of image capturing devices are applied, according to an embodiment of the present disclosure.

FIG. 28 is a diagram illustrating a case where a plurality of image capturing devices are applied, according to the embodiment.

The image capturing device 7 includes a plurality of image capturing devices 71, 72, and 73. The image capturing devices 71, 72, and 73 respectively capture a target area 701, a target area 702 located at a higher location than the target area 701, and a target area 703 located at a higher location than the target area 702, of the slope 80.

The first slope section 80A described with reference to FIG. 22 includes a lower slope section 80A1 and an upper slope section 80A2, which are continuously formed. The second slope section 80B includes a small step having a height Hk and a depth Dk, between the lower slope section 80B1 and the upper slope section 80B2.

The target area 702 to be captured by the image capturing device 72 includes the lower slope section 80B1 and the upper slope section 80B2 with a small step interposed therebetween, in the second slope section 80B. Although it is desired that a wide area in the Z-axis direction is captured, it is difficult to cause the image capturing areas be within the depth of field under a single focusing condition.

Even if the target area 701 and the target area 703 to be captured by the image capturing devices 71 and 73 are successfully within the depth of field under a single focusing condition, it is difficult for the image capturing device 7 as a whole to have all image capturing areas to be within the depth of field under the same focusing condition.

In other words, in some cases, the target area 70 includes first and second target areas located at different positions in a plane intersecting the moving direction of the mobile apparatus 6. In such case, the image capturing device 7 may include a first image capturing device that captures the first target area and a second image capturing device that captures the second target area. Unless the first and second target area are appropriately set, it may be difficult for the image capturing device 7 as a whole to have the image capturing areas that are within the depth of field under the same focusing condition, even if one of the first and second image capturing devices successfully has the image capturing areas that fit within the depth of field under the same focusing condition.

In this embodiment, the first and second target areas may be any two of the target area 701, the target area 702, and the target area 703. The first and second image capturing devices may be two image capturing devices, which correspond to the first and second target areas, from among the plurality of image capturing devices 71, 72, and 73.

Figure 29:
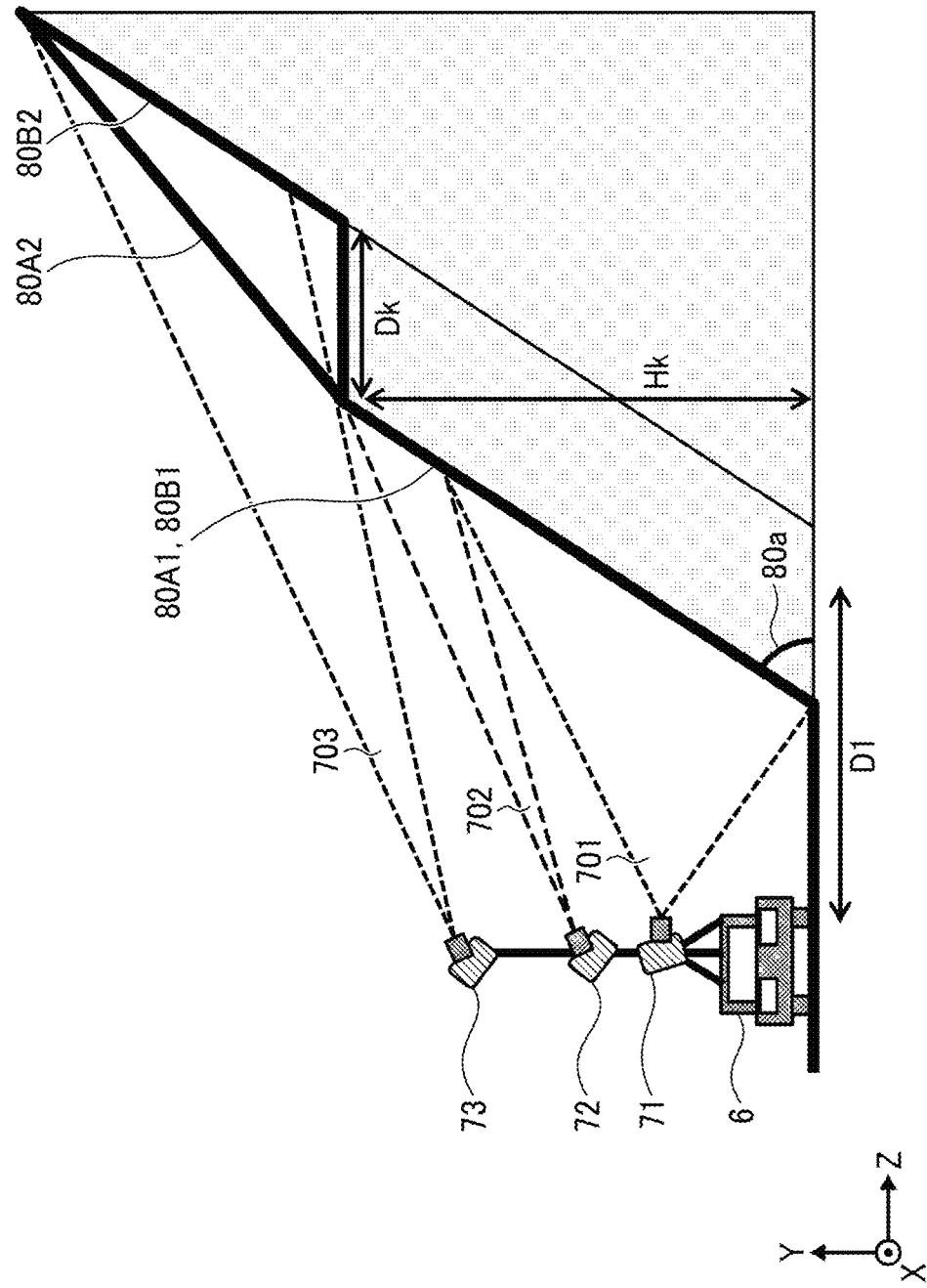
FIG. 29 is a diagram illustrating a mobile apparatus system including a plurality of image capturing devices, according to an embodiment of the present disclosure.

FIG. 29 is a diagram illustrating a mobile apparatus system including a plurality of image capturing devices according to the embodiment.

In FIG. 29, the target area 702 to be captured by the image capturing device 72 only includes the lower slope section 80B1, in the second slope section 80B. Compared with the case of FIG. 28, it would be easier to cause the image capturing areas to fall within the depth of field under a single focusing condition.

Specifically, at step S122 of FIG. 25A, the focusing condition for the first image capturing device can be set, so that the plurality of image capturing areas d1 in the first target area are within the depth of field DF. Further, the focusing condition for the second image capturing device can be set, so that the plurality of image capturing areas d1 in the second target area are within the depth of field DF. The ranges of the first target area and the second target area are respectively set, to meet the above-described focusing conditions.

Specifically, a focus distance for the first image capturing device is set to a common focus distance used for capturing a plurality of image capturing areas d1 in the first target area. This focus distance for the first image capturing device satisfies a focusing condition in which the plurality of image capturing areas d1 to be captured by the first image capturing device are within the depth of field DF. Further, a focus distance for the second image capturing device is set to a common focus distance used for capturing a plurality of image capturing areas d1 in the second target area. This focus distance for the second image capturing device satisfies a focusing condition in which the plurality of image capturing areas d1 to be captured by the second image capturing device are within the depth of field DF.

At S122, the focusing condition for the first image capturing device can be set, so that the plurality of image capturing areas d1 in the first target area are within the depth of field DF. Further, the focusing condition for the second image capturing device can be set, so that the plurality of image capturing areas d1 in the second target area are within the depth of field DF. The ranges of the first target area and the second target area are respectively set, to meet the above-described focusing conditions.

At S123, the first image capturing device captures the plurality of image capturing areas d1 in the first target area, under the focusing condition for the first image capturing device that is set at S122. Further, the second image capturing device captures the plurality of image capturing areas d1 in the second target area, under the focusing condition for the second image capturing device that is set at S122.

The ranges of the first target area and the second target area are respectively set, to meet the above-described focusing conditions. Accordingly, for each of the first and second target areas, the image capturing areas d1, which are captured in the moving direction of the mobile apparatus 6, are included in the depth of field DF, without changing the focusing condition during the movement.

The ranges of the first target area and the second target area are respectively set, to meet the above-described focusing conditions. Accordingly, for each of the first and second target areas, the plurality of captured images each being in-focus, which correspond to the plurality of image capturing areas d1, are obtained.

Modifications of Mobile Apparatus System

First Modification

Figure 30:
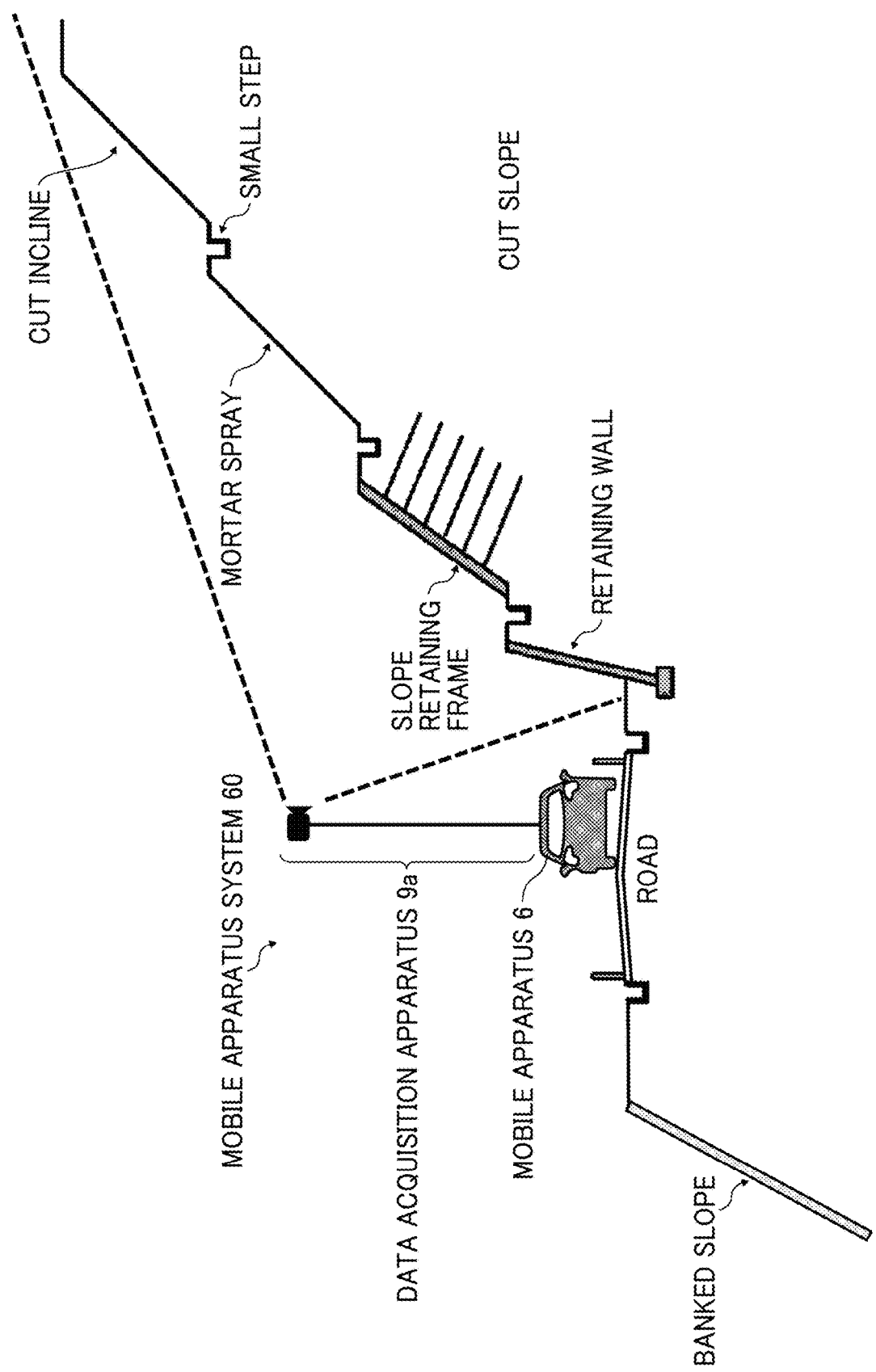
FIG. 30 is an illustration of an example of a situation in which a slope state is inspected using the mobile apparatus system according to Modification 1.
Figure 31:
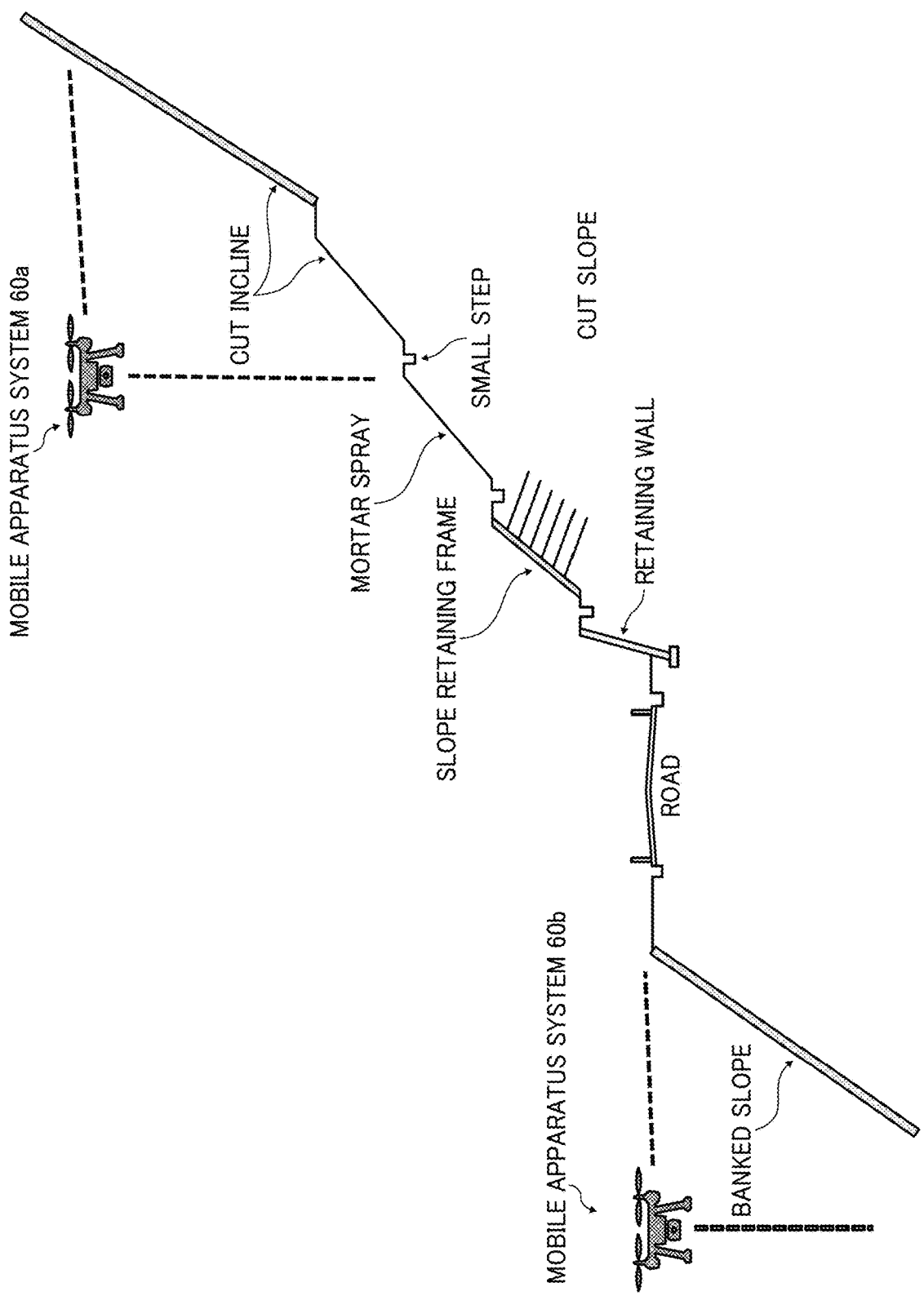
FIG. 31 is an illustration of an example of a situation in which a slope state is inspected using the mobile apparatus system according to Modification 2.
Figure 32:
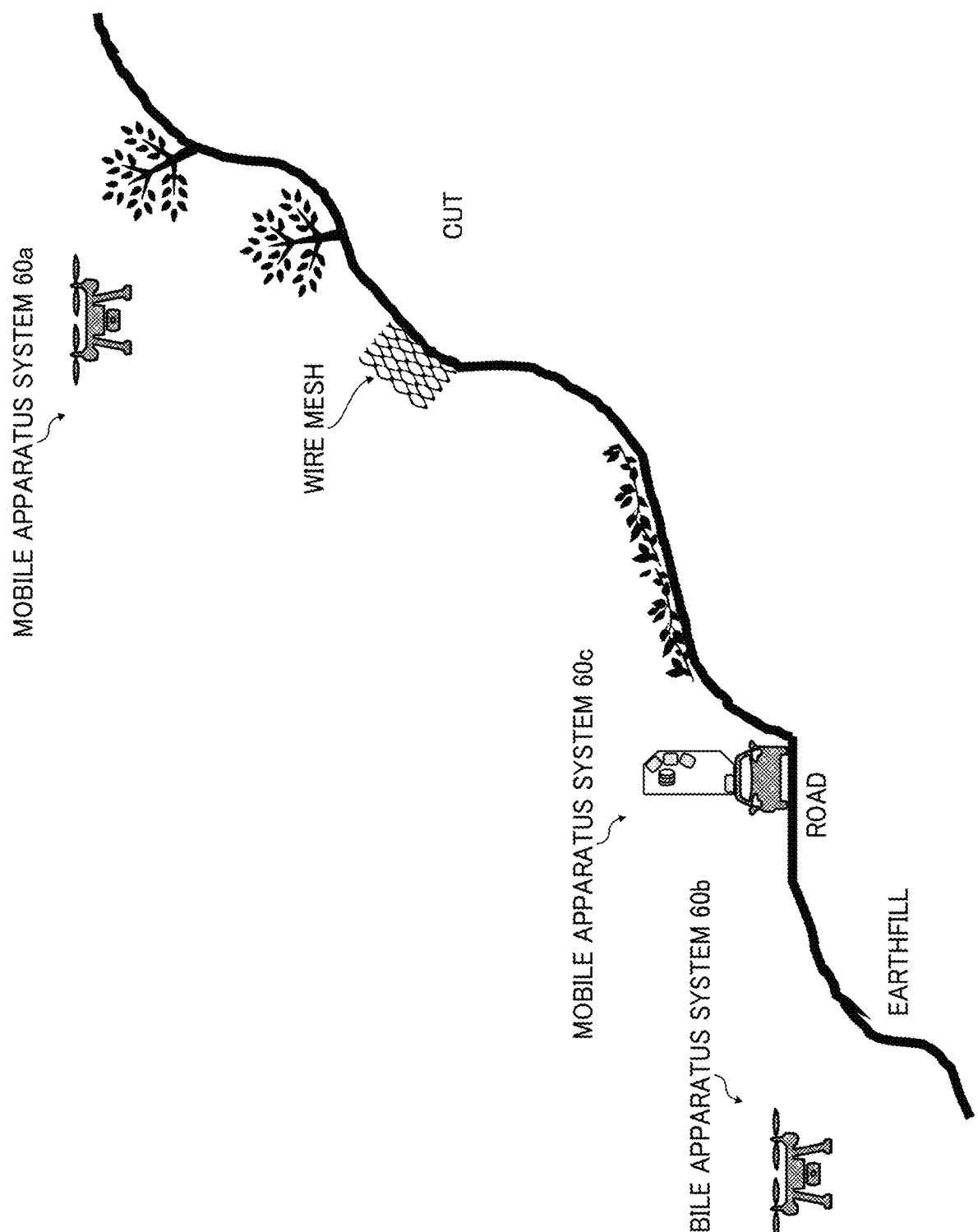
FIG. 32 is an illustration of an example of a situation in which a slope state is inspected using the mobile apparatus system according to Modification 3.

Referring to FIG. 30 to FIG. 32, modifications of the mobile apparatus system 60 are described. FIG. 30 is an illustration of an example of a situation in which a slope state is inspected using the mobile apparatus system 60 according to Modification 1. The mobile apparatus system 60 according to Modification 1 is a system in which the data acquisition apparatus 9 is attached to a pole installed on the upper surface of the mobile apparatus 6 in order to enable imaging of high places.

Since the height of the image capturing device 7 according to the above-described embodiment from the ground is low, there are difficulties in photographing a small step at a higher position from a retaining wall, a small step at a higher position from a slope retaining frame, or a small step at a higher position from mortar spray as illustrated in FIG. 30. As illustrated in FIG. 30, since current small steps as earthwork structures are not covered, dead leaves or the like may be accumulated in the small steps, causing a trouble of clogging waterways. For this reason, small steps have to be cleaned up at regular intervals. Even if it is difficult for a person to climb a slope to check the degree of clogging of waterways, the degree of clogging can be checked by causing the mobile apparatus 6 to travel. Specifically, the mobile apparatus system 60 according to Modification 1 can capture an image from a high place to perform image capturing. This greatly improves inspection efficiency.

Second Modification

FIG. 31 is an illustration of an example of a situation in which a slope state is inspected using the mobile apparatus system 60 according to Modification 2. The mobile apparatus system 60 (60a, 60b) according to Modification 2 uses a drone, which is an example of the mobile apparatus 6, equipped with the data acquisition apparatus 9, to capture an image of a high place that cannot be captured by the image capturing device equipped with the pole according to Modification 1 or a banked slope below the side of a road, for example.

The drone as the mobile apparatus 6 is equipped with not only the image capturing device 7 but also the data acquisition apparatus 9 including a sensor device such as the distance sensor 8a, the GNSS sensor 8b, or the angle sensor 8c. Thus, the drone as the mobile apparatus 6 can evaluate a state of a high place or an embarkment that cannot be evaluated by a vehicle as the mobile apparatus 6. As embarkments or high places are especially difficult for a person to go to close for visual observation, image capturing by a drone as in Modification 2 is desired. Further, embarkments or slopes in high places have many places covered with vegetation such as trees and grasses. For this reason, preferably, the data acquisition apparatus 9 includes the image capturing device 7 that can capture a wide-angle image.

In the case of using the drone, as described at step S123 of FIG. 25A, it is desirable that the drone travels so that the travel path at the time of image capturing does not deviate from the scheduled travel path obtained at step S122 as much as possible.

Third Modification

FIG. 32 is an illustration of an example of a situation in which a slope state is inspected using the mobile apparatus system 60 according to Modification 3. As illustrated in FIG. 32, a slope has a complicated structure unlike tunnels or bridges, which are structure on roads.

For example, in some cases, a slope has an incline that is wavy rather than flat (e.g., an earthwork structure obtained by spraying mortar on a quay wall). In some cases, vegetation is grown on a slope. In some cases, a slope is covered with a wire mesh. For this reason, the mobile apparatus system 60 (60a, 60b, 60c) according to Modification 3 includes, as the sensor device 8, a spectral camera, an infrared camera, or an expanded depth of field (EDof) camera that can acquire wavelength information in order to distinguish an object such as a plant or a wire mesh from the shape of the slope.

Further, preferably, the mobile apparatus system 60 according to Modification 3 includes, in addition to or in alternative to a tool for distinguishing the shape of the slope from other objects, a lighting device equipped to the data acquisition apparatus 9, so that a slope is photographed under various conditions such as weather and sunshine. Preferably, the lighting device is a line lighting device that irradiates an area corresponding to an image capturing range of the image capturing device 7, or a time-division lighting device synchronized with the image capturing device 7 and the sensor device 8.

Preferably, in order to process data acquired by the mobile apparatus system 60 according to Modification 3, the evaluation target data generation unit 35 of the evaluation apparatus 3 has an image processing function such as an image stabilization function, a focal depth correction function (blur correction function), a distortion correction function, or a contrast enhancement function so as not to overlook even small deformations. Further, preferably, the evaluation target data generation unit 35 has a function of removing noise that conceals a deformation on an earthwork structure such as grass, moss, or wire mesh, or a function of distinguishing such as a shadow of grass from a deformation such as a crack. Thus, using the mobile apparatus system 60 according to Modification 3, the state inspection system 1 can accurately evaluate a slope state in a place having a complicated structure or a place where grass, moss, a wire mesh, or the like is present.

First Aspect:

In the first aspect, a method for capturing a slope 80, which is an example of a subject, with an image capturing device 7 installed at a mobile apparatus 6 that travels, is provided. The image capturing device 7 divides a target area 70 (image capturing range) on the slope 80 into a plurality of image capturing areas d1 in a moving direction of the mobile apparatus 6, to obtain a captured image of the target area 70. The method includes step S122, which sets a focusing condition to the image capturing device 7, such that a focus distance at the time of capturing the plurality of image capturing areas d1 is set to a focus distance that is common to the plurality of image capturing areas d1, causing all of the plurality of image capturing areas d1 be within depth of field DF. The method further includes step S123, which captures, with the image capturing device 7, the plurality of image capturing areas d1 under the focusing condition set at step S122.

Accordingly, the plurality of image capturing areas d1, which are captured in the moving direction of the mobile apparatus 6, are included in the depth of field DF, without changing the focusing condition of the image capturing device 7 during the movement. The plurality of captured images, which correspond to the plurality of image capturing areas d1, are made in focus (or have the same focus state). This makes it possible to stably obtain an in-focus image, both for a captured image obtained by capturing each of the plurality of image capturing areas d1, and for a combined captured image obtained by stitching the captured images of the plurality of image capturing areas d1. Thus, the target area 70 on the slope 80 can be evaluated (inspected) with high accuracy, based on each captured image or the combined captured image.

Second Aspect:

In the method for capturing according to the first aspect, at the step S122, the focusing condition is set based on distance information, which indicates a distance from a reference position to the slope 80 in a direction orthogonal to the moving direction of the mobile apparatus 6, when capturing the plurality of image capturing areas d1 with the image capturing device 7. The focusing condition can be appropriately set based on the distance information.

Third Aspect:

In the method for capturing according to the first aspect or the second aspect, the image capturing device 7 includes a first image capturing device that captures a first target area and a second image capturing device that captures a second target area. In a case where the target area 70 includes a first target area and a second target area, at distances different from each other in a direction intersecting the moving direction of the mobile apparatus 6, at step S122, a focus distance for the first image capturing device is set to a common focus distance used for capturing a plurality of image capturing areas d1 in the first target area. This focus distance for the first image capturing device is set as a first focusing condition such that the plurality of image capturing areas d1 to be captured by the first image capturing device are within the depth of field DF. Further, a focus distance for the second image capturing device is set to a common focus distance used for capturing a plurality of image capturing areas d1 in the second target area. This focus distance for the second image capturing device is set as a second focusing condition such that the plurality of image capturing areas d1 to be captured by the second image capturing device are within the depth of field DF. At S123, the first image capturing device captures the plurality of image capturing areas d1 in the first target area, under the first focusing condition for the first image capturing device that is set at S122. Further, the second image capturing device captures the plurality of image capturing areas d1 in the second target area, under the second focusing condition for the second image capturing device that is set at S122.

Accordingly, for each of the first target area and second target area, the plurality of image capturing areas d1, which are captured in the moving direction of the mobile apparatus 6, are included in the depth of field DF, without changing the focusing condition during the movement.

For each of the first target area and the second target area, the plurality of captured images having the same in-focus state, which correspond to the plurality of image capturing areas d1, are obtained.

Fourth Aspect:

In the method for capturing according to the third aspect, at S122, the ranges of the first target area and the second target area in the target area are respectively determined, such that the first focusing condition for the first image capturing device that is set causes that the plurality of image capturing areas d1 in the first target area be within the depth of field DF. Further, the second focusing condition for the second image capturing device is set causes that the plurality of image capturing areas d1 in the second target area be within the depth of field DF. For each of the first target area and the second target area, the plurality of captured images having the same in-focus state, which correspond to the plurality of image capturing areas d1, are obtained.

Fifth Aspect:

In the method for capturing according to any one of the first aspect to the fourth aspect, in a case where the plurality of image capturing areas d1 in the target area 70 are captured at a common focus distance, at least one of the plurality of image capturing areas d1 in the target area 70 may not be within the depth of field. In such case, at S132, as the first focusing condition, a first focus distance is set to a common focus distance used for capturing a first group of image capturing areas, such that the first group of image capturing areas included in the target area 70 are all within the depth of field DF. Similarly, as the second focusing condition, a second focus distance is set to a common focus distance used for capturing a second group of image capturing areas (different from the first group), such that the second group of image capturing areas included in the target area 70 are all within the depth of field DF. The step of capturing includes first capturing step S133 of capturing, with the image capturing device 7, a first group of image capturing areas d1 under the first focusing condition. The step of capturing further includes second capturing step S134 of capturing, with the image capturing device 7, a second group of image capturing areas d1 under the second focusing condition.

When the target areas 70 is captured at a common focus distance, at least one of the plurality of image capturing areas d1 in the target area 70 may not be within the depth of field. In such case, for each of the first group of image capturing areas and the second group image capturing areas in the target area 70, the plurality of image capturing areas d1, which are captured in the moving direction of the mobile apparatus 6, are included in the depth of field DF, without changing the focusing condition during the movement.

Accordingly, through capturing each of the first group of image capturing areas and the second group of image capturing areas in the target area 70 as described above, the plurality of captured images having the same in-focus state, which correspond to the plurality of image capturing areas d1, are obtained.

Sixth Aspect:

In the method for capturing according to any one of the first aspect to the fifth aspect, the image capturing device 7 includes an imaging lens 700 and an imaging sensor 740. The focusing condition further defines a tilt angle θ representing an angle between a perpendicular line 740P perpendicular to a sensor surface of the imaging sensor 740 and a central axis 700C of the imaging lens 700. At step of setting, a tilt angle θ is set. At step S123 of capturing, the image capturing device 7 captures the plurality of image capturing areas d1 included in the depth of field DF, under the focusing condition, which sets the tilt angle θ to a common tilt angle at the step of setting.

Accordingly, the plurality of image capturing areas d1 on the slope 80, which are captured by the image capturing device 7 having the common tilt angle being set, in the moving direction of the mobile apparatus 6, are in the depth of field DF, and it is not necessary to change the tilt angle θ during the movement. The plurality of captured images having the same in-focus state, which correspond to the plurality of image capturing areas d1, are obtained.

Seventh Aspect:

In the method of capturing according to the aspect 6, in a case where the target areas 70 is captured with a common tilt angle, at least one of the plurality of image capturing areas d1 in the target area 70 may not be within the depth of field. At step S132 of setting, the first tilt angle θ is set such that a first group of image capturing areas included in the target area 70 are within the depth of field DF. Further, a second tilt angle, different from the first tilt angle, is set, such that a second group of image capturing areas included in the target area 70, different from the first group of image capturing areas, are within the depth of field DF. The step of capturing includes step S133 of capturing, with the image capturing device 7, images of the first group of image capturing areas d1, with the first title angle being set as a common tilt angle used for capturing the first group of image capturing areas d1. The step of capturing further includes step S135 of capturing, with the image capturing device 7, images of the second group of image capturing areas d1, with the second title angle being set as a common tilt angle used for capturing the second group of image capturing areas d1.

In a case where the target area 70, for example, on the slope 80 is captured with a common tilt angle, at least one of the plurality of image capturing areas d1 in the target area 70 may not be within the depth of field, due to a shape of the target area 70. Accordingly, for each of the first group of image capturing areas d1 and the second group of image capturing areas d1, the plurality of image capturing areas d1, which are captured in the moving direction of the mobile apparatus 6, are included in the depth of field DF, without changing the focusing condition during the movement.

For each of the first group of image capturing areas d1 and the second group of image capturing areas d1 in the target area 70, the plurality of captured images having the same in-focus state, which correspond to the plurality of image capturing areas d1, are obtained.

Eighth Aspect:

In the method of capturing according to the second aspect, the method further includes step S121 of acquiring distance information. At step S123 of setting, the focusing condition is set based on the distance information acquired at step S121 of acquiring distance information.

Accordingly, the plurality of image capturing areas d1, which are captured in the moving direction of the mobile apparatus 6, are included in the depth of field DF, based on the distance information indicating a distance from the reference position at the mobile apparatus 6 to the slope 80, without changing the focusing condition during the movement.

Ninth Aspect:

The method of capturing according to the sixth aspect or the seventh aspect, further includes step S121 of acquiring the distance information indicating a distance from a reference position to each of the plurality of image capturing areas d1 in an imaging direction of each of the image capturing areas, at a time when the image capturing device 7 captures each of the plurality of image capturing areas d1. At step S122 of setting, the tilt angle is set based on the distance information acquired at the step S121 of acquiring.

Accordingly, the plurality of image capturing areas d1, which are captured in the moving direction of the mobile apparatus 6, are included in the depth of field DF, based on the distance information indicating a distance from the reference position at the mobile apparatus 6 to the slope 80, without changing the tilt angle during the movement.

Tenth Aspect:

An information processing method according to an embodiment of the present invention includes: the method of capturing according to any one of the first to fourth, sixth, and eighth aspects; and a step of generating a captured image of the target area 70 by stitching the captured images of the plurality of image capturing areas d1 captured at a common focus distance in the target area.

Eleventh Aspect:

An information processing method according to an embodiment of the present invention includes: the method of capturing according to the sixth aspect; and a step of generating a captured image of the target area 70 by stitching the captured images of the plurality of image capturing areas d1 captured with a common tilt angle in the target area.

In the information processing method according to the tenth aspect or the eleventh aspect, the captured images of the plurality of image capturing areas d1 having the same in-focus states are stitched to obtain a captured image, which is suitable for highly accurate inspection.

Twelfth Aspect:

The information processing method according to the tenth aspect or the eleventh aspect, further includes a step of evaluating the captured image of the target area 70 obtained by stitching the captured images of the plurality of image capturing areas d1.

Thus, the target area 70 on the slope 80 can be evaluated (inspected) appropriately, based on the captured image obtained by stitching the captured images of the plurality of image capturing areas d1 having the same in-focus states.

Thirteenth Aspect:

The information processing method according to any one of the tenth aspect to the twelfth aspect, further includes a step of displaying the captured image of the target area 70 obtained by stitching the captured images of the plurality of image capturing areas d1.

Thus, the target area 70 on the slope 80 can be evaluated (inspected) or confirmed appropriately, based on the captured image obtained by stitching the captured images of the plurality of image capturing areas d1 having the same in-focus states.

Fourteenth Aspect:

An image capturing system according to an embodiment of the present disclosure includes an image capturing device control unit 93, which is an example of a controller, and the image capturing device 7. The image capturing device 7 and the image capturing device control unit 93 are mounted on the mobile apparatus 6, to together perform capturing images of a slope 80, as an example of a subject, while traveling. The image capturing device control unit 93 controls image capturing processing of the image capturing device 7. The image capturing device 7 divides a target area 70 (image capturing range) on the slope 80 into a plurality of image capturing areas d1 in a moving direction of the mobile apparatus 6, to obtain a captured image of the target area 70. The method includes step S122, which sets a focusing condition to the image capturing device 7, such that a focus distance at the time of capturing the plurality of image capturing areas d1 is set to a focus distance that is common to the plurality of image capturing areas d1 and causes all of the plurality of image capturing areas d1 be within depth of field DF. As another example, the image capturing system may be implemented by the mobile apparatus system 60 including the mobile apparatus 6 and the image capturing device 7 mounted on the mobile apparatus 6.

Accordingly, the plurality of image capturing areas d1, which are captured in the moving direction of the mobile apparatus 6, are included in the depth of field DF, without changing the focusing condition during the movement.

The plurality of captured images having the same in-focus state, which correspond to the plurality of image capturing areas d1, are obtained.

Fifteenth Aspect:

In the image capturing system according to the fourteenth aspect, the image capturing device 7 includes a first image capturing device that captures a first target area and a second image capturing device that captures a second target area. The target area 70 includes a first target area and a second target area, at distances different from each other in a direction intersecting the moving direction of the mobile apparatus 6. A focus distance for the first image capturing device is set to a common focus distance used for capturing a plurality of image capturing areas d1 in the first target area. This focus distance for the first image capturing device satisfies a focusing condition in which the plurality of image capturing areas d1 to be captured by the first image capturing device are within the depth of field DF. Further, a focus distance for the second image capturing device is set to a common focus distance used for capturing a plurality of image capturing areas d1 in the second target area. This focus distance for the second image capturing device satisfies a focusing condition in which the plurality of image capturing areas d1 to be captured by the second image capturing device are within the depth of field DF. The first image capturing device and the second image capturing device respectively capture the first target area and the second target area, at the focal distances having been set.

Accordingly, for each of the first target area and second target area, the plurality of image capturing areas d1, which are captured in the moving direction of the mobile apparatus 6, are included in the depth of field DF, without changing the focusing condition during the movement.

For each of the first target area and the second target area, the plurality of captured images having the same in-focus state, which correspond to the plurality of image capturing areas d1, are obtained.

Sixteenth Aspect:

In the image capturing system according to the fifteenth aspect, the focusing condition for the first image capturing device can be set, so that the plurality of image capturing areas d1 in the first target area are within the depth of field DF. Further, the focusing condition for the second image capturing device can be set, so that the plurality of image capturing areas d1 in the second target area are within the depth of field DF. The ranges of the first target area and the second target area are respectively set, to meet the above-described focusing conditions.

Seventeenth Aspect:

A mobile apparatus system 60, which is an example of an information processing system according to an embodiment of the present disclosure, includes: the image capturing system according to any one of the fourteenth aspect to the sixteenth aspect; and an evaluation target data generation unit 35 that generates a captured image of the target area by stitching captured images of the plurality of image capturing areas d1.

With this configuration, the captured images of the plurality of image capturing areas d1 having the same in-focus states are stitched to obtain a captured image, which is suitable for highly accurate inspection.

Eighteenth Aspect:

The mobile apparatus system 60 according to the seventeenth aspect, further includes a detection unit 36, which is an example of an evaluation unit that evaluates the captured image of the target area 70 obtained by stitching the captured images of the plurality of image capturing areas d1.

Thus, the target area 70 on the slope 80 can be evaluated (inspected) appropriately, based on the captured image obtained by stitching the captured images of the plurality of image capturing areas d1 having the same in-focus states.

Nineteenth Aspect:

The mobile apparatus system 60 according to the seventeenth aspect or the eighteenth aspect, further includes a display 306, which is an example of an displaying unit that displays the captured image of the target area 70 obtained by stitching the captured images of the plurality of image capturing areas d1.

Thus, the target area 70 on the slope 80 can be evaluated (inspected) or confirmed appropriately, based on the captured image obtained by stitching the captured images of the plurality of image capturing areas d1 having the same in-focus states.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), a system on a chip (SOC), a graphics processing unit (GPU), and conventional circuit components arranged to perform the recited functions.

Each of the tables of the above-described embodiments may be generated by learning effect of machine learning. In addition, in alternative to using the tables, the data of each related item may be classified by the machine learning. In the present disclosure, the machine learning is defined as a technology that makes a computer to acquire human-like learning ability. In addition, the machine learning refers to a technology in which a computer autonomously generates an algorithm required for determination such as data identification from learning data loaded in advance and applies the generated algorithm to new data to make a prediction. Any suitable learning method is applied for machine learning, for example, any one of supervised learning, unsupervised learning, semi-supervised learning, reinforcement learning, and deep learning, or a combination of two or more those learning.

Further, various tables of any one of the above-described embodiments may be generated by an image processing technology. Examples of the image processing technology include, but are not limited to, edge detection, straight line detection, and binarization processing.

In substantially the same manner, when voice is used, a voice conversion technology such as Fourier transform may be used.

Although the evaluation system, the state inspection system, the evaluation method, and the program according to one or more embodiments of the present disclosure have been described above, the above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A method for capturing an image of a sloped subject, using an image capturing device mounted on a mobile apparatus, the image capturing device, including an imaging lens and an imaging sensor, configured to divide a target area of the sloped subject into a plurality of image capturing areas in a moving direction of the mobile apparatus, and to capture the plurality of image capturing areas while moving with the mobile apparatus, the method comprising:
acquiring distance information indicating a distance from a reference position in the mobile apparatus to the sloped subject in a direction perpendicular to the moving direction of the mobile apparatus;
setting, as a focusing condition for the image capturing device, a focus distance that is commonly used to capture the plurality of image capturing areas in the target area, such that the plurality of image capturing areas are within depth of field based on the distance information; and
capturing, with the image capturing device, the plurality of image capturing areas in the target area at the focus distance that is set as the focusing condition, wherein
the focusing condition includes a tilt angle that is commonly used to capture the plurality of image capturing areas such that the plurality of image capturing areas in the target area are within the depth of field based on the distance information, the tilt angle representing an angle between a perpendicular line perpendicular to a sensor surface of the imaging sensor and a central axis of the imaging lens.

2. The method of claim 1, wherein
the target area includes a first target area and a second target area, located at different distances in the direction orthogonal to the moving direction of the mobile apparatus,
the image capturing device includes a first image capturing device that captures the first target area, and a second image capturing device that captures the second target area,
the setting includes:
setting, as a first focusing condition for the first image capturing device, a focus distance commonly used for capturing a plurality of image capturing areas in the first target area, such that the plurality of image capturing areas in the first target area are within the depth of field; and
setting, as a second focusing condition for the second image capturing device, a focus distance commonly used for capturing a plurality of image capturing areas in the second target area, such that the plurality of image capturing areas in the second target area are within the depth of field, and
the capturing includes:
capturing, with the first image capturing device, the plurality of image capturing areas in the first target area at the focus distance that is set as the first focusing condition; and
capturing, with the second image capturing device, the plurality of image capturing areas in the second target area at the focus distance that is set as the second focusing condition.

3. The method of claim 2, wherein
the first target area and the second target area respectively have ranges, such that
the plurality of image capturing areas in the first target area are within the depth of field, when captured at the focus distance that is set as the first focusing condition, and
the plurality of image capturing areas in the second target area are within the dept of field, when captured at the focus distance that is set as the second focusing condition.

4. The method of claim 1, wherein
when the plurality of image capturing areas in the target area includes a first group of image capturing areas within the depth of field, and a second group of image capturing areas not within the depth of field, when the plurality of image capturing areas in the target area is captured at a focus distance commonly used to capture the first group of image capturing areas and the second group image capturing areas,
the setting includes:
setting, as a first focusing condition for the image capturing device, a focus distance that is commonly used for capturing the first group of image capturing areas in the target area, such that the first group of image capturing areas in the target area are within the depth of field; and
setting, as a second focusing condition for the image capturing device, a focus distance commonly used for capturing the second group of image capturing areas in the target area, such that the second group of image capturing areas in the target area are within the depth of field, and
the capturing includes:
capturing, with the image capturing device, the first group of image capturing areas at the focus distance that is set as the first focusing condition; and
capturing, with the image capturing device, the second group of image capturing areas at the focus distance that is set as the second focusing condition.

5. The method of claim 1, wherein
when the plurality of image capturing areas in the target area includes a first group of image capturing areas within the depth of field, and a second group of image capturing areas not within the depth of field, when the plurality of image capturing areas in the target area is captured at a focus distance commonly used to capture the first group of image capturing areas and the second group of image capturing areas,
the setting includes:
setting, as a first focusing condition for the image capturing device, a tilt angle that is commonly used for capturing the first group of image capturing areas in the target area, such that the first group of image capturing areas in the target area are within the depth of field; and
setting, as a second focusing condition for the image capturing device, a tilt angle that is commonly used for capturing the second group of image capturing areas in the target area, such that the second group of image capturing areas in the target area are within the depth of field, and
the capturing includes:
capturing, with the image capturing device, the first group of image capturing areas, with the tilt angle that is set as the first focusing condition; and
capturing, with the image capturing device, the second group of image capturing areas, with the tilt angle that is set as the second focusing condition.

6. A method for processing an image of a sloped subject captured by an image capturing device mounted on a mobile apparatus, the image capturing device, including an imaging lens and an imaging sensor, configured to divide a target area of the sloped subject into a plurality of image capturing areas in a moving direction of the mobile apparatus, and to capture the plurality of image capturing areas while moving with the mobile apparatus,
the method comprising:
acquiring distance information indicating a distance from a reference position in the mobile apparatus to the subject in a direction perpendicular to the moving direction of the mobile apparatus;
setting, as a focusing condition for the image capturing device, a focus distance that is commonly used to capture the plurality of image capturing areas in the target area, such that the plurality of image capturing areas are within depth of field based on the distance information;
capturing, with the image capturing device, the plurality of image capturing areas in the target area at the focus distance that is set as the focusing condition; and
generating a captured image of the target area by stitching the captured images of the plurality of image capturing areas in the target area, each image capturing area having been captured at the focus distance that is set as the focusing condition, wherein
the focusing condition includes a tilt angle that is commonly used to capture the plurality of image capturing areas such that the plurality of image capturing areas in the target area are within the depth of field based on the distance information, the tilt angle representing an angle between a perpendicular line perpendicular to a sensor surface of the imaging sensor and a central axis of the imaging lens.

7. The method of claim 6, further comprising:
evaluating the captured image of the target area obtained by stitching the captured images of the plurality of image capturing areas.

8. The method of claim 6, further comprising:
displaying, on a display, the captured image of the target area obtained by stitching the captured images of the plurality of image capturing areas.

9. An image capturing system for capturing an image of a sloped subject, comprising:
an image capturing device mounted on a mobile apparatus, the image capturing device, including an imaging lens and an imaging sensor, configured to divide a target area of the sloped subject into a plurality of image capturing areas in a moving direction of the mobile apparatus, and to capture the plurality of image capturing areas while moving with the mobile apparatus; and
circuitry configured to control image capturing by the image capturing device, wherein
the circuitry is configured to set, as a focusing condition for the image capturing device, a focus distance that is commonly used to capture the plurality of image capturing areas in the target area, such that the plurality of image capturing areas are within depth of field based on the distance information,
the image capturing device captures the plurality of image capturing areas at the focus distance that is set as the focusing condition, and
the focusing condition includes a tilt angle that is commonly used to capture the plurality of image capturing areas such that the plurality of image capturing areas in the target area are within the depth of field based on the distance information, the tilt angle representing an angle between a perpendicular line perpendicular to a sensor surface of the imaging sensor and a central axis of the imaging lens.

10. The image capturing system of claim 9, wherein
the target area includes a first target area and a second target area, located at different distances in the direction orthogonal to the moving direction of the mobile apparatus,
the image capturing device includes a first image capturing device that captures the first target area, and a second image capturing device that captures the second target area,
the first image capturing device captures a plurality of image capturing areas in the first target area at a focus distance that is set, as a first focusing condition for the first image capturing device, the focus distance of the first focusing condition being commonly used to capture the plurality of image capturing areas in the first target area such that the plurality of image capturing areas in the first target area are within depth of field, and
the second image capturing device captures a plurality of image capturing areas in the second target area at a focus distance that is set, as a second focusing condition for the second image capturing device, the focus distance of the second focusing condition being commonly used to capture the plurality of image capturing areas in the second target area such that the plurality of image capturing areas in the second target area are within depth of field.

11. The image capturing system of claim 10, wherein
the first target area and the second target area respectively have ranges, such that
the plurality of image capturing areas in the first target area are within the depth of field, when captured at the focus distance that is set as the first focusing condition, and
the plurality of image capturing areas in the second target area are within the dept of field, when captured at the focus distance that is set as the second focusing condition.

12. An information processing system comprising:
the image capturing system of claim 9; and
server circuitry configured to generate a captured image of the target area by stitching the captured images of the plurality of image capturing areas in the target area.

13. The information processing system of claim 12, wherein the server circuitry is further configured to evaluate the captured image of the target area obtained by stitching the captured images of the plurality of image capturing areas.

14. The information processing system of claim 12, wherein the server circuitry is further configured to display, on a display, the captured image of the target area obtained by stitching the captured images of the plurality of image capturing areas.

* * * * *